US008721070B2

(12) United States Patent
Loeb, Jr. et al.

(10) Patent No.: US 8,721,070 B2
(45) Date of Patent: May 13, 2014

(54) TRANSLATING MULTIFOCAL EYEGLASS LENSES

(75) Inventors: Jack Loeb, Jr., Roanoke, VA (US);
Ronald D. Blum, Roanoke, VA (US)

(73) Assignee: Refine Focus, LLC, Roanoke, VA (US)

( * ) Notice: Subject to any disclaimer, the term of this patent is extended or adjusted under 35 U.S.C. 154(b) by 53 days.

(21) Appl. No.: 13/315,006

(22) Filed: Dec. 8, 2011

(65) Prior Publication Data
US 2012/0147317 A1 Jun. 14, 2012

Related U.S. Application Data

(60) Provisional application No. 61/420,796, filed on Dec. 8, 2010, provisional application No. 61/452,441, filed on Mar. 14, 2011, provisional application No. 61/509,632, filed on Jul. 20, 2011, provisional application No. 61/552,506, filed on Oct. 28, 2011.

(51) Int. Cl.
*G02C 7/06* (2006.01)
(52) U.S. Cl.
USPC .......................................................... 351/55
(58) Field of Classification Search
USPC .................... 351/55–69, 84, 95, 107, 128, 351/159.01–159.81
See application file for complete search history.

(56) References Cited

U.S. PATENT DOCUMENTS

| | | | |
|---|---|---|---|
| 3,365,263 A | | 1/1968 | Allen |
| 4,190,334 A | * | 2/1980 | O'Neil ............................ 351/137 |
| 4,280,758 A | | 7/1981 | Flader et al. |
| 5,182,588 A | * | 1/1993 | Maurer et al. ........... 351/159.65 |
| 6,322,215 B1 | * | 11/2001 | Bristol ...................... 351/159.43 |
| 7,328,998 B2 | * | 2/2008 | Hobbs ............................. 351/45 |

(Continued)

FOREIGN PATENT DOCUMENTS

| | | |
|---|---|---|
| DE | 199 07 777 | 8/2000 |
| DE | 10200605537 | 6/2008 |

(Continued)

OTHER PUBLICATIONS

The Partial International Search in PCT/US2011/064004 application.

(Continued)

*Primary Examiner* — Scott J Sugarman
*Assistant Examiner* — Vipin Patel
(74) *Attorney, Agent, or Firm* — Sterne, Kessler, Goldstein & Fox P.L.L.C.

(57) ABSTRACT

Embodiments may provide multifocal eyeglass lenses and eyewear that may comprise multifocal translating eyeglass lenses. The eyewear may comprise a lens housing, a first temple and a second temple coupled to the lens housing, and a first and a second lens supported by the lens housing. The lens may comprise a first optical zone having an optical power corresponding to a wearer's far distance day time optical power need and a second optical zone having an optical power corresponding to a wearer's far distance night time optical power need. The eyewear may further comprise a movable member coupled to the lens housing, the first temple, or the second temple, wherein the movable member may be configured to move between a first position and a second position, where a position of the lens may be based at least in part on the position of the movable member. The eyewear may further include a mechanism adapted to adjust the position of the movable member.

21 Claims, 36 Drawing Sheets

(56) References Cited

U.S. PATENT DOCUMENTS

| | | |
|---|---|---|
| 7,588,332 B2 | 9/2009 | Blum et al. |
| 7,883,206 B2* | 2/2011 | Blum et al. ............... 351/159.42 |
| 2002/0067461 A1* | 6/2002 | Bell ............................. 351/128 |
| 2003/0020988 A1 | 1/2003 | Stone |
| 2004/0075803 A1 | 4/2004 | Yamamoto |
| 2007/0091257 A1 | 4/2007 | Spivey |
| 2007/0132943 A1* | 6/2007 | Kurzrok ......................... 351/47 |
| 2008/0123049 A1* | 5/2008 | Volk ............................. 351/169 |

FOREIGN PATENT DOCUMENTS

| | | |
|---|---|---|
| EP | 0116093 | 8/1984 |
| FR | 2 587 505 | 3/1987 |
| WO | 2010/067877 | 6/2010 |

OTHER PUBLICATIONS

The Partial International Search in PCT/US2011/064006 application.
Hope G et al: "Night myopia", Survey of Ophthalmology, Survey of Ophthalmology Inc, vol. 29, No. 2, Sep. 1, 1984, pp. 129-136.
U.S. Appl. No. 13/314,994, filed on Dec. 8, 2011.
U.S. Appl. No. 61/420,796, filed Dec. 8, 2010.
U.S. Appl. No. 61/452,441, filed Mar. 14, 2011.
U.S. Appl. No. 61/509,632, filed Jul. 20, 2011.
U.S. Appl. No. 61/552,506, filed Oct. 28, 2011.
The International Preliminary Report on Patentability for application PCT/US2011/0640004.
Obrig, Theo. E., "Vocational Bifocals and Trifocals," in *Modern Ophthalmic Lenses and Optical Glass*, (New York: 1944), 261-271.

* cited by examiner

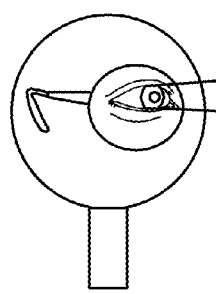 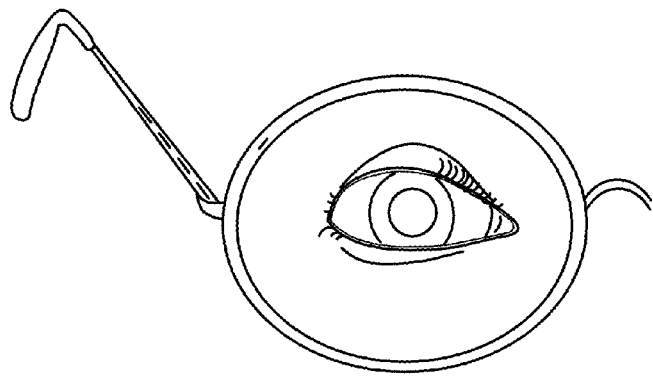
FIG. 1(a)  FIG. 1(b)
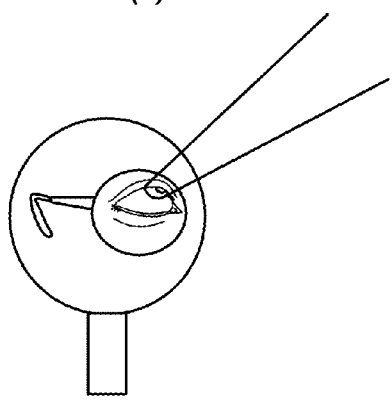 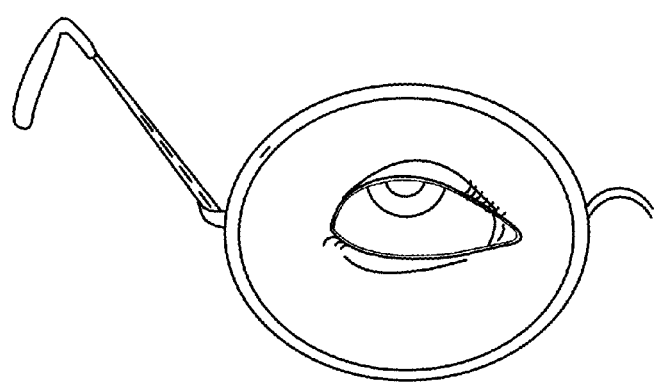
FIG. 1(c)  FIG. 1(d)
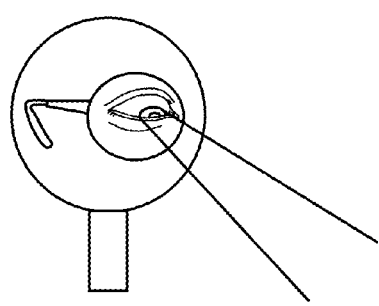 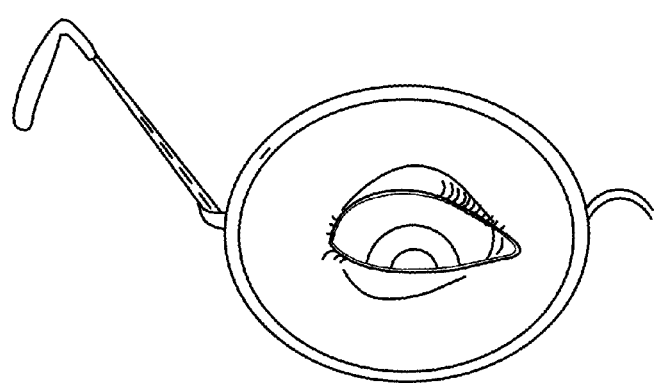
FIG. 1(e)  FIG. 1(f)

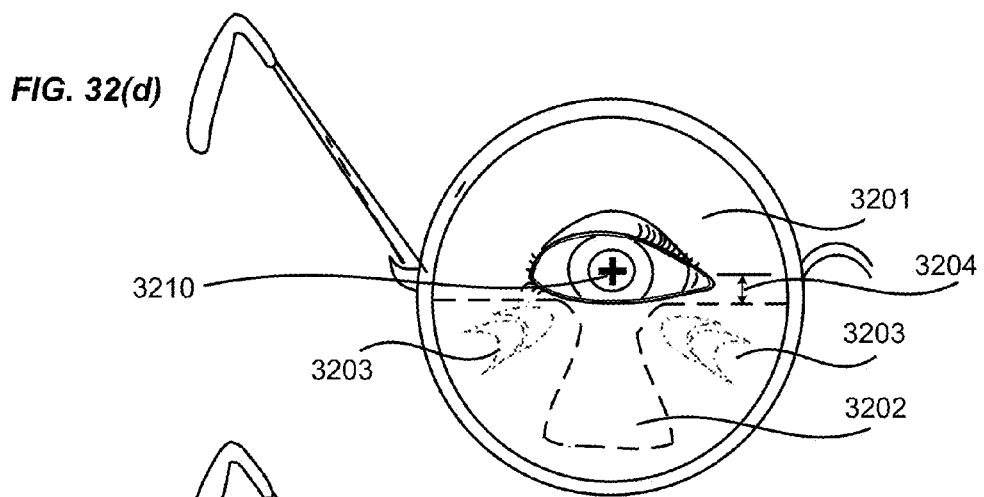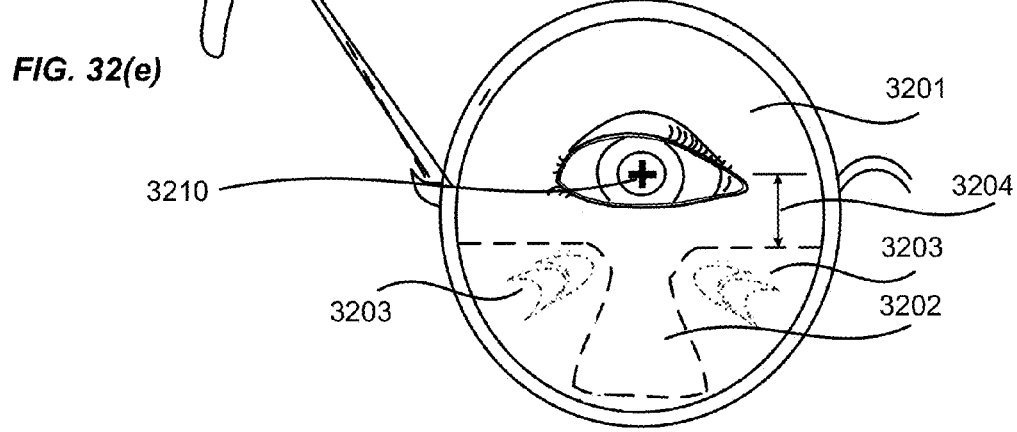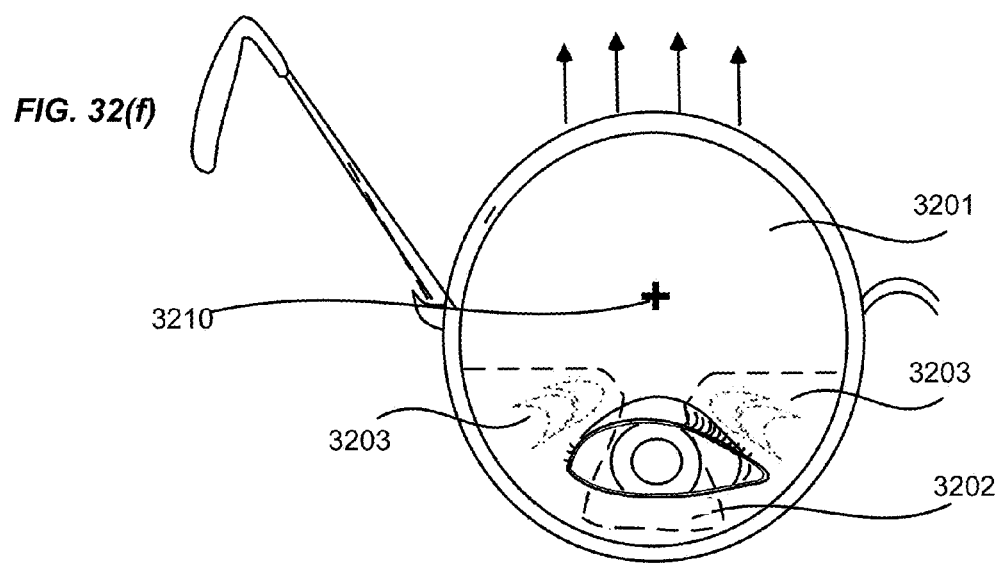

TRANSLATING MULTIFOCAL EYEGLASS LENSES

CROSS-REFERENCES TO RELATED APPLICATIONS

This application claims benefit under 35 U.S.C. §119(e) of U.S. provisional patent application No. 61/420,796, filed on Dec. 8, 2010; U.S. provisional patent application No. 61/452,441, filed on Mar. 14, 2011; U.S. provisional patent application No. 61/509,632, filed on Jul. 20, 2011; and U.S. provisional patent application No. 61/552,506, filed on Oct. 28, 2011. The entire disclosure of each of these applications is incorporated herein by reference for all purposes and in their entireties.

BACKGROUND

Existing multi-focusing eyeglasses, whether lined bifocal, trifocal, or no-lined progressive addition lenses may have disadvantages for certain lifestyle settings such as lying in bed when watching TV and trying to read a book. For example, when reclining in bed, the near area of the wearer's eyeglass lens may interfere with the screen of the TV and blur the TV picture. A wearer may attempt to solve this issue by raising the temples of the eyeglasses high on the wearer's head thus tilting the eyeglasses so that the near area is lowered and is no longer between the eye and the TV. While this may temporarily solve or alleviate the immediate problem it is not an optimal solution. Another example occurs when a wearer is walking up and down stairs. The wearer may attempt to look down at the stairs but in so doing, may look though a portion of the lens that is designed to provide a different optical power—thereby resulting in blurry vision (and perhaps disorientation or injury). Thus, there is need for a pair of eyeglasses that can readily be raised and lowered so to, for instance, allow for many different lifestyle uses of the wearer.

BRIEF SUMMARY

Embodiments provided herein may comprise eyewear, frames, and multifocal lenses that may provide the optical power needed by a wearer for both daytime (i.e. high ambient light conditions) and night time (i.e. low level ambient light conditions) for distance viewing. Embodiments may also provide eyewear such as spectacle eyeglasses and frames for use with multifocal lenses that provide daytime and night time far distance optical powers and that may move or adjust the position of such a lens relative to a wearer's eye. The movement of the frames may be such that the optical zones of the lenses are positioned in front of a wearer's eye (or in a more operable viewing position).

In some embodiments, eyewear may be provided, The eyewear may comprise a lens housing, a first temple and a second temple coupled to the lens housing, and a first and a second lens supported by the lens housing. The lens may comprise a first optical zone having an optical power corresponding to a wearer's far distance day time optical power need and a second optical zone having an optical power corresponding to a wearer's far distance night time optical power need. The eyewear may further comprise a movable member coupled to the lens housing, the first temple, or the second temple, wherein the movable member may be configured to move between a first position and a second position, where a position of the lens may be based at least in part on the position of the movable member. The eyewear may further include a mechanism adapted to adjust the position of the movable member.

In some embodiments, in the eyewear as described above, the lens may comprise an optical power profile. The optical power profile may vary continuously between the first optical zone and the second optical zone. In some embodiments, the optical power profile may vary discretely between the first optical zone and the second optical zone.

In some embodiments, in the eyewear as described above, the lens may have an optical surface that decreases in plus optical power or increases in minus optical power as the distance from the fitting point increases. In some embodiments, the optical surface may be continuous. In some embodiments, the optical surface may be discontinuous.

In some embodiments, in the eyewear as described above, the lens may comprise an optical surface that has a plateau in curvature change for a distance of 1 to 5 mm before it begins to continuously change such to increase minus optical power of the distance zone or decrease plus optical power of the distance zone In some embodiments, in the eyewear as described above, the lens may comprise an optical surface that decreases in distance viewing power as the distance from the fitting point increases. In some embodiments, the optical surface may be continuous. In some embodiments, the optical surface may be discontinuous.

In some embodiments, in the eyewear as described above, the first position of the movable member may correspond to a position of the lens where the first optical zone is disposed in optical communication with the approximate center of the wearer's pupil in the wearer's primary gaze. In some embodiments, the second position of the movable member may correspond to a position of the lens where the second optical zone is disposed in optical communication with the approximate center of the wearer's pupil in the wearer's primary gaze.

In some embodiments, in the eyewear as described above, the first optical zone may provide an optical power for the wearer for a high level of ambient light. In some embodiments, the second optical zone provides an optical power for the wearer for a low level of ambient light.

In some embodiments, in the eyewear as described above, the second optical zone may include less plus optical power or more minus optical power compared to that of the first optical zone.

In some embodiments, in the eyewear as described above, the second optical zone comprises between approximately 0.120 to 1.000 D of less plus optical power or more minus optical power compared to that of the first optical zone.

In some embodiments, in the eyewear as described above, the lens may further include a third optical zone, wherein the third optical zone has an optical power corresponding to a wearer's intermediate distance optical power need. In some embodiments, the lens may further comprise a fourth optical zone that has an optical power corresponding to a wearer's intermediate distance optical power need. In some embodiments, the lens may comprise a progressive addition surface.

In some embodiments, in the eyewear as described above, the lens may further include a third optical zone, where the third optical zone has an optical power corresponding to a wearer's near distance optical power need.

In some embodiments, in the eyewear as described above, the first optical zone and the second optical zone may be disposed at least approximately 3 mm apart. In some embodiments, the first optical zone and the second optical zone are disposed at least approximately 5 mm apart. In some embodiments, the first optical zone and the second optical zone are disposed between approximately 5 mm and 8 mm apart.

In some embodiments, in the eyewear as described above, the optical power of the first optical zone and/or the second optical zone may be approximately constant. In some embodiments, the first optical zone and/or the second optical zone may have a height of at least 2.0 mm. In some embodiments, the first optical zone and/or the second optical zone may have a height between approximately 3.0 mm and 10 mm.

Embodiments may provide a first lens. The first lens may comprise a first optical zone having an optical power corresponding to a wearer's far distance day time optical power need and a second optical zone having an optical power corresponding to a wearer's far distance night time optical power need.

In some embodiments, in the first lens as described above, the first optical zone and the second optical zone may be static.

In some embodiments, the first lens as described above may have an optical power profile. In some embodiments, the optical power profile varies continuously between the first optical zone and the second optical zone. In some embodiments, the optical power profile varies discretely (i.e. discontinuously) between the first optical zone and the second optical zone.

In some embodiments, in the first lens as described above, the first lens may have an optical power profile. The optical power profile may provide an optical power plateau near and around the fitting point. In some embodiments, the optical power profile may vary continuously as the distance on the lens increases from the fitting point.

In some embodiments, the first lens as described above may include a continuously variable optical surface that decreases in distance viewing power as the distance from the fitting point increases.

In some embodiments, the first lens as described above may include a continuously variable optical surface that decreases in plus optical power or increases in minus optical power as the distance from the fitting point increases.

In some embodiments, in the first lens as described above, the first optical zone may provide an optical power for the wearer for a high level of ambient light. In some embodiments, the second optical zone may provide an optical power for the wearer for a low level of ambient light.

In some embodiments, in the first lens as described above, the second optical zone may have less plus optical power or more minus optical power compared to that of the first optical zone. In some embodiments, the second optical zone may have between approximately 0.120 to 1.000 D of less plus optical power or more minus optical power compared to that of the first optical zone.

In some embodiments, in the first lens as described above, the first lens may include a third optical zone. In some embodiments, the third optical zone may have an optical power corresponding to a wearer's intermediate distance optical power need. In some embodiments, the lens may include a fourth optical zone, where the fourth optical zone may have an optical power corresponding to a wearer's near distance optical power need. In some embodiments, the lens may comprise a progressive addition surface.

In some embodiments, the first lens as described above may further include a third optical zone, where the third optical zone has an optical power corresponding to a wearer's near distance optical power need.

In some embodiments, in the lens as described above, the optical power of the first optical zone and/or the second optical zone may be approximately constant. In some embodiments, the first optical zone and/or the second optical zone may have a height of at least 2.0 mm. In some embodiments, the first optical zone and/or the second optical zone may have a height between approximately 3.0 mm and 10 mm.

In some embodiments, a first lens may be provided. The first lens may include a fitting point and an optical surface that provides a first optical power zone, a second optical power zone, and a third optical power zone. The first optical power zone may correspond to the optical power provided by the optical surface at the fitting point. The second optical power zone may correspond to the optical power provided by the optical surface at a distance of between approximately 3.0 mm and 5.0 mm above the fitting point. The third optical power zone may correspond to the optical power provided by the optical surface at a distance of between approximately 3.0 mm and 5.0 mm below the fitting point. The second optical power zone may provide more minus or less plus optical power than the first optical zone, and the third optical power zone may provide less minus or more plus optical power than the first optical power zone.

In some embodiments, in the first lens as described above, the optical power provided by the first optical zone may correspond to the wearer's day time distance vision.

In some embodiments, in the first lens as described above, the optical surface may provide a continuous optical power between the first optical power zone, the second optical power zone, and the third optical power zone.

In some embodiments, the first lens as described above may further include a fourth optical power zone, where the fourth optical power zone is disposed between approximately 6.0 mm and 25 mm away from the fitting point. In some embodiments, the fourth optical zone may correspond to the near distance vision of the wearer.

In some embodiments, a first lens may be provided. The first lens may comprise a fitting point and an optical surface that provides a first optical power zone and a second optical power zone. The first optical power zone may correspond to the optical power provided by the optical surface at the fitting point. The second optical power zone may correspond to the optical power provided by the optical surface at a distance of between approximately 3.0 mm and 5.0 mm above the fitting point. The second optical power zone may provide more minus or less plus optical power than the first optical zone.

In some embodiments, in the first lens as described above, the optical power provided by the first optical zone may correspond to the wearer's day time distance vision.

BRIEF DESCRIPTION OF THE DRAWINGS

FIGS. 1(a)-(f) show various eye positions of a wearer of eyewear and corresponding exemplary pupil positions for the various gaze directions.

FIGS. 32(a)-(i) generally show illustrations of different positions of adjustable eyewear and the corresponding position of optical zones of the lens relative to the eye in accordance with some embodiments. FIGS. 32(a)-(c) show an exemplary lens comprising discrete optical zone in accordance with some embodiments. FIGS. 32(d)-(f) further show exemplary lenses comprising a long channel progressive addition surface in accordance with some embodiments.

FIGS. 32(g)-(i) further show exemplary lenses comprising a short channel progressive addition surface in accordance with some embodiments.

DETAILED DESCRIPTION

Figure 2:
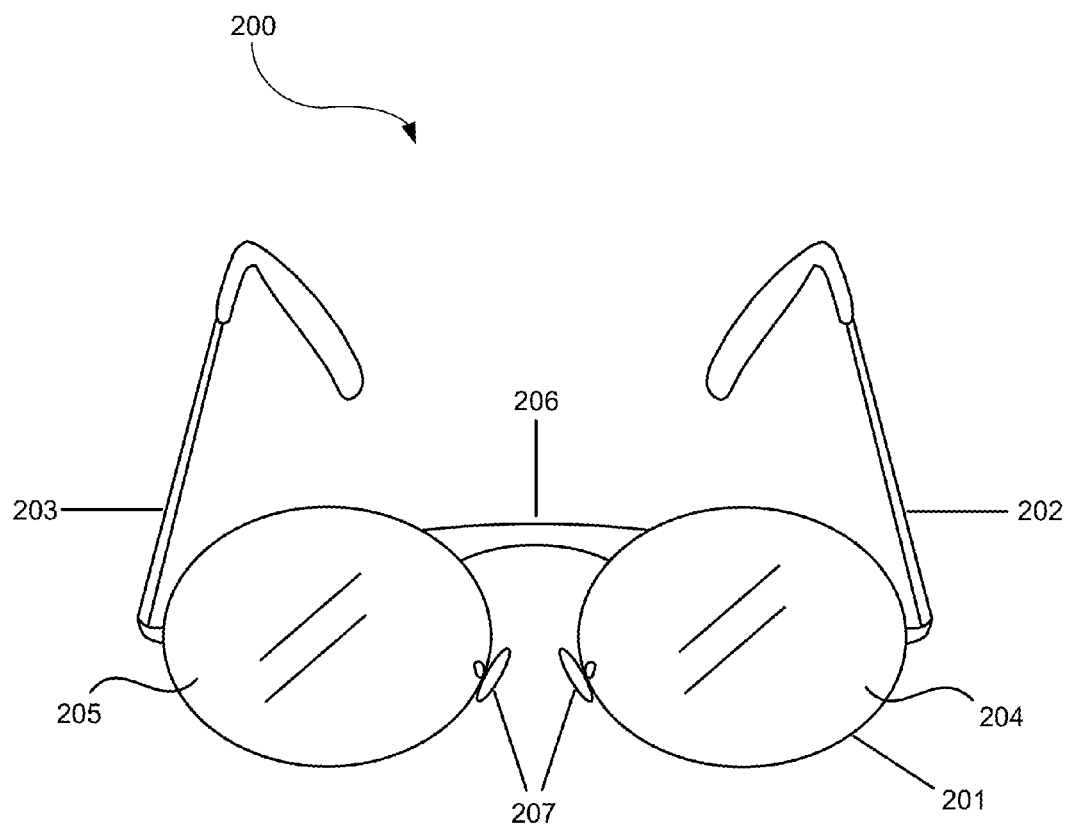
FIG. 2 shows a front view of exemplary eyewear in accordance with some embodiments.

Some terms that are used herein are described in further detail as follows:

As used herein, "add power" may refer to the optical power added to the far distance viewing optical power which is required for clear near distance viewing in a lens. For example, if an individual has a far distance viewing prescription of −3.00D with a +2.00D add power for near distance viewing then the actual optical power for near distance is −1.00D. Add power may sometimes be referred to as plus power. Add power may be further distinguished by referring to "near viewing distance add power," which refers to the add power in the near viewing distance portion of the optic and "intermediate viewing distance add power" may refer to the add power in the intermediate viewing distance portion of the optic. Typically, the intermediate viewing distance add power may be approximately 50% of the near viewing distance add power. Thus, in the example above, the individual would have +1.00D add power for intermediate distance viewing and the actual total optical power in the intermediate viewing distance portion of the optic is −2.00D.

As used herein, the term "approximately" may refer to plus or minus 10 percent, inclusive. Thus, the phrase "approximately 10 mm" may be understood to mean from 9 mm to 11 mm, inclusive.

As used herein, a "bridge" may refer to a part of the frame that fits over/superior to the wearer's nose. The bridge is usually found between the portion of the lens housing that supports the right lens and the portion of the lens housing that supports the left lens, or is between the right and left lenses themselves. In some embodiments, the bridge may comprise a portion of the lens housing.

As used herein, the "channel" may refer to the region of a progressive addition lens (PAL) defined by increasing plus optical power which extends from the start of the plus optical power to the near distance optical power region or zone (e.g. the total add power zone or region). The channel is sometimes referred to as the corridor.

As used herein, the "channel length" may refer to the distance measured from the location on the lens of the start of the plus optical power to the location in the channel where the add power is within approximately 90% of the specified near distance viewing power or the point in which maximum add power of the progressive is reached.

As used herein, the term "comprising" is not intended to be limiting, but may be a transitional term synonymous with "including," "containing," or "characterized by." The term "comprising" may thereby be inclusive or open-ended and does not exclude additional, unrecited elements or method steps. For instance, in describing a method, "comprising" indicates that the claim is open-ended and allows for additional steps. In describing a device, "comprising" may mean that a named element(s) may be essential for an embodiment, but other elements may be added and still form a construct within the scope of a claim. In contrast, the transitional phrase "consisting of" excludes any element, step, or ingredient not specified in a claim.

As used herein, "coupled" may refer to any manner of connecting two components together in any suitable manner, such as by way of example only: attaching (e.g. attached to a surface), disposing on, disposing within, disposing substantially within, embedding within, embedded substantially within, etc. "Coupled" may further comprise fixedly attaching two components (such as by using a screw or embedding a first component into a second component during a manufacturing process), but does not so require. That is, two components may be coupled temporarily simply by being in physical contact with one another. Two components are "electrically coupled" or "electrically connected" if current can flow from one component to another. That is, the two components do not have to be in direct contact such that current flows from the one component directly to the other component. There may be any number of other conductive materials and components disposed electrically between two components "electrically coupled" so long as current can flow there between.

As used herein, a "dynamic lens" may refer to a lens having an optical power that is alterable with the application of electrical energy, mechanical energy or force.

As used herein, "eye-wire" may refer to the rim that surrounds the lens of a spectacle frame. Eye-wire may comprise a portion of the lens housing that holds one lens (a right or a left) in a full rimmed or semi-rimless frame. There may be two eye-wires for the lens housing. However in a completely rimless frame there are no eye wires.

As used herein, a "far viewing distance," "far distance" may refer to the distance to which one looks (the wearer), by way of example only, when viewing beyond the edge of one's desk, when driving a car, when looking at a distant mountain, or when watching a movie. This distance is usually, but not always, considered to be approximately 10 feet or greater from the eye of wearer. The far viewing distance may also be referred to as a far distance and a far distance point. Intermediate distance may be considered to be between 4 feet and 20 inches from the wearer's eyes. Near distance may be considered to be between approximately 20 inches and 12 inches from the wearer's eyes.

As used herein, the "fitting point" of the lens may refer to the location of the lens that is disposed at or near (i.e. within 2.0 mm of) the center of the wearer's pupil for the wearer's primary gaze when comfortably viewing distance vision. The wearer's "primary gaze" (as shown in FIGS. 1(a) and (b)) may refer to when the user is looking in a direction that is substantially perpendicular to the plane of the lens during normal viewing (i.e. when the wearer is not looking in an upward (as shown in FIGS. 1(c) and (d)) or downward (as shown in FIGS. 1(e) and (f) direction). In this context, reference to the "approximate center" may refer to within 2 mm of the center of the pupil. This adjustment is meant to take into consideration the irregularities in the shape and size of the pupil of the wearer, which may not therefore by symmetric.

Figure 32A:
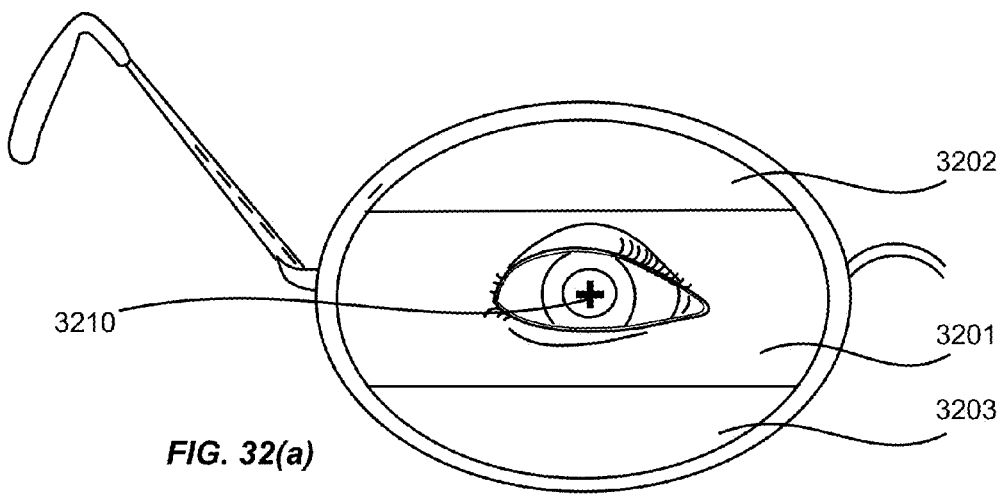
Figure 32B:
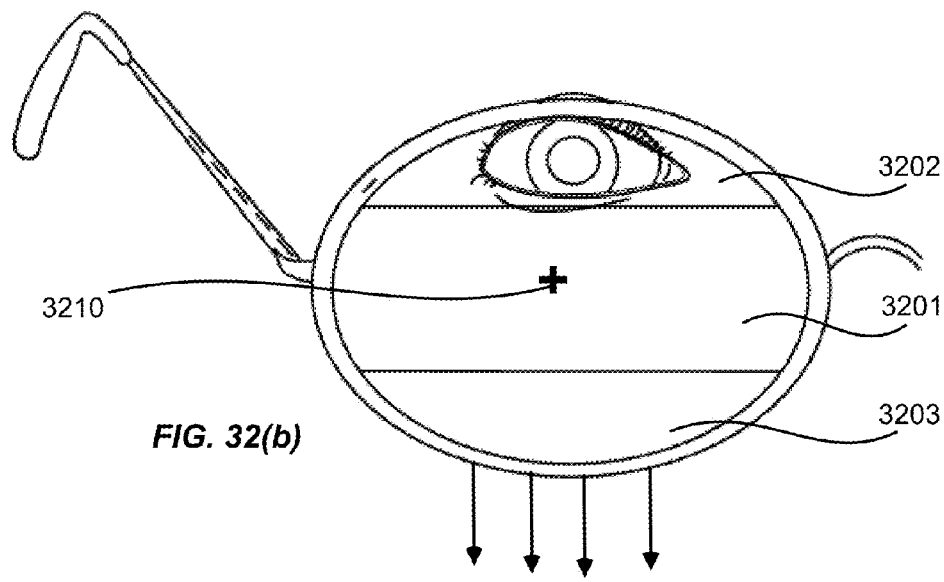
Figure 32C:
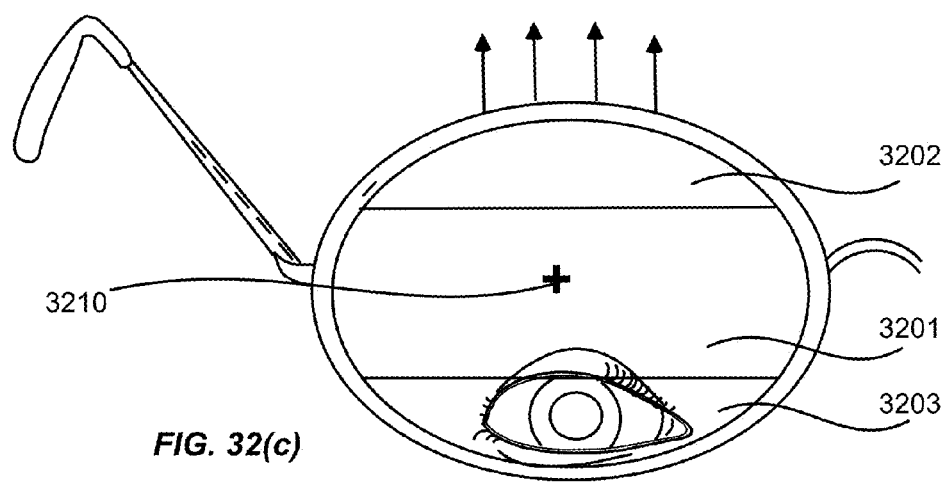

The fitting point, as used herein, is further illustrated as element 3210 in FIGS. 32(a)-(c). As shown in FIG. 32(a), the lens is in a first position such that the first optical zone 3201 (which for this exemplary embodiment corresponds to the distance viewing zone) is in optical communication with the wearer's pupil in the primary gaze. The fitting point 3210 is therefore at the location of the lens corresponding to the approximate center of the wearer's pupil in the primary gaze. When the lens is lowered (as is shown in FIG. 32(b) with the downward arrows), the fitting point 3210 remains in the same position on the lens, while the lens moves down relative to the wearer's eye. Thus, in this second position shown in 32(b), the fitting point 3210 is disposed at a distance below the approximate center of the pupil in the wearer's primary gaze. That is, the wearer's primary gaze now places his pupil in optical communication with the second optical zone 3202. Similarly, when the lens is raised (as is shown in FIG. 32(c) with the upward arrows), the fitting point 3210 remains in the same position on the lens, while the lens moves upward relative to the wearer's eye. Thus, in this third position shown in 32(c), the fitting point 3210 is disposed at a distance above the approximate center of the pupil in the wearer's primary gaze. That is, the wearer's primary gaze now places his pupil in optical communication with the third optical zone 3203.

It should be noted that although the fitting point has a general meaning known in the art for lenses located or housed in static frames, because embodiments herein may comprise a dynamic and movable frame, the fitting point has been defined in this particular way to establish a reference point for describing the movement of the lenses. However, a person of ordinary skill in the art may understand that one could move the fitting point anywhere on the lens by repositioning the frame or the eyeglasses. Therefore, by defining the fitting point in this manner (i.e. using the primary gaze of the wearer and the distance vision optical power zone), it is meant to take this consideration into account.

As used herein, a "fluid" may refer to a continuous, amorphous substance whose molecules may move freely past one another and that has the tendency to assume the shape of its container. This may include, for example, a liquid, gas, or gel.

As used herein, a "fluid holding element" may refer to any component that may retain (or otherwise contain) a fluid. For instance, a fluid holding element may comprise a reservoir where excess fluid (or fluid that is not in use) may be held for later use. An example of a fluid container element may comprise a bladder—which refers to a device that may increase or decrease the amount of fluid that is held therein by, for example, changing its shape or size (e.g. expanding or contracting).

As used herein, a "frame" may refer to a complete wearable housing that secures both spectacle lenses and aligns them in the proper place relative to the wearer's eyes when being worn. The frame may comprise elements such as a first and second temple, as well as the lens housing that is configured to support the spectacle lenses.

As used herein, a "full rimmed frame" or "fully rimmed" may refer to a frame that comprises a lens housing having a complete rim that encapsulates or encircles the first and second lens (i.e. the lens housing comprises full eye-wires).

As used herein, a "hinge" may refer to the part of the frame that allows for connecting the lens housing and the temples in such away that the lens housing and the temple can open and close against the lens housing on its posterior side when not being worn. In some embodiments, the hinge may connect directly to the lens.

As used herein, a "hinged temple" may refer to a side piece of a frame that connects to the lens housing (or directly to the lens) by way of a hinge, and further provides stability by resting on the wearer's ears when worn.

As used herein, a "hinge-less temple" may refer to a side piece of a frame that connects to the lens housing (or directly to the lens) without a hinge, and further provides stability by resting on the wearer's ears when worn.

As used herein, an "intermediate viewing distance" may refer to the distance to which one looks, by way of example only, when reading a newspaper, when working on a computer, when washing dishes in a sink, or when ironing clothing. This distance is usually, but not always, considered to be between approximately 20 inches and approximately 4 feet from the eye. The intermediate viewing distance may also be referred to as an intermediate distance and an intermediate distance point.

As used herein, a "lens" may refer to any device or portion of a device that causes light to converge or diverge. A lens may be refractive or diffractive. A lens may be concave, convex or plano on one or both surfaces. For the purposes of this invention disclosure a plano lens is also considered that of a prescription lens. A lens may be spherical, cylindrical, prismatic or a combination thereof. A lens may be made of optical glass, plastic or resin. A lens may also be referred to as an optical element, an optical zone, an optical region, an optical power region or an optic. It should be noted that within the optical industry a lens can be referred to as a lens even if it has zero optical power. An optical zone can also be that of an optical region.

As used herein, a "lens housing" may refer to a part of the frame that is configured or adapted to support or hold the first and the second lenses in place (preferably firmly in place). The lens housing may also comprise the part of the frame to which the temples attach. The lens housing may comprise any component or material adapted to support the lenses, including, for example, screws, nylon monofilament, eye-wire, etc. or any combination thereof. The lens housing may comprise any material, including metal or plastic. A lens housing may be included in any type of frame design, including fully rimmed, semi-rimless, and rimless. In some embodiments, the lens housing may also include the bridge, such as when the lens housing comprises a single component or two components that support both the first and the second lens. Moreover, as used herein, reference to a "lens" also includes any suitable optic or optical component. That is, the lens housing may hold any optical component, and need not necessarily comprise a lens that has a focal point (e.g. a lens could include a piece of glass or plastic that may serve any purpose). For example, a "lens" as used herein may refer to optical components that may project or maintain an imaginary image perceivably by viewer and/or be used in heads-up displays, video games, checking electronic mail, and/or any other suitable manner.

As used herein, a "lens housing end piece" may refer to a part of the lens housing farthest away from the bridge and spatial to the bridge. Each frame typically has two lens housing end pieces: one on the spatial side of the right lens and one on the spatial side of the left lens.

As used herein, "memory," "memory devices," or "storage devices" may refer to any mechanical, magnetic, electronic, and/or electrical component that may comprise a storage device that preserves information for retrieval and or use. Memory may include both volatile non-volatile memory devices. The memory may be static or dynamic. For example, memory may refer to ROM, RAM, DRAM, SRAM, flash memory, etc. Memory may also comprise any suitable device or device such that the memory may be stored, accessed, retired, and utilized by one or more components.

As used herein, a "metal frame" may refer to a frame that comprises mostly metal.

As used herein, a "movable member" may refer to any device or component that may move (e.g. relative to the lens housing, a wearer's face, or in relation to another component), extend, contract, increase or decrease in size (e.g. in a direction relative to the lens housing), and/or may be rotated. For instance, a movable member may comprise a spring that may compress (e.g. contract) or uncompress (e.g. extend or expand) in one or more directions based on a force applied thereto. In some instances, a moveable member may comprise a component that could rotate. For example, a nose piece (e.g. the nose pad that contacts the wearer's nose) could have dimensions such that when rotated from a first position to a second position, a different portion of the nose pad contacts the wearer's nose and the lenses may thereby change position.

A movable member may also refer to a component that may be moved in a direction relative to the lens housing. For instance, a micro-motor, a spring, a micro-pump (e.g. via a fluid), and/or the wearer (via a mechanism such as a wire, pulley system, fluid, etc) may apply a force to move the movable member in one particular direction (e.g. away from the lens housing), and/or retract the movable member in the opposite direction. As another example, the movable member may comprise one or more components that may be moved relative to one another such that the position of the lens housing may be adjusted based on this relative distance, such as for instance, when the movable member comprises a plurality of nose pads that may be moved closer or further apart in relation to one another to change the location that each contacts the wearer's face. A movable member may also refer to a member that may have a size or shape that varies. For instance, the movable member may have a first size or shape when fluid is applied to the movable member (e.g. when fluid or pressure expand the component) and a second, different size when the movable member contracts (e.g. with the removal of pressure or fluid).

As used herein, a "near viewing distance" may refer to the distance to which one looks, by way of example only, when reading a book, when threading a needle, or when reading instructions on a pill bottle. This distance is usually, but not always, considered to be between approximately 12 inches and approximately 20 inches from the eye. The near viewing distance may also be referred to as a near distance and a near distance point.

As used herein, "optical communication" may refer to the condition whereby two or more optics of given optical power are aligned in a manner such that light passing through the aligned optics experiences a combined optical power equal to the sum of the optical powers of the individual elements.

As used herein, a "rimless frame" may refer to a frame that is designed having a lens housing that does not comprise eye-wires. That is, for instance, the lens housing does not comprise eye wires but may comprise, for instance, nylon monofilament wire, screws, or other material to hold the lenses in place.

As used herein, "semi-automatically" may refer to when a wearer sends a signal to a mechanism (e.g. via a push button, touch switch, tilt switch—e.g. based on a predefined head movement which is not a typical or a normal movement of the head (such as a quick jerk or jerks of the head), etc) to activate so as to adjust the position of the movable member. The signal may be electrical or mechanical. After receiving the user input, the mechanism may then adjust the position of the movable member (e.g. the user does not supply the force that adjusts the movable member and thereby the lens housing or lenses, but may provide an indication that the adjustment should be made). As used herein, "automatically" may refer to when input is received by a mechanism based on a sensor or other automated system for determining when the mechanism is to be activated without receiving a direct indication from the user. For example, the automatic input may be generated by a tilt switch (such as a micro-accelerometer or micro-gyroscope) that can determine the direction of a wearer's gaze (in contrast to the quick jerk that may be used as an express indication of the user), one or more photodiodes that may detect the level of ambient light available, rangefinder for determining a viewing distance, a device to measure the dilation of the wearer's pupil, etc. The mechanism may then adjust the position of the movable member, without the user applying the force that adjusts the position. In this manner, the position of the lens may be adjusted without any input or force provided by the wearer. As used herein, "manually" may refer to when the position of the movable member may be adjusted by the wearer, where the wearer applies the actual force that adjusts the position of the movable member (in contrast to applying a force to signal a mechanism to adjust the position).

As used herein, a "semi-rimless frame" may refer to a frame that has a lens housing that comprises partial rim (i.e. eye-wire that does not completely encapsulate or encircle the lens) and/or may have a nylon monofilament wire or similar feature that secures the lenses to the frame.

As used herein, a "static lens" or 'static optic" may refer to a lens having an optical power which is not alterable with the application of electrical energy, mechanical energy or force. Examples of static lenses include spherical lenses, cylindrical lenses, Progressive Addition Lenses, bifocals, and trifocals. A static lens may also be referred to as a fixed lens. A lens may comprise a portion that is static, which may be referred to as a static power zone, segment, or region.

As used herein, a "temple end piece" may refer to a part of the temple that is found farthest away from the lens housing. The temple end piece usually begins behind the ear of the wearer and ends at the end of the temple that is located farthest away from the lens housing, but this is not required.

As used herein, a "Zyle frame" may refer to a frame that comprises mostly plastic As used herein, reference to a "first" or a "second" does not limit the referenced component to a particular location unless expressly stated. For instance, reference to a "first temple" may comprise the temple located on either the left side or the right side of a wearer's head.

Note that throughout the description and exemplary embodiments provided herein, reference may be made to devices that comprise a "lens." This is not intended to be limiting, and in general, the embodiments and exemplary devices, eyewear, and combinations of lenses and frames may include one or more lenses (and typically will comprise two lenses). While the optical power or powers provided by the lenses of a device may be substantially identical or similar, in some embodiments, a patient may have different prescription or optical needs for different eyes. Embodiments disclosed herein may comprise any suitable form of eyewear, including by way of example, reading glasses, eyeglasses prescription glasses, sub glasses, prescription sun glasses, occupational eye glasses, gaming or entertainment glasses, etc.

Embodiments provided herein may comprise eyewear (such as spectacle frames or eyeglasses) that may move or adjust the position of the lenses of the eyewear relative to a wearer's eyes. The movement of the frames may be such that one or more optical zones of the lenses are positioned in front of a wearer's eye (or in a more operable viewing position) when desired or needed. Embodiments may comprise a movable member that may be utilized to adjust the position of the lenses (e.g. by moving the lens housing), as well as various mechanisms for adjusting the position of the movable member. The moveable member may comprise, for example, a spring (that may extend or contract), one or more nose pieces or a portion thereof (e.g. the nose pads could extend away from the nose pieces/bridge, rotate, change in size or shape, etc.), a portion of the bridge (or a component housed within the bridge), or any other suitable component. A mechanism may adjust the position of the movable member in an automatic, semi-automatic, or manual manner. Some embodiments may also provide such eyewear that is aesthetically pleasing and/or stylish, whereby components of the movable member (and/or mechanism for adjusting the position of the movable member), are not visible or are less conspicuous than previous designs.

In this regard, some of the embodiments disclosed herein may include eyewear that may have the capability of adjusting the lenses relative to the wearer's eye while still maintaining the aesthetic and stylistic appeal of the eyewear. In today's society, the style and appearance of eyeglasses is often a consideration to the wearer, as evidenced by the numerous different types of frame styles, sizes, and colors that eyeglass frames are made available. Often times a wearer will choose the frames that they would like before receiving or determining the prescription of the lenses that they need. In this regard, some embodiments disclosed herein may also provide the benefit of both having the capability to adjust the location of a lens (such as a multifocal optical lens) relative to the wearer's eye so as to, for instance, improve the viewing of objects at different distances or in different viewing conditions, while comprising components that are (or may be) masked, concealed, or otherwise integrated in a stylistic and/or non-conspicuous manner.

By way of example only, some embodiments may utilize mechanical or electro-mechanical components that may be disposed in one or both of the temples of the frames that may be used to apply a force to a movable member disposed on the lens housing (or even one of the temples). In some embodiments, the force may be applied utilizing a cavity in the temples and/or lens housing that may enable the mechanisms to be operatively coupled to the movable member (e.g. the cavity may allow fluid to move from the temple to the lens housing, or may allow for mechanical interactions such as a wire or pulley system to apply force). Embodiments may also dispose components on the inside surface of the frames (e.g. so as to be disposed between the wearer and the frames) to further conceal these components from an outside observer. By disposing components inside (or coupled to) the temple, embodiments may reduce the number of components on the more conspicuous lens housing (such as in the bridge), as well as to permit a wider distribution of components throughout the frame. Some embodiments may also thereby reduce the size of the bridge of the lens housing, and may thereby allow for a greater number of styles and frame designs to be used. However, embodiments are not so limited, and in some instances one or more components may be disposed on the lens housing.

In addition, the inventors have recognized that for every day use, it may be beneficial to allow for the eyewear to adjust the position of the lenses automatically or semi-automatically. This may, for instance, reduce the amount of effort and focus that a wearer of the eyewear must provide to adjust the glasses and obtain optimum viewing performance from the lenses. For instance, if a user is driving a vehicle, it may not be possible or prudent for him to safely adjust the position of the glasses. The use of automatic and semi-automatic systems in some embodiments may allow for these adjustments to be continuously made, or to be made without the wearer losing his concentration on operating the vehicle. Moreover, the use of such systems may also increase the convenience for the wearer by reducing the time it may take to change the position of the lenses, and may also remove the burden on the wearer having to constantly adjust the lens position for optimum viewing. Moreover, the use of automatic and semi-automatic systems may reduce the overall size of the components needed, which may increase the aesthetic appeal of the frames, as noted above.

The inventors have also found that in some embodiments a fluid may be used to adjust the position of the lenses (whether through manual or automatic/semi-automatic devices or components). This may also provide benefits with regard to the aesthetic appearance of the eyewear, as well as potentially reducing the complexity of the components of the device itself. For example, the use of a fluid to apply pressure/force to a movable component may reduce the number of moving components (particularly micro-components) of the device and may thereby make a more reliable and less expensive device. In addition, the inventors have discovered that integrating the components for holding the fluid into the temples and/or using a sealed system (which may reduce the size of the components and/or the amount of fluid needed for the device), the mechanism may be masked or hidden by the frames. Some embodiments may also reduce the size and/or number of components that may be disposed on the lens housing (for instance in the bridge) and thereby enable different style of frames and lens housing to be used.

Although some devices have been proposed that may adjust the position of the lens relative to the eye, these devices may not provide some of the advantages noted above and may thereby be less then ideal for practical use. For example, U.S. Pat. No. 3,365,263 to Allen (hereinafter "Allen") discloses a movable frame that utilizes a fluid and a fluid container. To adjust the position of the frames, the wearer must open a valve on the fluid container, and the pressurized fluid is then used to extend a large component from the bridge down onto the nose of the wearer (thereby applying a force). However, as shown in the figures, such a system would not be aesthetically pleasing, nor would it necessarily allow for easy modification and setting of the position of the lenses (e.g. it may require the user to open various valves multiple times until the desired position is obtained). Moreover, Allen does not utilize a sealed system for the fluid, but instead after the fluid is applied to the bellows chamber in the bridge of the frames, the wearer must then release this air by opening another valve. Thus, as shown in FIG. 1 in Allen, the fluid container is relatively large in comparison to the frames, and would likely need to be continually refilled with pressurized fluid throughout the lifetime of the device. Indeed, the fluid container element in Allen is designed to be carried separately by the user, or to be clipped to the temple. Thus, it is clear that utilizing such a system would not be difficult in use, and would be less then ideal for providing aesthetically pleasing and stylistic eyewear. In contrast, some of the embodiments provided herein may utilize components that may be disposed within, or integrally coupled to the temple or frames of the eyewear, and thereby be less conspicuous. In addition, Allen provides only a "push-push: actuator mechanism (i.e. it only supplies a "push" force) and does not provide a "push-pull" actuator mechanism (i.e. apply a force in two directions). This approach may be less then ideal as it may require a significant amount of effort and attention by the user to adjust the height of the frames. In addition, the mechanism disclosed in Allen may be relatively slow in moving back down to the first position of the lens relative to that of the viewer's eyes.

Another example of a device that comprises movable frames is shown in U.S. Pat. No. 4,280,758 to Fladder et al. (hereinafter "Fladder"). Fladder utilizes a push-push mechanism that is disposed in the bridge of the lens housing of the eyewear. However, the push-push mechanism as disclosed in Fladder comprises a relatively large mechanical structure that is disposed within the bridge of the lens housing. Thus, the push-push mechanism as disclosed in Fladder would always require that a large bridge component be included, which may thereby limit the style and aesthetics of the eyewear available. For example, some style of frames may comprise a bridge that has a diameter of 2.0 mm or less, and therefore such a push-push mechanism as shown in Fladder would not be practical to be used in such frame designs. Moreover, the use of a push-push mechanism may make it difficult to customize the positions of the lenses for each wearer of the device because, for example, the mechanical structure of the push-push mechanism would have to be adjusted or replaced so as to adjust the different positions of the lenses provided by the device. In contrast, some of the embodiments discussed above may utilize components that may continually or variably adjust the height of the lenses, and thereby a single design or set of components could be used in multiple frames for different wearers.

It should be noted that the advantages, apparatuses, and components that were discussed above were done so for exemplary purposes only. Embodiments provided herein may provide some, all, or none of the benefits listed above and/or may comprise some, all, or none of the features and components described above, depending on the characteristics and implementation of the particular embodiment.

Figure 3:
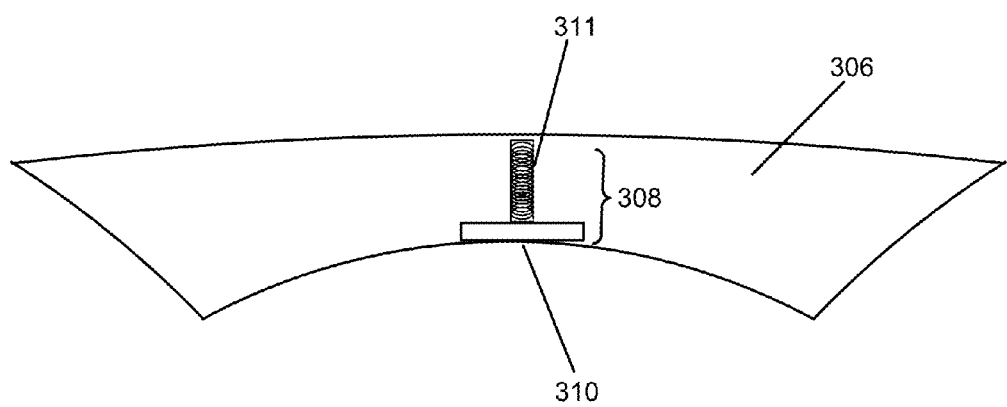
FIG. 3 shows an exemplary bridge component of eyewear in accordance with some embodiments.

With reference to FIGS. 2-13, exemplary embodiments of that may adjust the position of the lens relative to the wearer's eyes will be described. With reference to FIGS. 2 and 3, in some embodiments, eyewear 200 may comprise a first temple 202, a second temple 203, a lens housing 201, one or more nose pads 207, and a movable member 308 that may adjust the position of the lenses 204 and 205 relative to the wearer's eyes. The lens housing 201 may include a bridge 206/306 that may house a spring-loaded element that causes a bridge component (i.e. a movable member 308) to extend downward against the nose of the wearer causing the eyeglass frames to rise above the nose (i.e. move from a first position to a second position). When this occurs, this may effectively raise the eyeglass lenses 204 and 205 relative to the eyes by way of raising the top of the lens housing 201 above the nose. In some embodiments, where the lenses 204 and 205 comprise a traditional bifocal, trifocal, or progressive addition lens, the raising of the lens housing 201 may bring, by way of example only, the near distance (i.e. near point region) of the lenses 204 and 205 into view so that the wearer may view near distance objects.

In some embodiments, the wearer may then manually press on the top of the bridge 206 or the lens housing 201, thereby putting pressure on the eyeglass frame, which may cause the spring-loaded element 308 (e.g. the movable member) to be compacted back within the bridge 206/306 of the eyeglass frame and effectively cause the eyeglass frame to lower to its original position on the face of the wearer. This may, in some exemplary embodiments, return the near region of the bifocal, trifocal, or progressive addition lens to its first position (which may be out of the view of the wearer—e.g. when watching TV—and may, for instance, eliminate any previous blurring that was created by having the near distance vision optical zone in front of the pupil.

Figure 4:
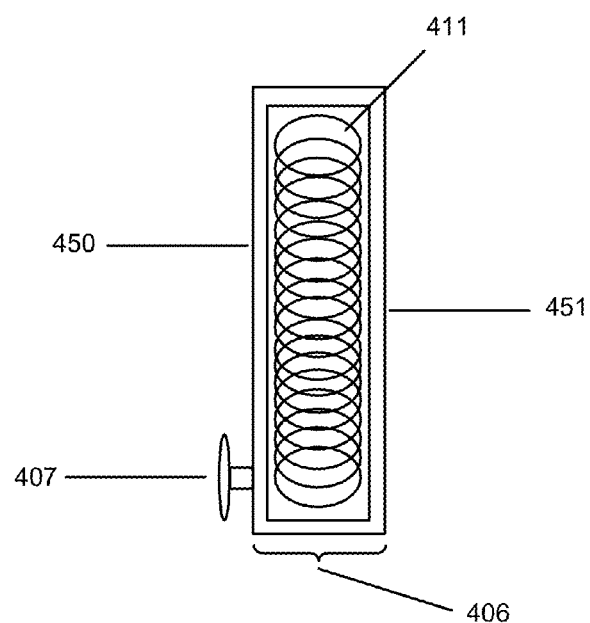
FIG. 4 shows an exemplary spring component that may be utilized in accordance with some embodiments.

With further reference to FIG. 3, in some embodiments, the spring-loaded element 308 may be located in the middle of the lower part of the bridge 306 closest to the nose, or it may have components disposed an equal distance to the left and right of the middle lower part of the bridge 306. That is, the spring loaded element 308 or elements may comprise one element or multiple elements that press against the top of the nose. In some embodiments, the spring-loaded element 308 may incorporate one spring 311 or multiple springs. FIG. 4 shows a side view of an exemplary bridge 406 having a back side 450 (i.e. the side that is closest to the wearer's face) and a front side 451. The bridge 406 includes a spring loaded element comprising spring 411 that may enable it to extend, and thereby raising or lowering the lenses. The spring loaded element may be may be contained be contained by, for instance, a trap door or other mechanism, which may be activated based on, for example, a wearer pressing the button 407. The button may be on the side of the bridge 406 that is closest to the wearer's face (e.g. side 450) to mask or hide this feature. By way of example, when using such an embodiment, the frame may be pressed back against the face thus mechanically activating the trap door (by way of example only a spring, ball bearing, slide mechanism) and allowing the spring-loaded element to expand downward against the nose thus raising the eyeglass frame. When a force is applied that contracts the spring 411, the spring loaded element may again be disposed within the bridge 406, and the trap door other mechanism may reengage to prevent the spring loaded element from applying a force to the wearer's face. Thus, when the wearer wishes to (by way of example only) watch TV (or view a different optical zone of the lenses), the wearer presses down on the top of the bridge 406 causing the eyeglass bridge 406 to put pressure on the nose that will reset and retract the spring-loaded element within the housing of the bridge 406. This moves the eyeglass frame back to its original resting place on the nose of the wearer.

Figure 5:
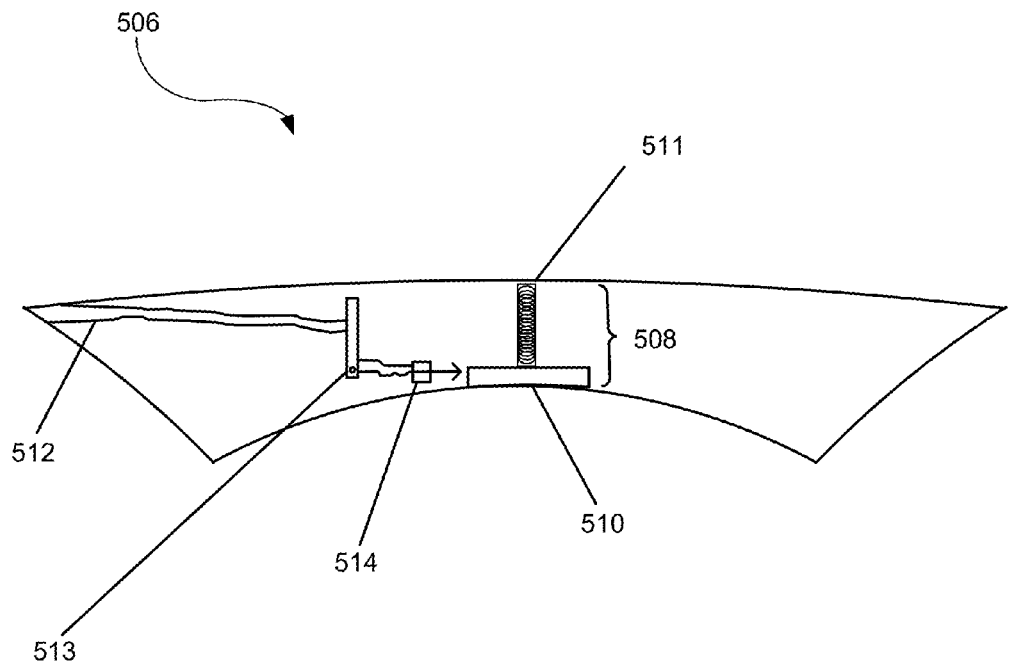
FIG. 5 shows an exemplary bridge of the eyewear and components that may be disposed in the bridge in an exemplary embodiment.

With reference to FIG. 5, another exemplary embodiment is shown. In this exemplary embodiment, a sensing device such as a micro-accelerometer or micro-gyroscope 513 may be incorporated into the bridge 506 (or may be disposed on another portion of the frame and may be electrically coupled to the bridge 506). The micro-accelerometer or gyroscope 513 may control an actuator 514 that opens and shuts the trap door like feature 510 that allows (or inhibits) the spring-loaded element 508 (comprising spring 511) to move downward against the nose of the wearer thus raising the eyeglass frame as well as the eyeglass lenses. The micro-accelerometer or gyroscope 513 may be powered by, for instance, a battery and/or a solar cell or cells located in any suitable location including the eyeglass frame front (i.e. lens housing), bridge, or temple, and be electrically coupled via one or more electrical leads 512 (which may be disposed in the frame or coupled thereto). In some embodiments, the micro-accelerometer or gyroscope 513 may sense a deliberate twitch (or multiple twitches) of the wearer's nose, which will activate the micro accelerometer 513 and cause the actuator 514 to open the trap door 510, thus lowering the spring loaded element 508 and raising the eyeglass frames. The sensing may occur when the wearer twitches their nose thus causing a quick upward and downward force that is sensed by the micro-accelerometer 513. The micro-accelerometer 513 may be located anywhere within the eyeglass frame, although is shown in the bridge 506 for illustration purposes.

Figure 6:
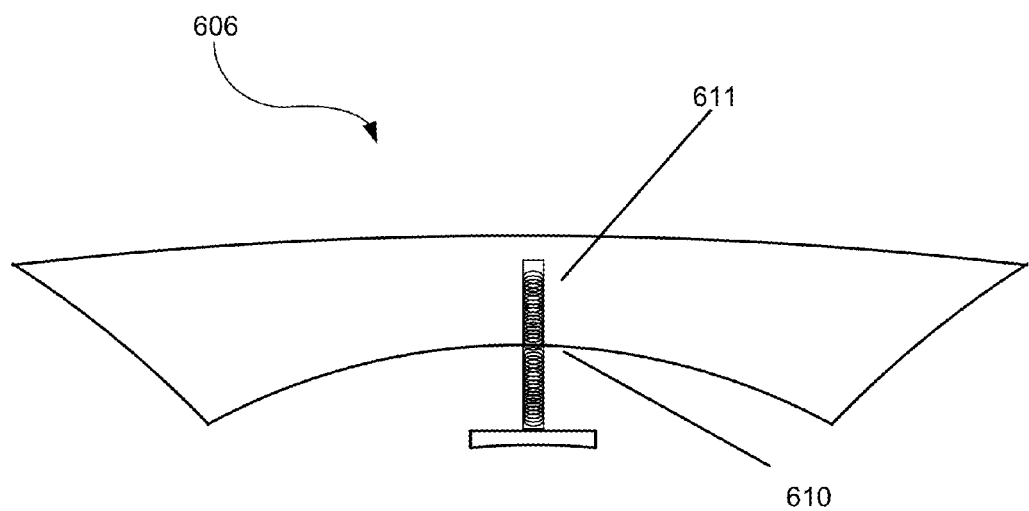
FIG. 6 shows an exemplary bridge and movable component of eyewear in accordance with some embodiments.
Figure 7:
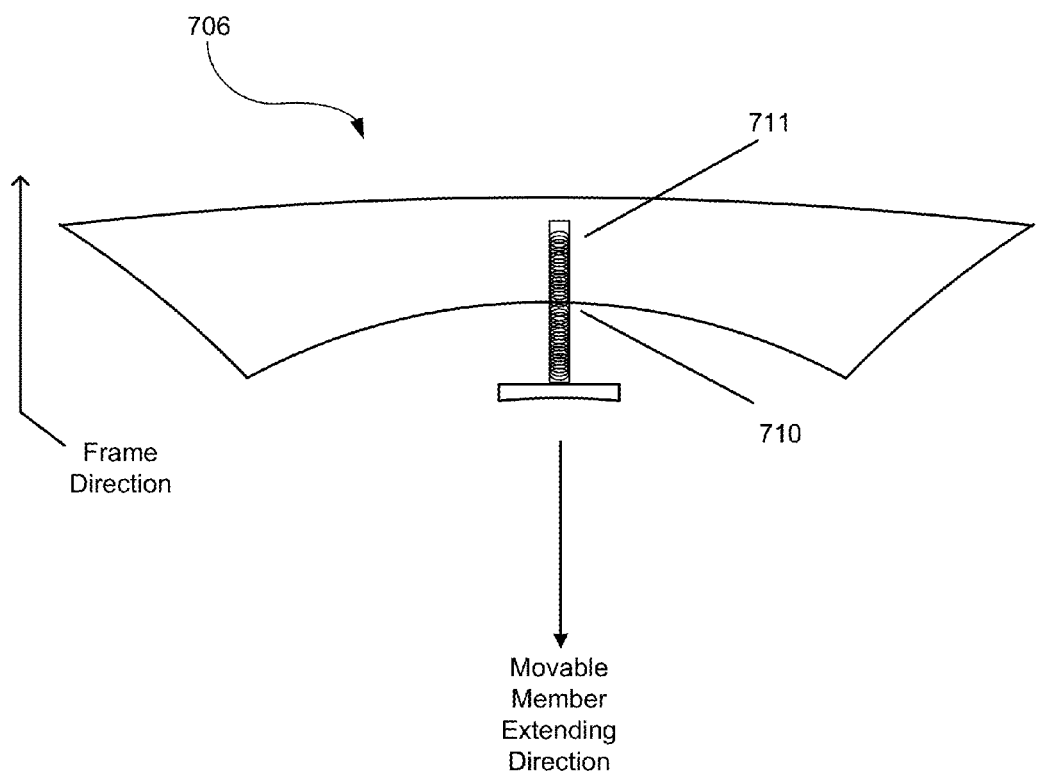
FIG. 7 shows an exemplary bridge and movable component of eyewear in accordance with some embodiments.

Thus, with reference to FIGS. 6 and 7, an exemplary operation in some embodiments may be as follows: To raise the eyeglass frame (e.g. to bring another optical zone into a better viewing position—e.g. when the wearer would like to go from far distance viewing to reading distance) the wearer may twitch his or her nose, which will trigger the actuator to open the trap door and raise the lenses relative to the wearer's eyes. This is shown in FIG. 7, where the trap door 710 is activated and the spring 711 is extending in the downward direction, indicated by the arrow. This applies a force on the wearer's nose, and causes the bridge 706 and the lenses to move in the upward direction, indicated by the arrow on the left of FIG. 7. FIG. 6 shows the exemplary embodiment where the lenses are in a second position, with the spring 611 extending the movable member through the trap door 610 of the bridge 606. The frames may remain in this second position as long as the wearer would like to use a particular optical zone of the lenses. To lower the eyeglass frames, the wearer may press down on the bridge 606 with his or her hand, thus retracting and resetting the spring loaded element within the bridge 606. This causes the eyeglass frame to return to its original position on the nose.

Figure 8:
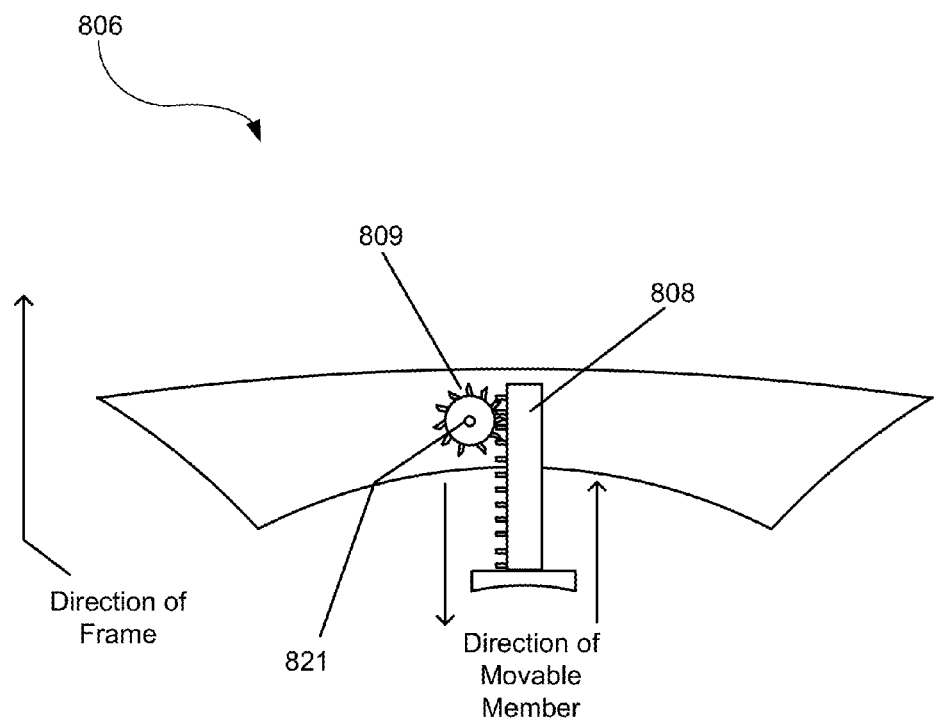
FIG. 8 shows exemplary components that may be disposed in the bridge of the eyewear in an exemplary embodiment.

With reference to FIG. 8, another exemplary embodiment of adjustable eyewear is illustrated. In this exemplary embodiment, a mechanical slider or knob 821 is located on the front of the bridge 806. As illustrated in this example, sliding or rotating the slider/knob 821 to the right or the left will cause a mechanical rotating cam 809 to cause an expandable element (i.e. movable member) 808 to press on the top of the nose of the wearer, thus raising the eyeglass frame (and thereby raising the lenses), as shown by the arrow on the left of FIG. 8. Conversely, sliding or rotating the slider/knob 821 in the opposite direction may retract the expandable element 808 thus lowering the eyeglass frame. The expandable element 808 can be housed within the bridge 806 and/or nose pads (not shown). As noted above, in some embodiments, the extendable element (i.e. the movable member) 808 may be actuated by turning a mechanical knob 821 located on the bridge 806 of the eyeglass frame/lens housing as opposed to the previously mentioned slider.

Figure 9:
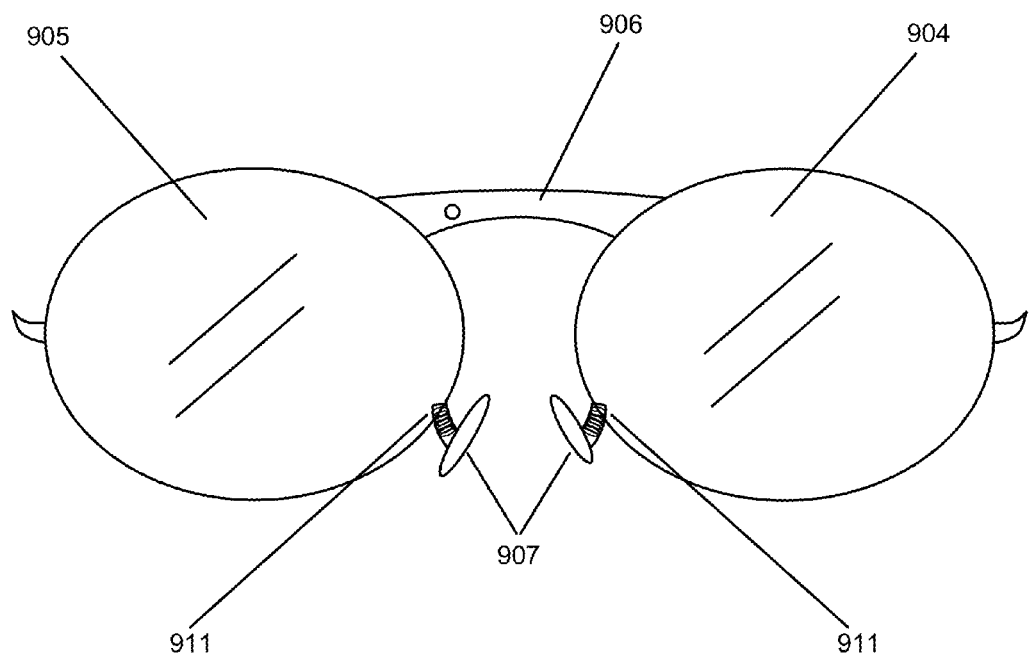
FIG. 9 shows a front view of exemplary eyewear in accordance with some embodiments.

With reference to FIG. 9, another exemplary embodiment is shown. The exemplary eyewear comprises a first lens 904, a second lens 905, a bridge 906 disposed between the first lens 904 and the second lens 905, nose pads 907, and nose pad arms 911. In this embodiment, the nose pad arms 911 may comprise a spring so as to be "spring-loaded" and may also be pressure activated. For example, when a wearer raises the eyeglass frames with his hands, the nose pad 907 may sense less pressure (i.e. there may be less weight pressing on the nose pads) of the eyeglass frame which may then cause each nose pad 907 to expand downward by movement and extension of the spring-loaded element 911 housed in each nose pad arm. The nose pads 907 may be an attachment to the nose pad arms and may thereby maintain contact with the wearer's nose. This causes the eyeglass frames (and thereby the lenses 904 and 905) to rise up on the face of the wearer by the extension of the spring-loaded elements 911 pressing on either side of the nose. To retract the elements and lower the eyeglass frame to its original position on the nose, the wearer may simply press on the top of the bridge 906 downward applying indirect pressure through the frame to the wearer's nose. In some embodiments, the springs may assist a mechanism in extending or contracting the nose pad arms 911 (e.g. causing the nose pads 907 to apply a pressure on the wearer's nose so as to adjust the position of the lenses 904 and 905. For example, the mechanism may comprise a micro-motor that is disposed in the temples or the lens housing of the eyewear, and may be coupled to the nose pad arms 911 and/or the nose pads 907 via a cable or wire (which may also be disposed inside the frame or disposed along a surface of the frame) so as to apply a push and/or a pull force to adjust the position of the nose pad arms 911. In some embodiments, the nose pads 907 and nose pad arms 911 may be used in combination with a movable member that may be disposed in the bridge (such as the exemplary embodiments discussed above with reference to FIGS. 3-8), such that as the lenses 904 and 905 are raised and lowered, the springs may extend or contract so that the nose pads 907 maintain contact with the wearer's nose. This may maintain the aesthetic appearance of the eyewear, as well as provide stability of the eyewear and the lenses 904 and 905 (e.g. the lenses will not vibrate, move or tilt as much in different positions) when the lenses are moved up or down relative to the eye. Moreover, by utilizing a spring (or other compressible and expandable member), embodiments may provide for eyewear that may also move down from relative to the wearer's eyes from a first position.

In general, the movable member (such as the exemplary spring loaded element/elements, or expandable element/elements disclosed in above exemplary embodiments) may raise or lower the eyeglass frames in certain preferred embodiments between approximately 2.0 mm to 10.0 mm, and more preferably between 5.0 mm to 10.0 mm. As noted above, when utilizing exemplary multifocal lenses with embodiments of the adjustable eyewear disclosed herein, the larger the distance between optical zones, the less likely it may be that a wearer may be distracted or have his vision distorted by looking through multiple optical zones (or by looking across the border between two different optical zones). The inventors have found that in some embodiments, a distance of approximately 2.00 mm may be sufficient for many functions.

Figure 10:
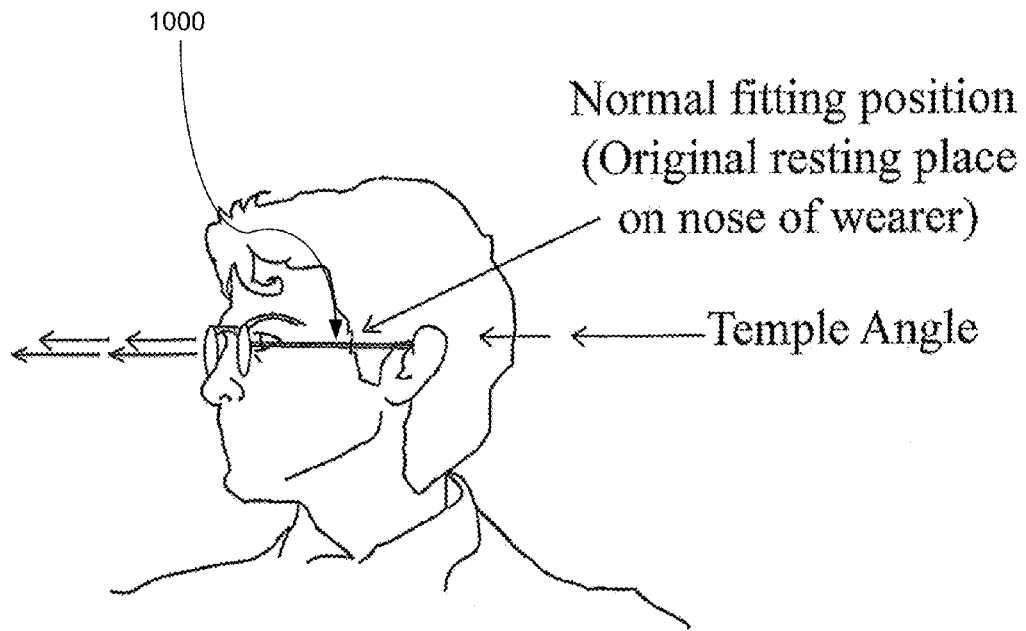
FIG. 10 is an illustration of exemplary eyewear in a first position while being worn on a wearer's head in accordance with some embodiments.

As the eyeglass frame (and thereby the lenses) is raised up and down relative to the nose of the wearer, it is also moving up and down relative to the face of the wearer and thus the lenses in the eyeglass frame may be moving up and down relative to the pupils of the wearer's eyes. This is illustrated in FIGS. 10-13. In particular, FIG. 10 shows an exemplary pair of eyeglasses 1000 in a first position on a wearer's head. The eyeglasses are shown as having a temple angle (i.e. an angle between the temple and a plane that is parallel with the floor) of approximately 0 degrees when the wearer has no head tilt (i.e. with the wearer is looking at a primary gaze at a distant object. This may correspond to when the movable member may be in a first position (such as when the movable member is disposed within the bridge of the lens housing). FIG. 12 shows the lens positions relative to the wearer's eye corresponding to the frame position shown in FIG. 10. Each of the lenses 1204 and 1205 are illustrated as having a second optical zone 1221 (which could, for instance, correspond to a wearer's near vision prescription). This second optical zone is shown as being disposed below the wearer's pupils 1220. As was shown in the exemplary embodiments above, the movable member may be disposed in the bridge 1206, nose pads 1207, or any suitable location on the frames.

Figure 11:
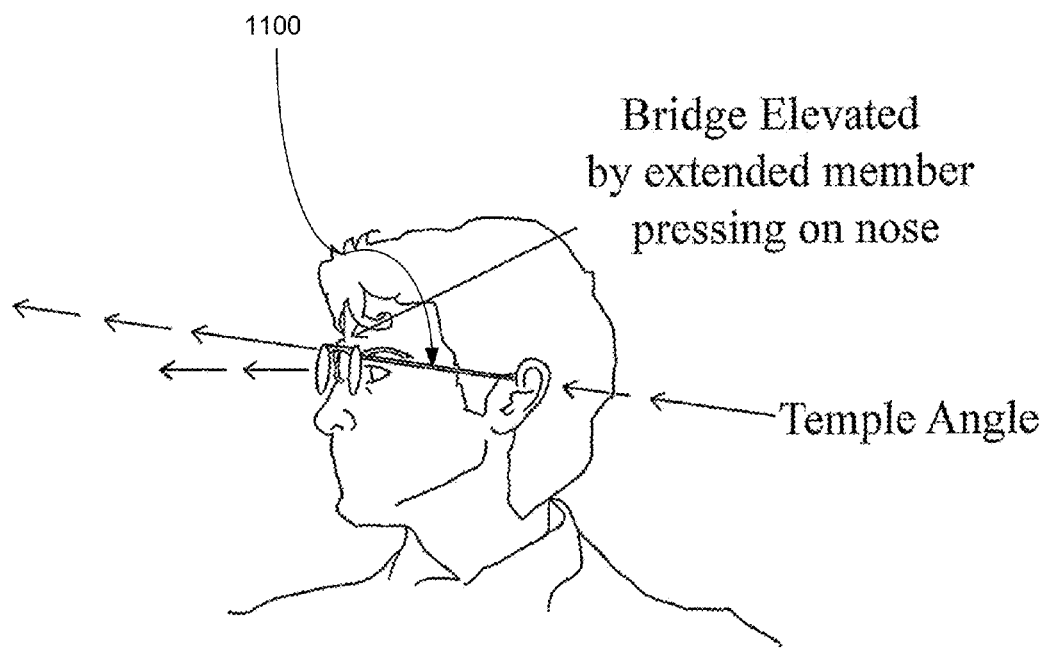
FIG. 11 is an illustration of exemplary eyewear in a second position while being worn on a wearer's head in accordance with some embodiments.
Figure 12:
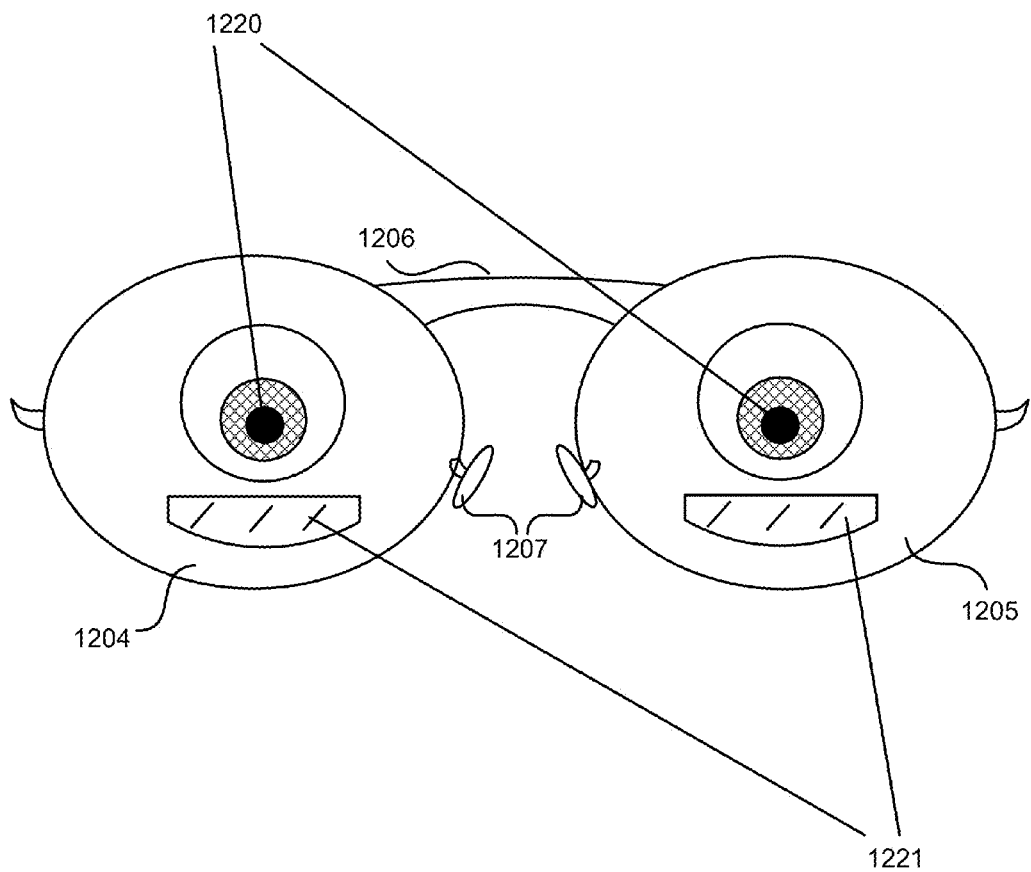
FIG. 12 shows exemplary eyewear while being worn by a wearer where the first and the second lenses are in a first position relative to the wearer's eyes in accordance with some embodiments.
Figure 13:
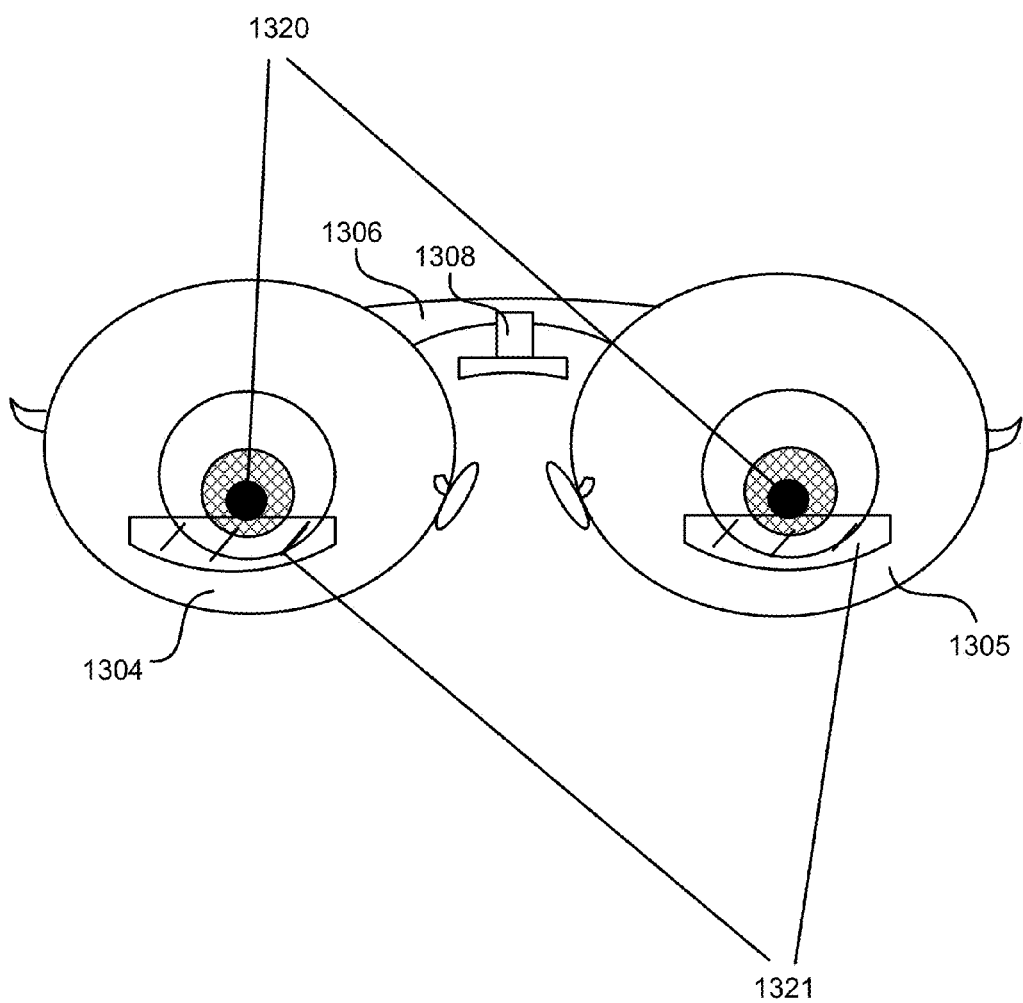
FIG. 13 shows exemplary eyewear while being worn by a wearer where the first and the second lenses are in a second position relative to the wearer's eyes in accordance with some embodiments.

FIG. 11 shows the eyeglasses 1100 in a second position that may correspond to when the movable member may be in a second position (i.e. being extended or otherwise moved) so as to raise the frames relative to the wearer's face. As shown, the temple angle may be increased (as shown as approximately 10 degrees) when the wearer has no head tilt (i.e. with the wearer is looking at a primary gaze at a distant object). FIG. 13 shows the lens positions relative to the wearer's eye corresponding to the frame position shown in FIG. 11. Each of the lenses 1304 and 1305 are illustrated as having a second optical zone 1321 (which could, for instance, correspond to a wearer's near vision prescription). This second optical zone is shown as being disposed just slightly below the wearer's pupils 1320, but is closer to the pupil than in position in FIG. 12. This may enable the wearer to more readily use the second optical zone (e.g. without the need to tilt his head or lower his gaze). As shown in FIG. 13, the movable member 1308 may be extended from the bridge 1306, and may apply a force to the wearer's face, thereby adjusting the position of the lenses 1304 and 1305.

As described above, in some embodiments, the mechanism that adjusts the position of the movable member may be semi-automatic for raising and lowering the eyeglass frames. In some embodiments, raising and/or lowering the eyeglass frame and lenses relative to the eyes of the wearer may be automatic (such as when the mechanism comprises a sensor such as a micro-accelerometer). Although the exemplary embodiments described above with reference to FIGS. 2-13 may provide some examples of a movable member that may adjust the position of the lenses based on its position, as well as mechanisms that may be configured to adjust the position of the movable member, embodiments are not so limited. Moreover, as noted above, some embodiments described herein may provide the benefits of improved life style during particular uses of the wearer such as sports activities, walking up and down stairs, lying in bed watching TV, and various vocations and hobbies such as (by way of example only); wall paper hangers, artists, pianists, electricians, welders, assembly plant workers, and painters.

Therefore, in some embodiments, an eyeglass frame may be provided having a semi-automatic or automatic bridge member, where the bridge member may cause the eyeglass frame to be lowered on the face of the wearer. In some embodiments, the bridge member may cause the eyeglass frame to be automatically raised on the face of the wearer. In some embodiments, the semi-automatic or automatic bridge member may be spring loaded. In some embodiments, the bridge member may include an expandable or extendable element.

In some embodiments, an eyeglass frame may be provided that includes an extendable bridge member which automatically raises the eyeglass frame. In some embodiments, the eyeglass frame may be raised between approximately 3.0 and 10.0 mm from its original position on the nose. As described in more detail below, this may correspond to distances whereby different optical zones may be moved far enough away from the gaze of the wearer so as to not interfere with viewing objects. In some embodiments, the eyeglass frame may be lowered and returned to its original position on the nose. In some embodiments, the eyeglass frame may include a semi-automatic nose pad arm, where the nose pad arm is spring loaded. In some embodiments, the semi-automatic nose pad arm of the eyeglass frame may include a spring loaded expandable element. In some embodiments, an eyeglass frame may be provided that includes a spring loaded nose pad arm that automatically raises the eyeglass frame.

Figure 31:
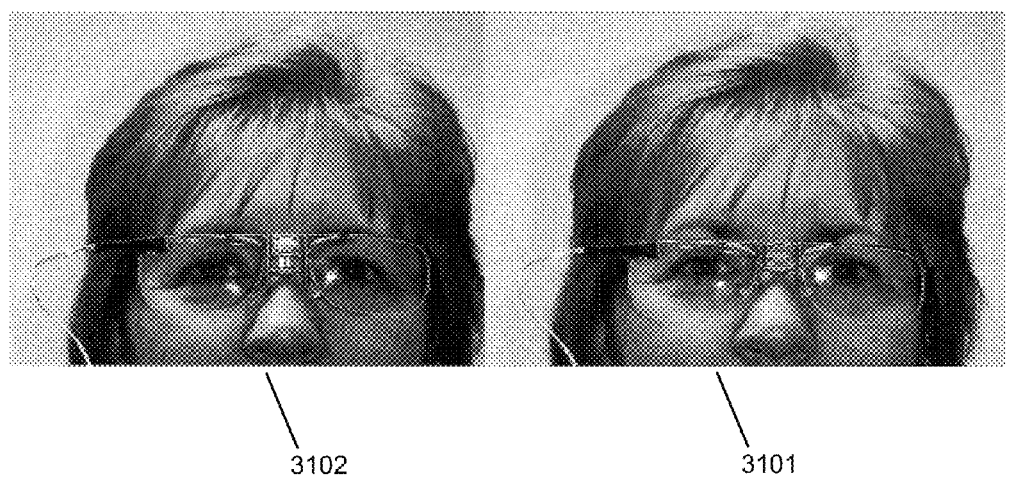
FIG. 31 comprises photographs of a prototype of an exemplary embodiment of adjustable eyewear.

Embodiments Comprising a Progressive Addition Design and Above Eye Level Viewing The inventors have recently produced a prototype of a general embodiment of adjustable eyewear as described above. A picture of the prototype in use by a wearer is shown in FIG. 31 (3101 shows the exemplary adjustable eyewear in a first position wherein the movable member is not extended; and 3102 shows the same embodiment, but where the movable member is extended). When making this prototype and placing a progressive addition lens (PAL) into the frames, the inventors discovered that while a conventional PAL may work with such a device, the design of the conventional PAL has been optimized for a frame that does not move or translate on the wearer's face. Thus a conventional PAL may not be ideal for some embodiments of adjustable frames and therefore other PAL designs may offer certain advantages or are better suited for use in some embodiments. This may be because, for instance, an novel design of a PAL, which may be utilized in some embodiments of the novel adjustable eyewear may be positioned lower in the lens/frame (e.g. at least 3.0 mm or more, in most cases) than a PAL is typically located in traditional frames so as to account for the raising and lowering of the lenses relative to the wearer's eye. This means that novel design of the PAL may provide a fitting point 3.0 mm or higher above the start of the progressive channel. This is generally contrary to how PALs are designed today where the start of the channel is typically very close (if not located at) the fitting point for the wearer's pupil. However, the inventors found that when positioning a conventional progressive surface approximately 3.0 mm lower in the lens/frame from where it is typically positioned, the bottom of the PAL (which may correspond to the optical zone that has the total add power of a wearer's prescription reading power) may be cut off during the edging process. In other words, when the lens blank is edged (e.g. so as to fit into a frame selected by the wearer) that comprises a traditional PAL surface that is positioned lower on the lens, the portion of the PAL with the full add power may be removed. In addition, the wearer's eyes may have a very difficult and uncomfortable time obtaining the full optical add power or full reading power, as they must look so far down into the eyeglasses to obtain this proper optical power provided (if it has not been edged off when processing into the eyeglass frame).

The inventors have also found that while wearing the prototype developed in accordance with some embodiments, and looking at a cereal box on a shelf located higher than eye level, the inventor had to tilt his chin upward in an awkward position to clearly see the cereal box. This was due in part to the adjustable eyewear comprising lenses that had PALs positioned too low relative to eye (e.g. on the nose) of the wearer.

Therefore, the inventors have discovered that there is a need for a PAL design that may be more effectively used with some embodiments of adjustable eyewear. In addition, the inventors have discovered that there is also a need for a lifting/adjusting mode for the adjustable eyeglass frames when the wearer may be looking above eyelevel. This may be necessitated by virtue of the novel PAL design utilized with the some embodiments of adjustable eyeglass frames, as the novel PAL design may have the fitting point located approximately 3.0 mm or more above the start of the progressive addition power channel.

Figure 32G:
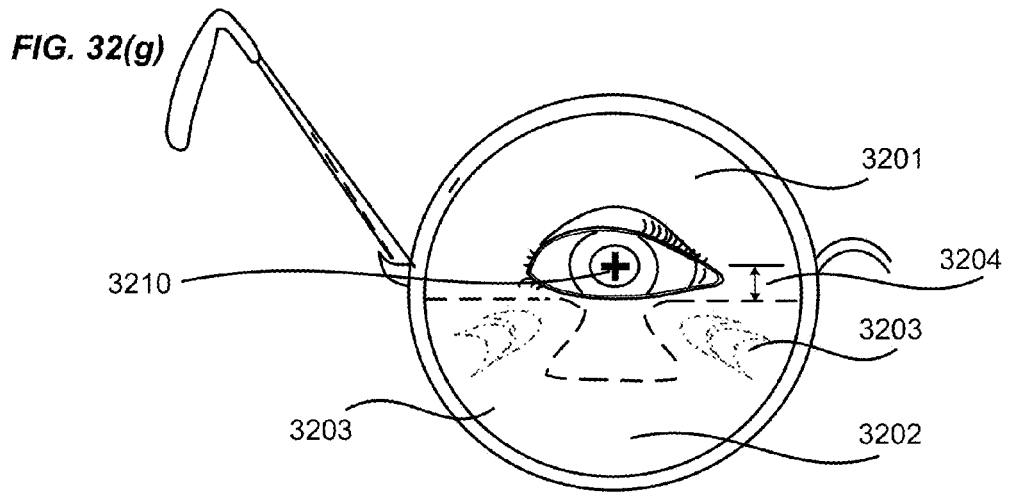
Figure 32H:
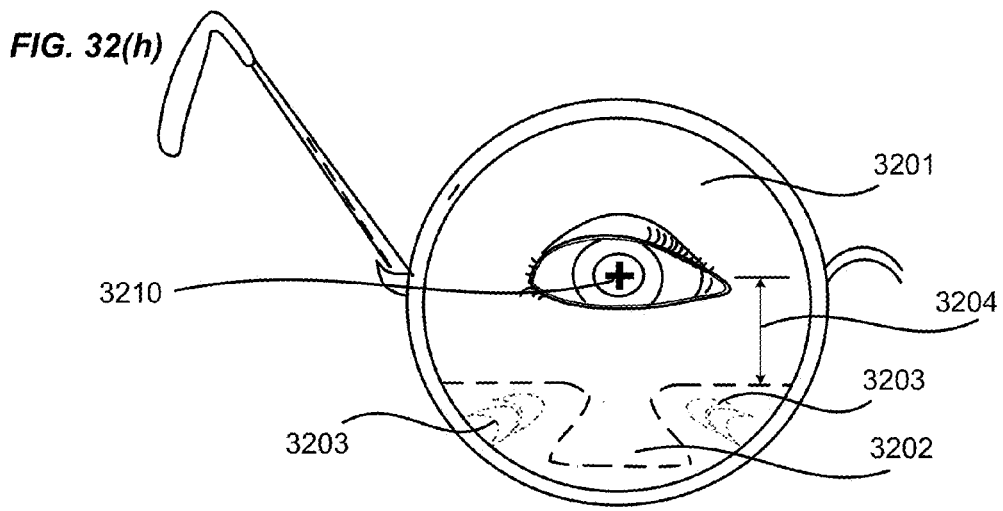
Figure 32I:
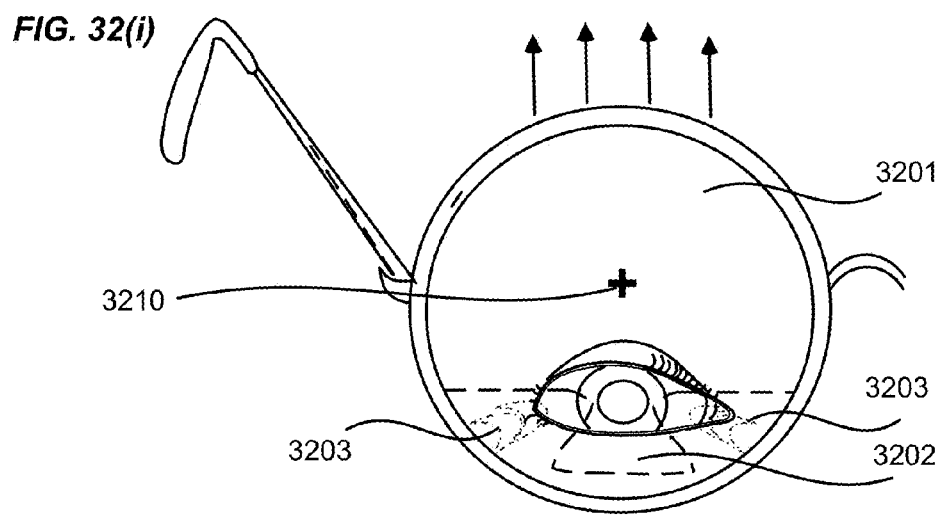

In some embodiments, a short channel PAL may be used. Exemplary lenses comprising a short channel PAL are shown in FIGS. 32(g)-(i) and will be referenced below. While short channel PALs may be generally known, they are typically designed and are presently used in eyeglass frames that have a narrow vertical height (where the height of a lens may refer to the dimension 3001 in FIG. 30). However, unlike the current use of the short channel PALs in lenses with a small vertical height, embodiments of eyewear that comprise an adjustable frame may utilize the short channel PAL in lenses that have a much larger vertical height.

A conventional short channel design PAL provides a progressive addition power in the form of a continuous increase in optical add power from the distance zone to the near add power. This increase of optical add power may occur over a distance of approximately 15.0 mm or less from the start of the progressive addition channel. As noted above, such designs were designed and fabricated for narrow eyeglass frames. However, while such a short channel design may fit into eyeglass frames having a narrow vertical eyewire dimension; it also typically causes the unwanted astigmatism to increase substantially and the channel width to narrow. This may cause the wearer to have an increase perception of distortion or swim and a harder time seeing left-to-right or right-to-left in terms of width when, for example, working on a computer. An example of a short channel PAL as typically disposed in conventional lenses is shown in FIG. 32(g), and described below.

The inventors have found that when a novel short channel PAL, such as the exemplary embodiments shown in FIGS. 32(h)-(i) and described herein, having the fitting point approximately 3.0 mm or more above the start of the progressive addition channel is placed into an embodiment of adjustable frames (such as those shown in FIG. 31) at a position that was approximately 3.0 mm lower than the normal placement position of a PAL, the short channel PAL fit well, and the distortion was not as perceivable (as it is located below the line of sight of the wearer). When needed, the exemplary adjustable frame may be raised 3.0 mm (or more) so that the wearer can easily utilize the optical add power zone (such as to read or work on their computer, etc.).

However, embodiments are not limited to short channel PALs. For example, the inventors have found that embodiments provided herein may also provide an improved efficiency when use long channel PAL designs. Examples of this are shown and described with reference to FIGS. 32(d)-(f). Long channel PALs in general reduce distortion (in comparison to short-channel PALs) caused by the continuous optical power surface because the change in optical power is spread over a longer distance. However, the increased distance may make it difficult for a wearer to utilize the full add power zone of the progressive (which may correspond to the optical power needed for near distance viewing of the wearer) because this zone is disposed further away from the lens fitting point. Thus, embodiments herein may provide eyewear that, when a near distance optical power is needed, the lens comprising a long channel PAL may be moved up relative to the wearer's eye such that the wearer need not direct his gaze as far downward (or otherwise tilt his head). This is illustrated in FIG. 32 (f) and described below.

With reference to FIGS. 32(d)-(f), a long channel PAL is shown. As shown in the figures, the lens 3201 comprises a long channel progressive addition surface 3202 disposed at a distance 3204 from the fitting point of the lens 3210. The long channel PAL is shown as creating distortions 3203. FIG. 32(d) shows a conventional lens where the channel of the progressive 3202 is disposed at or near the fitting point of the lens 3210. That is, the distance 3204 may be less than or equal to 2.0 mm in some embodiments. As shown, the distortions 3203 are relatively close to the wearer's primary gaze. In contrast, FIGS. 32(e) and (f) show a long channel progressive 3202 that may be disposed at a greater distance 3204 from the fitting point 3210. For instance, the distance 3204 may be greater than approximately 2.0 mm. As shown in FIG. 32(e), the distortions 3203 are disposed further away from the wearer' primary gaze (i.e. they may be less visible when the wearer is scanning over or using the far distance optical zone). However, the full add power of the PAL 3202 is now disposed at a greater distance from the fitting point 3210, which, as described above, may make it difficult for a wearer to fully (and/or comfortably) utilize this optical zone. Thus, as shown in FIG. 32(f), embodiments provided herein may adjust the position of the lens 3201 upward so that the wearer's pupil may be disposed closer to the full add power zone of the progressive 3202 and thereby may not need to strain or direct his gaze and an extreme angle to use this region.

Although FIGS. 32(e) and (f) disclose an embodiment where the start of the long channel progressive was moved down away from the fitting point, embodiments are not so limited. Indeed, some embodiments provided herein may utilize a long channel PAL that is disposed at or near the fitting point (similar to that shown in FIG. 32(d)). The functionality provided by some embodiments of eyewear provided herein to adjust the position of the lens (and thereby the distance between the wearer's pupil in the primary gaze and the full add power zone), may enable the use of PALs with longer channels then could be comfortably used in traditional eyewear. Thus, by utilizing longer PALs, embodiments may further reduce the distortion created by the continuously variable surface.

With reference to FIGS. 32(g)-(i), a short channel PAL is shown. As shown in the figures, the lens 3201 comprises a short channel progressive addition surface 3202 disposed at a distance 3204 from the fitting point of the lens 3210. The short channel PAL is shown as creating distortions 3203. FIG. 32(g) shows a conventional lens where the channel of the progressive 3202 is disposed at or near the fitting point of the lens 3210. That is, the distance 3204 may be less than or equal to 2.0 mm in some embodiments. As shown, the distortions 3203 (which typically are greater than long channel PALs because of the higher rate of change in optical power) are relatively close to the wearer's primary gaze. In contrast, FIGS. 32(h) and (i) show a short channel progressive 3202 that may be disposed at a greater distance 3204 from the fitting point 3210. For instance, the distance 3204 may be greater than approximately 2.0 mm. In some embodiments, this distance may be greater than 5.0 mm, which may be due, in part to the shorter channel of the progressive surface. As shown in FIG. 32(h), the distortions 3203 are disposed further away from the wearer' primary gaze (i.e. the distortion may be less visible when the wearer is scanning over or using the far distance optical zone), which may be significant given the higher level of distortions created by the short channel progressive 3202. However, the full add power of the PAL 3202 is now disposed at a greater distance from the fitting point 3210, which, as described above, may make it difficult for a wearer to fully (and/or comfortably) utilize this optical zone. Thus, as shown in FIG. 32(i), embodiments provided herein may adjust the position of the lens 3201 upward so that the wearer's pupil may be disposed closer to the full add power zone of the progressive 3202 and thereby may not need to strain or direct his gaze and an extreme angle to use this region.

In some embodiments, the adjustable eyeglass frames may move up when a wearer looks down (e.g. to read or otherwise look at an object at near distance), the eye glass frames may move down when the wearer looks at eye level straight ahead (e.g. in the primary gaze), and may then move up relative to the wearer's eyes again when the wearer looks up above eye level. By having these three modes of operation, a wearer can now use the adjustable eyeglasses to better view objects that may be above the wearer's eye level clearly, without having to place his head into an awkward position. In some embodiments, the three modes of operation embodiments may utilize a micro-accelerometer or micro-gyroscope, which may automatically sense the position of the wearer's head. The micro-accelerometer may be located in any suitable location in the eyeglass frame (such as the lens housing or one of the temples). However, embodiments are not so limited, and any suitable method or means for determining when to adjust the position of the lenses relative to the eyes may be used (including semi-automatic mechanisms that may receive an indication from a user, or manual devices that us the force from the user to adjust the position of the lenses).

As was noted above, in some embodiments, a micro-motor may be used to raise and lower the lenses of the adjustable eyewear. A photograph of an exemplary embodiment developed by the inventors that comprises a micro-motor is again shown in FIG. 31. In general, the micro-motor may be used to push, extend, or retract an actuator arm (or similar component), or otherwise apply a force to adjust the position of the movable member. In some embodiments, the actuator arm may be 3.0 mm or longer in length. In some embodiments, the length of the actuator arm may correspond to the maximum distance that the lens housing may be raised or lowered (for example, when the actuator arm comprises a portion of the movable element, or directly applies a force to the movable element). In general, the size of the micro-motor and the actuator arm may be designed so as to be adequately disposed within the frame (such as within one of the temples or the lens housing). By way of example only, in some embodiments, the motor may be placed in the middle of the bridge of the adjustable eyewear. This may enable the eyeglasses (and thereby the lenses) to be raised or lowered by, for instance and depending on the actuator arm, 3.0 mm or more. This can be done automatically, such as when the motor is connected to a micro-accelerometer or gyroscope, or semi-automatically, such as when utilizing an "on" "off" switch. In some embodiments, two or more micro-motors may be used, such as by disposed a micro-motor in each nose pad, which may allow for each nose pad arm to be extended or retracted (e.g. by a distance of 3.0 mm or greater). However, as noted above, it may be generally preferred to extend the movable member within a range of approximately 3.0 mm-8.0 mm, such that other optical zones that may not be in use do not interfere with the vision of the wearer, or otherwise distract the wearer. That is, for shorter distances the viewer part of the viewer's gaze may overlap more than one optical zone. The micro-motor may be electrically coupled to one or more power sources, which may also be disposed within the frames of the eyeglasses.

In some embodiments, one or both of the lenses may comprise a heads-up display (HUD) that may be, for instance, affixed to (or built into) the lenses of embodiments of adjustable eyeglasses. The HUD may connect to any number other electronic components that may be disposed on the eyeglass frames (including for example, a communication device to receive information from a network or one or more sensors that may monitor ambient conditions). The HUD may then present a graphical interface to relay such information to the wearer (for example, emails that a user may have received, temperature, distance to an object that the wearer is viewing, etc.). The HUD may be lowered (or raised) out of the visual path of the wearer when not in use, thereby providing the wearer with a line-of-sight that may be unimpeded by the components of a HUD. However, when needed or desired, the HUD may be raised up (or lowered) by way of adjusting the movable member (and thereby the position of the lenses) relative to the wearer's eyes using any suitable method, include the exemplary embodiments disclosed above and below. In some embodiments, rather than a HUD, the lens may comprise an optical zone that may be used for viewing 3-D graphics and material. When not viewing such material, this portion of the lens may be moved away from the primary gaze of the wearer, such that their vision is not impaired. Indeed, in general, any component that may be a part of a lens that may distract or partially obstruct the wearer's view may be disposed in an optical zone near the top or bottom of the lens such that it may be moved away from the wearer's eye when not needed. In this way, embodiments may provide the wearer with the benefits of such functionality, while also allowing for less obstructed and distracted views when not using such features.

Thus, in some embodiments, adjustable eyeglasses may be provided that comprise frames, one or more progressive addition lenses, and an element or component that may be capable of moving the eyeglass frames up (or down) by at least approximately 3.0 mm relative to the top of the nose of the wearer (e.g. a movable element that may be operatively coupled to a micro-motor). In some embodiments, the PALs may be configured to move up (or down) by at least approximately 3.0 mm or more relative to the eyes of the wearer.

In some embodiments, adjustable eyeglasses may be provided that comprise frames, one or more PALs, and an element capable of moving the eyeglass frames up and down by approximately 3.0 mm or more relative to the top of the nose of the wearer. In some embodiments, the PALs may move up and down by approximately 3.0 mm or more relative to the eyes of the wearer. In some embodiments, the PALs may be of a short channel design having a channel length of approximately 15.0 mm or less. In some embodiments, the PALs may have a height of at least 30 mm.

In some embodiments, the adjustable eyeglass frames by configured to: (A) move up when a wearer is reading at a near distance, (B) move down when the wearer is looking straight ahead at eye level (e.g. far distance viewing), and (C) move up when the wearer is reading above eye level. In some embodiments, the adjustable eyeglasses may comprise a micro-motor or a micro-pump.

Embodiments Comprising Customized Adjustments of Lens Positions

Embodiments provided herein may provide for the vertical (and, in some embodiments, horizontal) movement of the lenses housed in the lens housing of the eyeglass frame relative to the center of the patient's or wearer's pupils (and correspondingly relative to the line of sight of the patient or wearer). The inventors have further discovered that when working at an intermediate vision range and viewing an object or target such as, by way of example only, a desktop computer screen, art easel, or plano sheet music while at a plano, in certain cases this full range translation (whether manually, semi-automatic, or in automatic mode) may not in some instances function as efficiently as possible, and thereby prevent or inhibit maximum visual clarity. The inventors have found that one potential cause of this decrease in vision clarity may be due to the patient or wearer's body posture and/or location of the eyes relative to the intermediate object or target, combined with the working distance from the patient's or wearer's eyes and the intermediate object or target. Therefore, the inventors have identified a further need to provide embodiments that may include a precise translating eyeglass frame and lens system.

Some embodiments disclosed herein may allow for the customization of the amount of raising and/or lowering of the eyeglass frame relative to the pupils of the patient's or wearer's eyes. This customization may in-turn allow for a more precise optical power to be provided that may be required to satisfy the patient's or wearer's need for vision correction based upon the distance of the intermediate object or target so that the object may be seen with maximum clarity while minimizing the uncomfortable tilting of the head by the patient or wearer. In addition, in some embodiments, this customization may allow for expanded uses of adjustable eyewear, such as by way of example only, the movement of a zoom lens, a virtual reality system, micro-camera, spatial leveling system, sunglass tint, mirrored coating, heads-up-display (HUD), or any other type of display that can be located either superior or inferior to the line of sight of the patient or wearer, while not interfering with the patient's or wearer's vision when moved in and out of view as desired or needed by the patient or wearer.

In some embodiments, the control of the precise translating eyeglass frame and lenses may utilize the wearer manually touching a button, switch (e.g. a capacitive touch switch), or sensor which, while sensing this continuous contact, moves the movable member (and thereby the lenses) up or down to the precise point of optimal vision clarity (where the wearer may take into account consideration such as the patient's or wearer's head tilt, eye position along the horizontal axis, and distance from the intermediate object or target, etc.). When the wearer removes his finger from the contact, the final position of the lenses may be frozen in this location until it is reset (or until it receives another signal from the wearer). This may in some embodiments allow for the precise optimal degree of translation of the lenses relative to the wearer's eyes, and may for instance allow a progressive addition lens to be set at the precise optimal optical add power required for the for the wearer to have the sharpest clarity for the specific vision task.

In some embodiments, it may be possible to program or set the degree of movement of the lenses by the wearer. For example, in some embodiments, the wearer can wear the adjustable eyeglasses (e.g. the frame and lenses) and (by way of example only) when working on a desk top computer at the work desk, which they may use every day, sit comfortably in their work desk chair looking at the computer screen. While the wearer's head is in a comfortable position, the wearer may move the novel lens and frame combination up or down such that the wearer finds a position of maximum comfort visually and also ergonomically. Once this is obtained, the wearer can press a switch or a member which will then program the novel eyeglass embodiments to return to this predetermined position based on an input received from the wearer. That is, the eyewear may store the position of the lenses (i.e. the position of the movable member) such that, when a signal is received, the lenses may be positioned back into this customized lens position. There may be multiple switches or members, or the switch or member can be pressed multiple times (or in different directions or sequences, etc.) such as to account for multiple settings (which are stored in memory by the appropriate memory storage device, which may be integrated with into a component of the eyewear, such as the frame) for the wearer. The settings could be used for different activities, such as, by way of example only, running, walking, riding in a car, riding a bike, reading a newspaper, working on a desk top, working on a laptop, etc. Any suitable method or components may be used for the translation, including those described herein.

In some embodiments, the control and/or sensor mechanism may comprise a simple switch which, when touched by a wearer and his finger is removed, may start the translation of the lenses (e.g. start moving a movable member). When the control/sensor mechanism is touched again by the wearer and his finger removed, this may signal the device to stop the translation and freezes the degree of translation (i.e. the position of the lens housing and the lenses) until it is reset and/or another signal is received to adjust the position of lenses. Any suitable method or components may be used for the translation of the lenses, including those described herein.

Figure 16:
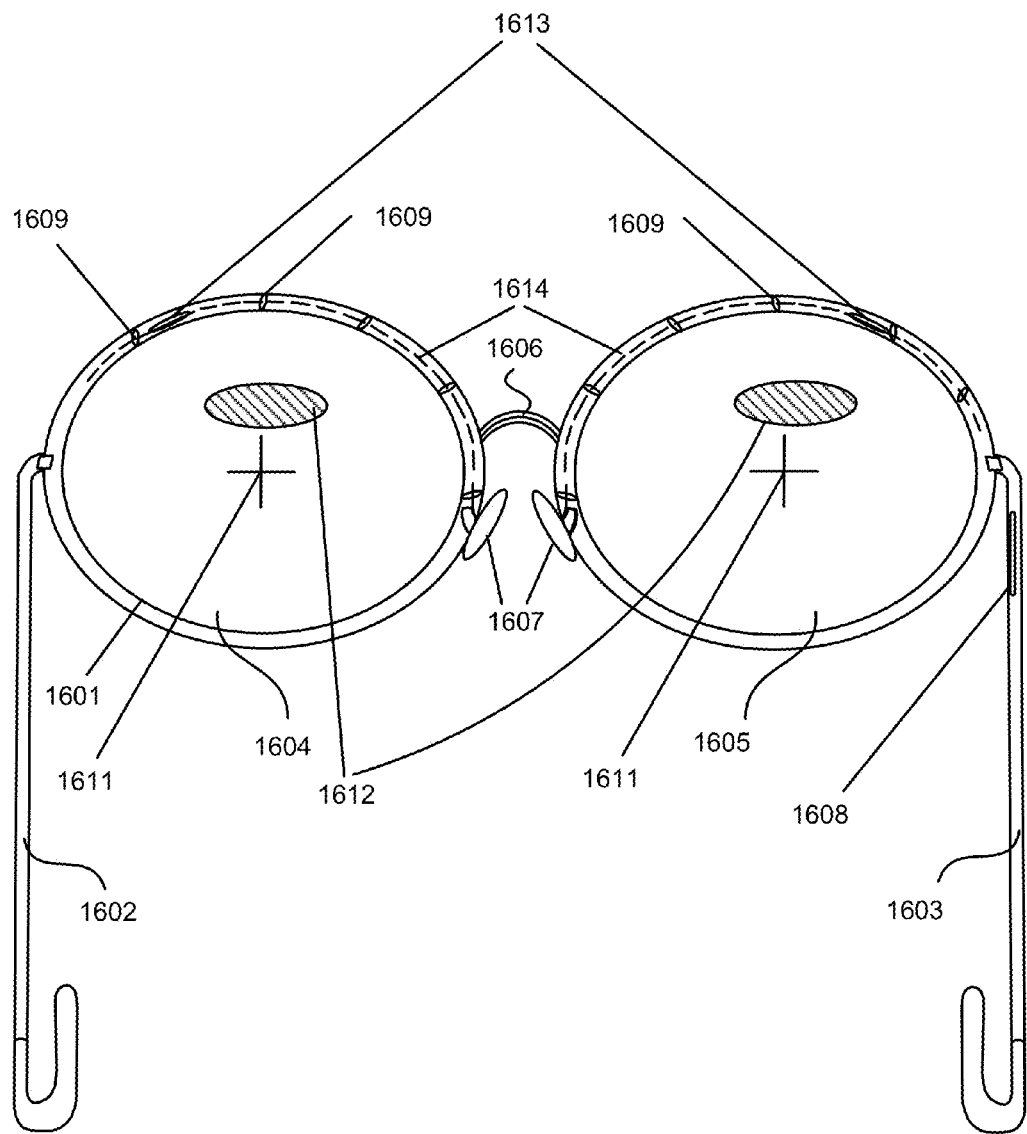
FIG. 16 shows a rear view of exemplary eyewear that may comprise a façade (or may otherwise mask the appearance of components of the device) and lenses that comprise multiple optical zones in accordance with some embodiments.
Figure 17:
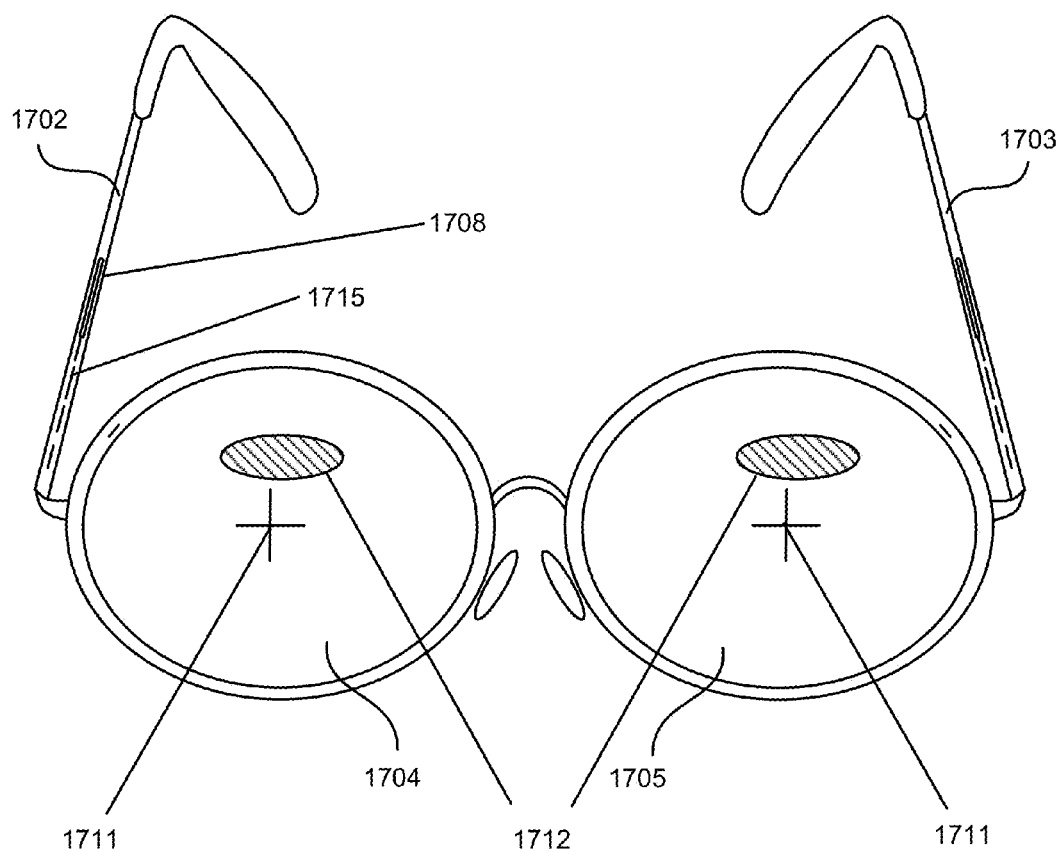
FIG. 17 shows a front view of exemplary eyewear that may comprise a façade (or may otherwise mask the appearance of components of the device) and lenses that comprise multiple optical zones in accordance with some embodiments.

In some embodiments, where the adjustable eyewear may utilize any suitable precise translation method including those described above, the lens or lenses may comprise a display of some type (or other features such as, by way of example, augmented reality system; virtual reality system a display; a zoom lens; a micro-camera; a spatial leveling system, etc.) and the controller and/or sensing mechanism may enable the wearer to locate the display either in the line of sight of the patient or wearer, or to remove it from the line of sight of the patient or wearer. Embodiments may also provide the wearer with the ability to set the position of the display in accordance with their preferences, which may include a location such that the wearer may still view the information, but that it may not be directly in his line of sight. An exemplary embodiment is shown in FIGS. 16 and 17 and described in more detail below.

As noted above, in some embodiments, the adjustable eyewear may allow for movement in two directions: horizontal and vertical. To allow for movement in multiple directions, some embodiments may utilize multiple movable elements that may be disposed in different locations on the lens housing and/or the temples of the frames such that a force may be applied to different portions of the lens housing. In some embodiments, the adjustable eyewear may utilize a component or components that may enable only the lenses to be moved relative to the eyes (for instance, in the horizontal direction), such as by having a movable member that may apply a force to the lenses from the lens housing. In some embodiments, the adjustable eyeglasses may allow for movement of the lenses relative to the eyes in three directions: horizontal, vertical, and in and out/closer or further from the face of the wearer. That is, for instance, embodiments may comprise a moveable member that may be disposed on the temple (so as to apply a force to move the lens housing farther away from, or closer to, the wearer's face), or the lens housing may comprise a movable member or other component that may enable the lenses to be moved closer and/or father apart from the lens housing.

In some embodiments, the adjustable eyewear may enable movement of the lenses in three directions: horizontal, vertical, and in and out (e.g. closer or further from the face of the wearer), and may also rotate the lens or lenses up to and including 360 degrees by way of a separate micro motor. That is, for instance, the device may comprise another micro-motor or similar device that may separately rotate a lens or lenses. The lenses may thereby be coupled to the lens housing that allows such rotation, or the lens housing (or a component thereof) may be capable of rotating.

In some embodiments, the adjustable eyewear may provide the feature of a zoom lens. The zoom lens may be disposed outside of the patient's or wearer's line of sight when not in use. When activated and translated into position relative to the position of the pupil of the wearer, the zoom lens may, by way of example only, allow a police officer sitting in his parked vehicle to read a distant and normally unreadable vehicle license plate. However, any use of a zoom lens may be possible. Embodiments may also allow for such a zoom lens to be stored outside of the line of sight of the wearer and moved into the line of sight of the wearer when desired by the wearer. In some embodiments, the zoom lens may even be stored or disposed above or below the lens housing, and may be moved into position when needed.

In some embodiments, the adjustable eyewear may comprise a novel lens or lenses that may be partially tinted such that the upper or lower area of the eyeglass lens is, by way of example only, a solid or gradient sunglass tint. In some embodiments that utilize this novel tinted lens, the darkest tint of the lens may be located above the line of sight of the pupil when the wearer is inside and may be moved to a position in front of the line of sight (e.g. the primary gaze) of the wearer when wearer is outdoors or behind the windshield of an automobile during day time.

Figure 18:
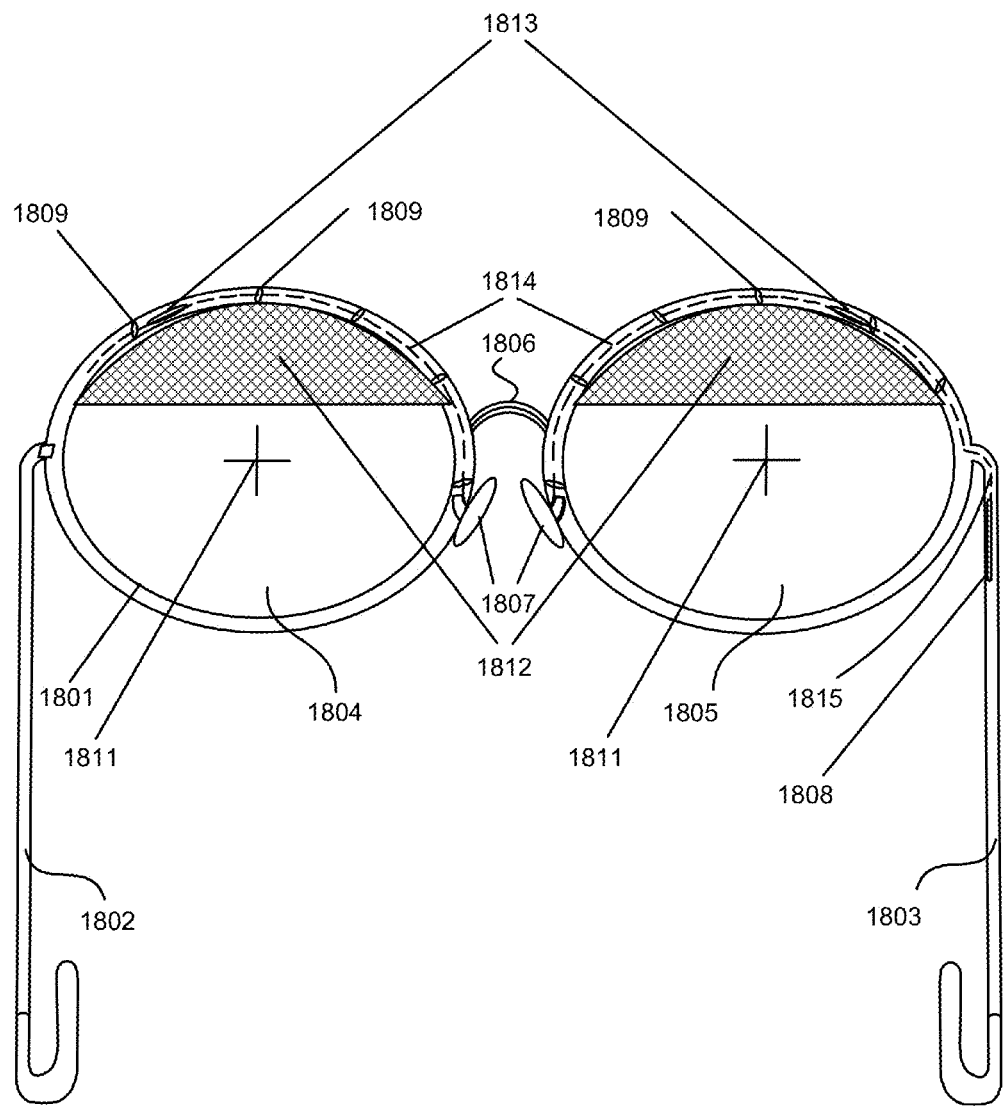
FIG. 18 shows a rear view of exemplary eyewear that may comprise a façade (or may otherwise mask the appearance of components of the device) and lenses that comprise multiple optical zones in accordance with some embodiments.
Figure 19:
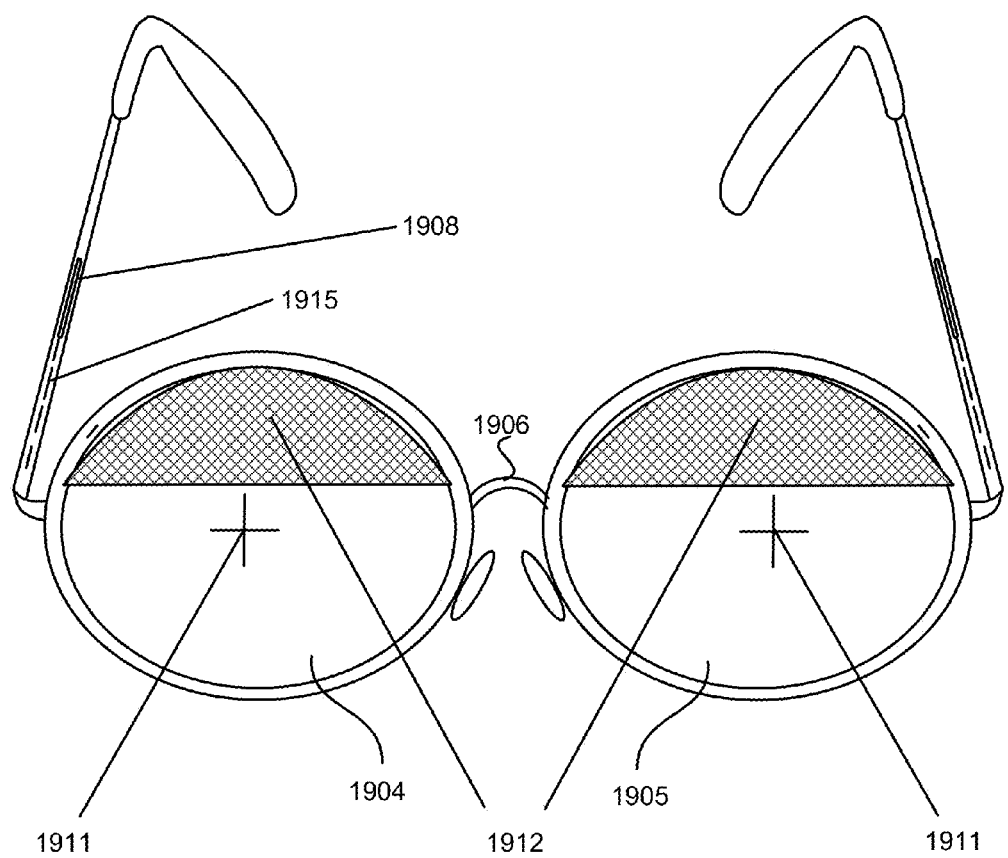
FIG. 19 shows a front view of exemplary eyewear that may comprise a façade (or may otherwise mask the appearance of components of the device) and lenses that comprise multiple optical zones in accordance with some embodiments.

In some embodiments, the eyewear may allow for translating the sunglass tinted area up or down (e.g. by moving the lenses up or down) and out of the way of the wearer's pupils or line of sight, thereby allowing for clearer non-tinted vision. The lenses may also be translated such that the tinted area will cover or be aligned with the wearer's pupils, thus reducing glare and transmission of light. Such embodiments may comprise, for instance, a photodiode to detect the intensity and position of the sun. In some embodiments, the lenses of the adjustable eyewear may comprise a mirrored area that may be is located above or below the wearer's pupils and that may be capable of being moved or translated into or out of position to cover the pupils. An exemplary embodiment that may comprise a tinted or mirrored section is shown in FIGS. 18 and 19 and described in more detail below. In some embodiments, a photo-sensor may be provided such as to sense the need to raise or lower the novel adjustable eyewear. The photo-sensor may be disposed in any suitable location, including the lens housing, the temple, or even the lens. In some embodiments, a controller or micro-processor may also be utilized to automatically direct such action.

In some embodiments, the lenses of the adjustable eyewear may include, by way of example only, a crosshair, circle, and/or an image splitting prism. The exemplary lenses may be capable of being moved or translated into or out of a position in front of the wearer's pupils or line of sight, and thereby potentially allow for a true horizontal and/or vertical frame of reference for the wearer. When the wearer is no longer in need of the vertical or horizontal reference point, the lenses may be disposed in a position so that this portion of the lens comprising the reference point is not readily in the wearer's gaze. The reference points may be electronically applied to the lenses or may be permanently affixed thereon.

Figure 14:
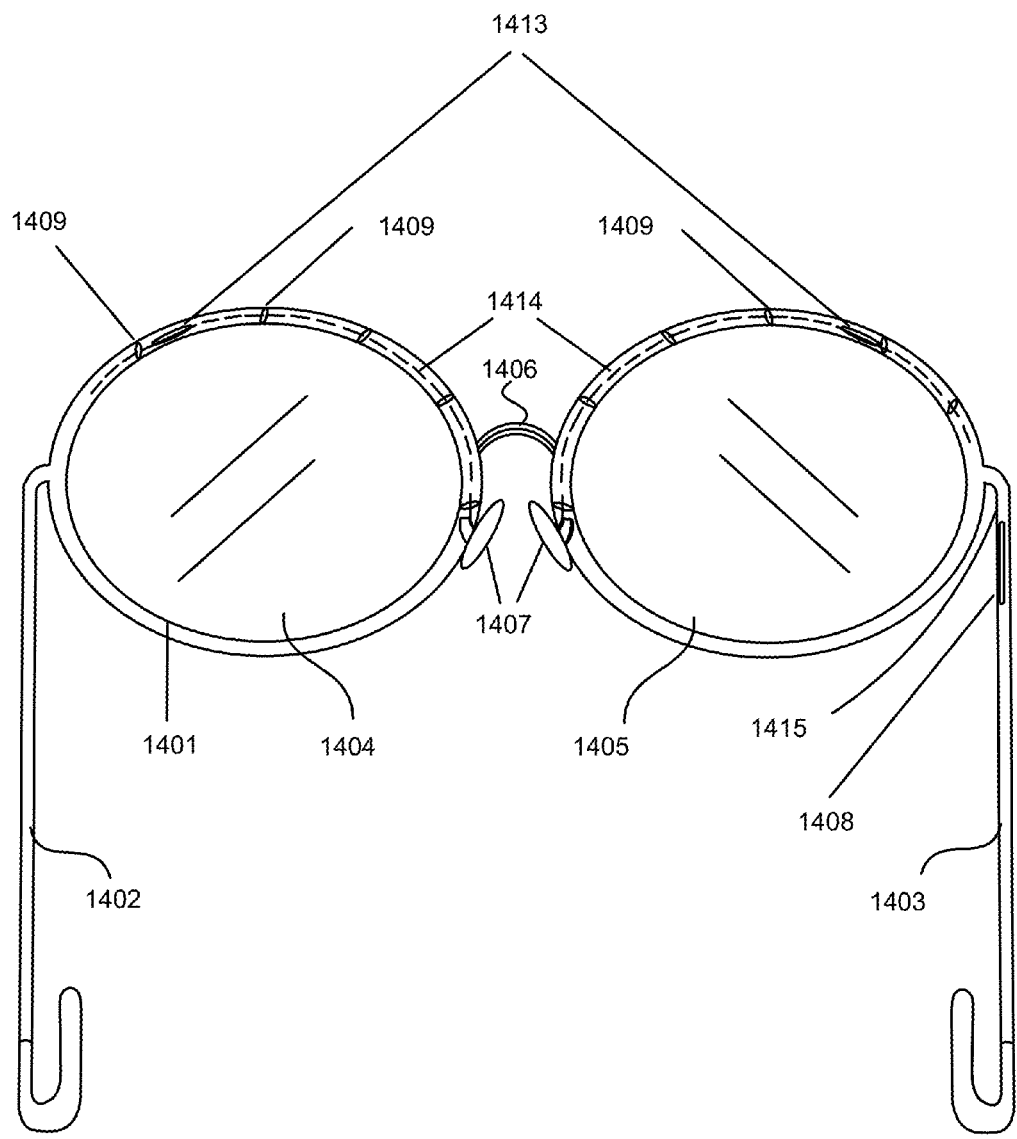
FIG. 14 shows a rear view of exemplary eyewear that may comprise a façade (or may otherwise mask the appearance of components of the device) in accordance with some embodiments.

With reference to FIGS. 14-19, exemplary embodiments comprising eyewear that may enable the lenses to be precisely and/or customizably moved relative to the wearer's eyes are provided. With initial reference to FIG. 14, in some embodiments, the eyewear capable of adjusting or translating may include façade front that may used to conceal a lens housing 1401 containing the lenses 1404 and 1405 (which may for instance comprise a progressive addition lens or a lens that comprise some of the exemplary features described above). The front surface of the façade is shown in FIG. 14 as facing away from the wearer and toward an observer. The backside of the façade faces the wearer. In this manner, the exemplary adjustable eyewear may mask or conceal the components that provide the adjustable functionality (i.e. the components that move the lenses relative to the wearer's eyes), and may thereby provide a more aesthetically pleasing and stylistic appearance. Moreover, in some embodiments, while the façade may mask or conceal the components, the façade may also be readily removed to allow access to these components, and thereby facilitate repair, maintenance, and/or customization without damaging or affecting the structural integrity of the frames. However, embodiments are not so limited, and therefore although the description below is provided with parts located on the façade, in come embodiments, these parts or components may be disposed in the frame or coupled thereto (such as on the lens housing or the temples).

Continuing with the exemplary device shown in FIG. 14, affixed to the back side of the façade are two micro motors 1413; one each located, by way of example only, on the superior backside of the façade (which may be temporally coupled to the lens housing 1401). As noted above, in some embodiments, the motors may be coupled to the lens housing 1401 or disposed therein. In some embodiments, only one micro motor can be used. A flexible line or wire 1409 may be coupled to each of the motors 1413 and to the movable member (in this case, nose pads 1407). The wire or line may be made of a material that may be stiff or rigid enough to apply a force in two directions (i.e. both a pushing force and a pulling source), but also be flexible enough to bend around the shape of the lens housing 1401. Some materials that the wire or line 1414 may comprise include, by way of example only, nylon, metal, or plastic and which, by way of example only, may be either monofilament or multifilament. In some embodiments, the wire or line may be hidden by being threaded thru a tube having an opening of a diameter sufficient to carry the wire or line from one point to another point on the frame or lens housing. In these embodiments, the wire or line moves within the tube while the tube acts as a guide and a means to hide the wire or line. The tube may be disposed inside the frame components (such as inside the temple and/or the lens housing), or may be disposed on the outside of the frame (such as along the back surface of the temples and/or lens housing).

In general, the dimensions of the line or wire 1414 may be dictated in part by the size of the lens housing 1401 or façade. By way of example, the wire or line 1414 in FIG. 14 may be approximately 0.5 mm in diameter and is shown as being affixed to the back of the façade by way of ring like holders 1409 that may allow for the line to slide freely through the holders 1409 in either direction. However, embodiments are not so limited, and in some instances the wire or line 1414 may be disposed within a cavity of the lens housing 1401 or may be coupled to a surface thereof. One end of the line or wire 1414 is affixed directly or indirectly to a nose pad 1407 and the opposite end of the line 1414 is shown as being attached either directly or indirectly to an actuator that can be, by way of example only, a micro-motor 1413. Such a micro-motor 1413 may be, for instance, that of a "squiggle motor" made by New Scale Technologies, Inc., which is commercially available. As shown in this exemplary embodiments, there are two separate lines 1414; one affixed directly or indirectly to each of the two nose pads 1407. When the micro-motors 1413 are activated, the wire or line 1414 may push or pull the nose pads 1407, and thereby move the lens relative to the eye by, for example: (1) extending the nose pads 1407 away from the lens housing 1401 and thereby applying a force to the wearer's nose; (2) rotating or adjusting the nose pads 1407 causing a different portion of the nose pads 1407 to contact the wearer's nose (or to contact the wearer's nose at a different location); or (3) cause the two nose pads 1407 to move closer together or farther apart, and thereby raising or losing the lens housing 1401.

The micro-motors 1413 may be coupled to an electronics module 1408 via a conductive path 1415 disposed in the temple 1403. The electronics module may comprise, for example, a power source (such as a battery or solar cell), a sensing mechanism (such as a touch switch), and/or a controller for receiving a signal from the sensing mechanism and determining whether to activate the micro-motor 1413. In some embodiments, the temple 1402 may also include an electronics module that may be coupled to a different micro-motor 1413.

Although the exemplary embodiment described in FIG. 14 was shown as using two wires or lines 1414, embodiments are not so limited, and in some embodiments only one line 1414 may be used, such as if it is affixed directly or indirectly to a bridge 1406 located superior to the nose of the wearer. In this case the bridge 1406 (or a component thereof) may be capable of pressing against the top of the nose thus raising or lowering the lens housing 1401 and thereby lenses 1404 and 1405 of the eyeglasses. In some embodiments, a single line 1414 may be affixed to a single component, which itself then allows for two lines to then be affixed directly or indirectly to two nose pads 1407. When a single line 1414 is used, one micro-motor 1413 can also be utilized, which may decrease costs (because there are less components) and complexity (as there is no need to ensure that the two or more motors are synchronized). When two independent lines 1414 are used, two micro-motors 1413 may be utilized, which may also require that the micro-motors receive the same signals and/or are otherwise synchronized to ensure that the lenses are raised and lowered approximately symmetrically.

Figure 15:
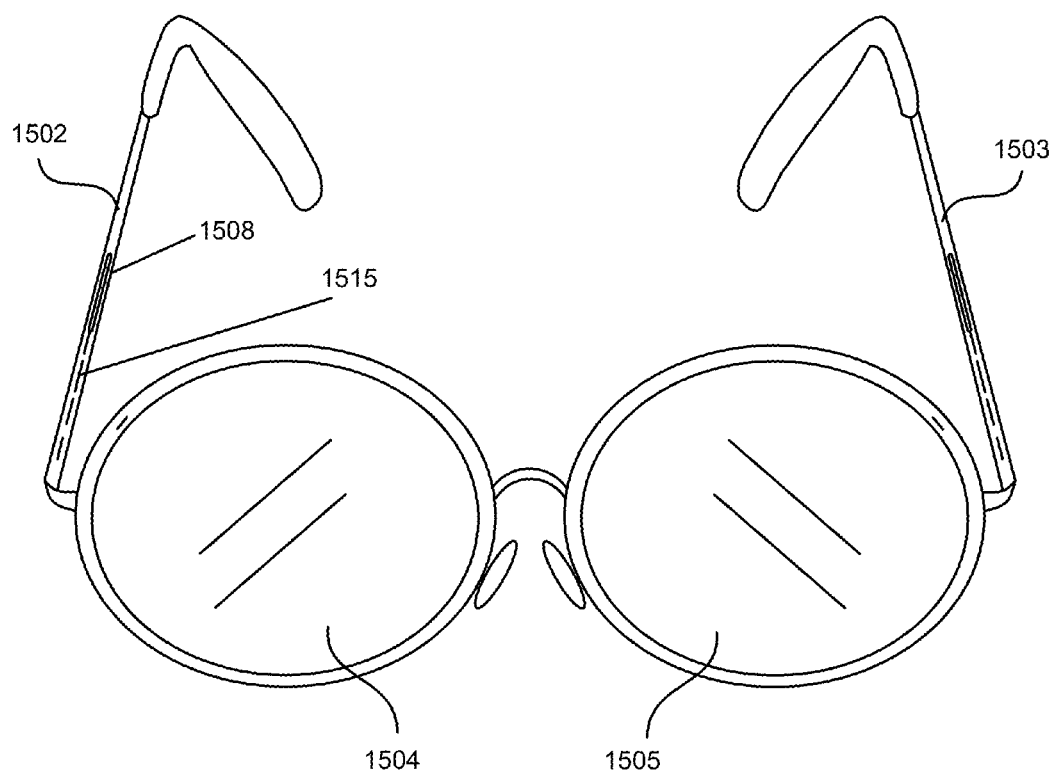
FIG. 15 shows a front view of exemplary eyewear that may comprise a façade (or may otherwise mask the appearance of components of the device) in accordance with some embodiments.

With reference to FIG. 15, the front view of the exemplary eyewear shown in FIG. 14 is shown. The adjustable eyewear includes temples 1502 and 1503, lenses 1504 and 1505, an electronics module 1508 disposed within the temple 1502, and a conductive path 1515 from the electronics module 1508 to the micro-motors (not visible). As shown in this embodiment, the components that adjust the position of the lenses 1504 and 1505 (e.g. the micro-motors and wires) are disposed on in the back surface of the lens housing and/or the façade, and are therefore masked from a viewer looking at the wearer. As noted above, this provides for a more aesthetically pleasing, and potentially stylish, pair of spectacle frames.

With reference to FIG. 16, another exemplary embodiment of adjustable eyeglasses is provided. The embodiment shown in this example is similar to the one described with reference to FIG. 14, except for the additional optical zone or feature 1612 and the cross 1611 indicating the position of the fitting point of the lens (i.e. the approximate position of pupil of the wearer's eye. during a primary gaze). That is, for instance, the eyeglasses comprise a lens housing 1601 that supports the lenses 1604 and 1605, a first temple 1602 and a second temple 1603, a bridge 1606 disposed between the first lens 1604 and the second lens 1605, two micro-motors 1613 disposed on the back surface of a façade (or in other embodiments, the lens housing 1601), wires or lines 1614 coupled to the motors 1613 and the nose pads 1607, and wire or line holding elements 1609 that are also coupled to the back side of the façade. As was described above, the optical zone or feature 1612 may comprise any suitable optical feature or component, such as an augmented reality system, a virtual reality system, a display (e.g. a HUD), a zoom lens, a micro-camera, spatial leveling system, or even one or more optical zones that may provide a different optical power.

As shown in FIG. 16, this optical zone or component 1612 is disposed above the fitting point 1611 so that it may not interfere with the wearer's primary gaze. Although in some instances, the wearer may be able to view the optical zone 1612 by directing his gaze upward (or tilting his head), this may not be convenient or comfortable. Thus, in some embodiments, the optical zone 1612 could be lowered to correspond or overlap with the pupil position of the wearer in the primary gaze by lowering the lenses 1604 and 1605 if the wearer desires to utilize this zone directly (e.g. by sending a signal to the controller in the electronics module 1608), or the zone could be moved further away from the pupil of the wearer's eye by raising the lenses 1604 and 1605 higher (for instance, if the wearer was distracted by the optical zone 1612 or the information therein).

With reference to FIG. 17, the front view of the exemplary eyewear shown in FIG. 16 is shown. The adjustable eyewear includes temples 1702 and 1703, lenses 1704 and 1705, an electronics module 1708 disposed within the temple 1702, and a conductive path 1715 from the electronics module 1708 to the micro-motors (not visible). As shown in this embodiment, the components that adjust the position of the lenses 1704 and 1705 (e.g. the micro-motors and wires) are disposed on in the back surface of the lens housing and/or the façade, and are therefore masked from a viewer looking at the wearer. As noted above, this may provide for a more aesthetically pleasing, and potentially stylish, pair of spectacle frames. Moreover, as shown, the optical zones 1712 are disposed over the fitting point of the lenses 1711 (i.e. above the wearer's primary gaze). However, the position of the optical zone 1712 may be varied relative to the pupil position of the wearer based on the position of the lenses 1704 and 1705. The optical zones 1712 may provide any optical power, such as those described herein (including, for example, different optical powers, HUD, targeting or leveling, etc.).

With reference to FIG. 18, another exemplary embodiment of adjustable eyeglasses is provided. The embodiment shown in this example is similar to the one described with reference to FIG. 14, except for the optical zone or feature 1812 That is, for instance, the eyeglasses comprise a lens housing 1801 that supports the lenses 1804 and 1805, a first temple 1802 and a second temple 1803, a bridge 1806 disposed between the first lens 1804 and the second lens 1805, two micro-motors 1813 disposed on the back surface of a façade (or in other embodiments, the lens housing 1801), wires or lines 1814 coupled to the motors 1813 and the nose pads 1807, wire or line holding elements 1809 that are also coupled to the back side of the façade, and the cross 1811 indicating the position of the fitting point of the lenses (i.e. the position of the wearer's eye during a primary gaze). The optical zone or feature 1812 in this embodiment is disposed near the top of the lenses 1804 and 1805 and may comprise a partially tinted (solid or gradient) or mirror optical component. This may be used, for instance, to shield the wearer's eyes from the sun. As used in this context, "gradient" may refer to when the optical zone 1802 provides a tinted layer that may be darker (or thicker) near the top of the lens and then may gradually get lighter (or thinner) as the position of the optical component gets closer to the fitting point 1811. Thus, in some embodiments, depending on the position and intensity of the sun, the lenses may be adjusted so that a needed tint of the optical zone is in a proper position relative to the wearer's eye.

As shown in FIG. 18, this optical zone or component 1812 is disposed above the fitting point 1811 so that it may not interfere with the wearer's primary gaze in its current position (for instance, if the wearer is indoors or it is nighttime). As noted above, the optical zone 1812 could be lowered to correspond or overlap with the pupil position in the wearer's primary gaze by lowering the lenses 1804 and 1805 if the wearer desires to utilize this optical zone directly (e.g. if the wearer would like to block the sun and thereby utilize the exemplary device as sun glasses) by sending a single to the controller in the electronics module 1808, or the zone could be moved further away from the pupil position of the wearer's primary gaze by raising the lenses 1804 and 1805 higher (for instance, if the wearer was distracted by the optical zone 1812 or if, for example, the sun was at an angle relative to the wearer's eyes and the wearer was attempting to block the glare there from by adjusting the position of the optical zone 1812).

With reference to FIG. 19, the front view of the exemplary eyewear shown in FIG. 18 is shown. The adjustable eyewear includes temples 1902 and 1903, lenses 1904 and 1905, an electronics module 1908 disposed within the temple 1902, and a conductive path 1915 from the electronics module 1908 to the micro-motors (not visible). As shown in this embodiment, the components that adjust the position of the lenses 1904 and 1905 (e.g. the micro-motors and wires) are disposed on in the back surface of the lens housing and/or the façade, and are therefore masked from a viewer looking at the wearer. As noted above, this may provide for a more aesthetically pleasing, and potentially stylish, pair of spectacle frames. Moreover, as shown, the optical zones 1912 are disposed over the fitting point 1911 (i.e. the position of the pupils in the wearer in his primary gaze). Indeed, in their current positions, it would be difficult for a wearer to look though optical zones 1912 because they are located at the top of the lenses 1904 and 1905. However, the position of the optical zone 1912 may be varied relative to the pupil position based on the position of the lenses 1904 and 1905. In this manner, the optical zones 1912 may be utilized by the wearer only when necessary or desired.

Embodiments disclosed herein may utilize lenses that may have a single (e.g. the embodiments shown in FIGS. 14-19 having polarized regions, a HUD, etc.) or multi focused lenses. Moreover, it may generally be preferred that the distance of translation of the lenses (i.e. the distance between a first position and second position of the lenses) may be within the range from 0 up to approximately 12 millimeters. In some embodiments, it may be more preferred that the range of the distances of the adjustments of the lenses from a first position to second position be within the range of between approximately 5.0 and 10.0 mm. As noted above, a change in the position of the lenses of approximately 5.0 mm or more generally results in positing an optical power or zone far enough away from the wearer's pupil in the primary gaze that it may not distract or otherwise distort the wearer's vision.

In some embodiments, an eyeglass frame and lenses may provided, wherein the eyeglass frame includes an electrical power source (e.g. a battery), a controller, and an actuator (e.g. a micro-motor). The actuator may be attached or coupled to a line or wire. In some embodiments, the line is may comprise a mono or multi filament. In some embodiments, the controller (e.g. a micro-processor, application specific integrated circuit, etc.) may be capable of stopping or starting the actuator at any point from fully actuated to zero actuation. In some embodiments, the lenses may comprise a progressive addition lens. In some embodiments, the lenses may comprise a display. In some embodiments, the lens comprises a zoom lens. In some embodiments, the line may be connected to a nose pad (e.g. the movable member in some embodiments). In some embodiments, the frame may include a façade style eyeglass frame. In some embodiments, the eyeglasses or eyewear may further include one or both of a switch or sensor. In some embodiments, the lens may include a partially tinted area that may be movable in front of the wearer's pupils. In some embodiments, the lens may include a partially mirrored or tinted area (either solid or gradient) that may be movable relative to (and in front of) the wearer's pupils.

Exemplary Embodiments

Described below are further exemplary embodiments of devices such as eyewear that may be adjustable such that the position of the lenses may be changed relative to the wearer's eye. The embodiments described herein are for illustration purposes only and are not thereby intended to be limiting. After reading this disclosure, it may be apparent to a person of ordinary skill that various components and/or features as described below may be combined or omitted in certain embodiments, while still practicing the principles described herein.

Embodiments provided herein may comprise eyewear such as spectacle frames and lenses (and combinations thereof) that may move or adjust their positions such that the lenses of the eyewear move relative to a wearer's eye. The movement of the frames may be such that one or more optical zones of the lenses are positioned in front of a wearer's eye (or in a more operable viewing position). This may provide the advantage to a wearer of using a single device (i.e. a single pair of eye glasses) that may provide, for instance, multiple optical powers for the wearer's primary gaze. That is, rather than traditional multifocal lenses for which the wearer must adjust his gaze upward or downward to utilize the different optical zones (see, e.g. FIGS. 1(a)-(c)), embodiments disclosed herein may provide for multiple static optical powers to be conveniently positioned in front of the wearer's pupil when looking horizontally (or in any other convenient location). Embodiments may comprise a movable member that may be utilized to adjust the position of the lenses, as well as various mechanisms for adjusting the position of the movable member. These mechanisms may be disposed within the frames of the eyeglasses, or be otherwise hidden or masked from view in some embodiments to maintain the aesthetics and style of the glasses (as well as to potentially protect the components from external forces).

In some embodiments, eyewear may be provided. The eyewear may include a lens housing, a first temple and a second temple coupled to the lens housing, and lens supported by the lens housing. The eyewear may further include a movable member coupled to anyone of, or some combination of, the lens housing, the first temple, or the second temple. As defined above, a "movable member" may refer to any device or component that may be moved (e.g. relative to the lens housing), extended, contracted, increase or decrease in size in a direction relative to the lens housing, and/or rotated. The movable member may be configured to move between a first position and a second position. A position of the lens may be based at least in part on the position of the movable member. The eyewear may also comprise a mechanism adapted to adjust the position of the movable member automatically or semi-automatically.

As used in this context, a "position of the movable member" may refer the position of the movable member (or a component thereof) relative to the lens housing, the orientation of the movable member (e.g. if it is rotated from a first rotational orientation to a rotational orientation), and/or the position may refer to size of the movable member or a component thereof. For instance, the movable member may have a first position when its volume expands (e.g. when fluid or pressure expand the component) and a second, different size (corresponding to a second position) when the movable member contracts (e.g. with the removal of pressure or fluid).

In these embodiments, the "position of the lens" may be changed based on the position of the movable member (or a change in the position). For example, the movable member may apply a force to the wearer's face (such as the wearer's nose) or head such that the lens housing is raised, lowered, or moved horizontally (or some combination thereof) when moving from a first position to a second position. The movable member may also maintain the first or the second position for a desired period of time. Examples of embodiments where the change of position of the movable member may affect a change in the position of the lens are described with respect to the exemplary embodiments shown in FIGS. 5-9. 13, 14, 21 and 25-27.

As was defined in more detail above, "semi-automatically" may refer to when the user signals to the mechanism (e.g. via a push button or touch switch) to adjust the position of the movable member. As was defined above, "automatically" may refer to when input is received by the mechanism based on a sensor or other automated system for determining when the mechanism is to be activated without any manual interaction. The use of automatic and semi-automatic input may offer the advantage of readily and accurately changing the position of the lens housing, without requiring the wearer to divert his attention and focus to the change (which may be useful when, for instance, operating a vehicle).

Moreover, the automatic and semi-automatic controls may more readily return the lenses to a predefined position. In some embodiments, the predefined positions that may pertain to providing different optical zones of the zones in the wearer's gaze may be programmed or configured in the mechanism. By way of example only, in some embodiments, the mechanism may have a controller or processor, which may be configured to raise or lower the frames to a preset height. In some embodiments, the wearer may set this height after acquiring the adjustable frames. For instance, the wearer may move the frames into a desired position (e.g. by lifting the frames relative to his face or activating the mechanism) and then "set" the position as a preset height for a position of the lenses. The mechanism may receive this setting and store it for future use. The process could be repeated for as many optical zones that may be present in the lenses. However, any suitable manner of setting predefined positions may be used in accordance with some embodiments. Of course, embodiments are not limited to predefined or preset configurations.

As used herein, a "mechanism for adjusting the position of the movable member" may refer to any device or component that may apply (or release) a force to/from the movable member so as to change its "position" (where the position was described above to include not just its distance or motion relative to the lens housing, but also rotation and changes in size or shape). For instance, the mechanism may comprise a micro-motor or micro-pump that may drive (or otherwise move or apply a force to) the movable member so as to move the movable member from one position to another. The mechanism may comprise a level or knob that may be rotated by a wearer, or any other suitable device for adjusting the position of the movable member.

In an exemplary embodiment, the eyewear or device may comprise a lens housing, a first temple and a second temple coupled to the lens housing, a lens supported by the lens housing, and a movable member movably coupled to the lens housing. The movable member may extend away from the lens housing and have at least two positions (i.e. the movable member may extend (or have a portion that extends) to at least two different distances away from the lens housing). In some embodiments, the movable member, or a portion thereof, may be moved into and out of a portion of the lens housing, such as the bridge of the lens housing or the nose pieces (e.g. nose pads). The movable member may extend from the lens housing in different amounts and may contact the nose or another part of the wearer. The movable member may apply a force to the wearer (e.g. the wearer's nose) and thereby change the position of the frame (and thereby the lenses) relative to the wearer's eye, such as by lifting the frames to a different position away from the face of the wearer. The movable member may be adjusted by the mechanism automatically or semi-automatically, which may in some instance off-set or reduce the need for a bulky mechanical system to adjust the position of the lens housing via the movable member.

It should be noted that in some embodiments, the frames may be moved up to (and beyond) the edge of the lens (for instance, when a display or optical component may be appended to the top or bottom of the lens housing, the lens housing may be moved to a position in which the wearer may view or use the component. For example, in some embodiments, a device could comprise a heads-up display (HUD), which may be located at the very bottom (or top) of the peripheral edge of the lens. In some embodiments, the lenses may connect by a movable member of the bridge that may move up and the frames remain largely stationary. That is, for instance, the lens housing may be stationary, but the movable member may apply a force to the lenses such that their position is moved relative to the wearer's eye as well as the frame. The lenses may, for example, be disposed on a track or other mechanism that allows such movement.

In addition, as was described above, it may be generally preferred that the lenses are moved between approximately 5 and 10 mm relative to the wearer's eye. For instance, when the distance is less than approximately 5 mm, an optical zone of the lens that is not intended to be in use may be noticeable to the wearer, which may be distracting and/or affect the vision of the wearer. The lenses may comprise bifocals, trifocals, quadrifocals, etc. In some embodiments, the lenses may be multifocal static lenses that have discontinuous optical power zones. In some embodiments, the lens may comprise one or more continuously variable optical power zones (such as a PAL). The different optical zones may be disposed in the wearer's view based on the position of the movable member so as to provide different optical powers without the wearer having to adjust his gaze and/or the tilt of his head. An example of the position of the lenses relative to optical zones of the lens will be described in more detail with reference to FIGS. 32(a)-(c).

In some embodiments, in the eyewear as described above that comprises a lens housing, a first temple and a second temple coupled to the lens housing, a lens supported by the lens housing, a movable member configured to move between a first position and a second position, and a mechanism to adjust the position of the movable member, the mechanism may be configured to continuously adjust the position of the movable member between the first position and the second position. That is, for instance, the lens position may be set at any position within a range (e.g. between 5 and 10 mm). This may allow for a customized selection of the height of the lenses (as well as any optical zones thereon), by the wearer so that he may choose position of the lenses that is most comfortable for the distance and location of an object being viewed. The continuous variation may be achieved by utilizing, for example, an actuator that has an actuator arm that applies the force to the movable member (or the actuator arm may comprise a component of the movable member) that may extend any distance within a set range, and may "lock" or otherwise set a position by simply stopping the actuator. In some embodiments, the mechanism may be configured to adjust the position of the movable member to a third position that is located between the first and the second position. Embodiments that may allow for a continuous change in the position of the lenses may correspond to embodiments where the lens housing may be adjusted while the eyewear is worn on the wearer's face. This may permit the wearer to the move the lenses through multiple optical power regions (or a continuous optical power region) until an object comes into focus. As described above, the mechanism or other component of the eyewear should be capable of holding the lens housing and lenses in the third position, even when external forces such as the weight of the glasses or force associated with the normal movement of the head are exerted on the frames. This may include one or more stops, such as friction, grooves, or other structural features of the lens housing or movable element.

In some embodiments, in the eyewear as described above that comprises a lens housing, a first temple and a second temple coupled to the lens housing, a lens supported by the lens housing, a movable member configured to move between a first position and a second position, and a mechanism to adjust the position of the movable member, the lens may each have a fitting point, and the mechanism may be configured to adjust the position of the movable member such that the fitting point of the lens may be disposed in any location between 2 mm and 10 mm above or below the approximate center of the pupil in the wearer's primary gaze. As noted above, the optical zones may be placed in any suitable location on the lens. In general, the distance from the fitting point that an optical zone is disposed may depend on such considerations as the height of the lens (see dimension 3001 in FIG. 30), the number of optical zones of the lens (the more optical zones, the smaller each zone may need to be), and/or the size of each optical zone.

In some embodiments, the position of the movable member may be continuously adjusted based on an input received from the wearer. As was described above, this could include a switch or mechanism that the wearer continues to apply a force or pressure to until the lenses are in a desired location, at which point he may remove his finger and the mechanism (which may comprise a motor) will stop moving the lenses. In some embodiments, the sensing mechanism may sense a first indication from the user (e.g. a swipe, multiple swipes, or tap multiple taps, of the finger, tilting of the head, unusual movements of the head to signal activation) and begin changing the position of the lenses until a second signal is received. As noted above, this may allows for continual adjustments while the eyewear is being worn.

In some embodiments, in the eyewear as described above that comprises a lens housing, a first temple and a second temple coupled to the lens housing, a first and a second lens supported by the lens housing, a movable member configured to move between a first position and a second position, and a mechanism to adjust the position of the movable member, the lens may have a fitting point, and a first position of the movable member may correspond to when the fitting point of the lens is disposed near the center of the wearer's pupils in the wearer's primary gaze. As noted above, the term "near" may refer to within 2 mm of the center of the pupil. Thus, when the movable member is in its first position (e.g. not activated or contracted), the fitting point (as was defined above to correspond to the primary gaze of the wearer for distance vision) may be disposed in front of the pupil. An example of this is shown in FIG. 32(a), where the first optical zone 3201 (which may comprise the fitting point of the lens) is disposed in optical communication with the wearer's eye. In some embodiments, a second position of the movable member may correspond to when the fitting point of the lens is disposed above or below the center of the wearer's pupils in the wearer's primary gaze. An example of this is shown in FIG. 32(b) (where the movable member may have lowered the position of the lens into second position) and FIG. 32(c) (where the movable member may have raised the position of the lens into a second position). In this manner, the lens may be adjusted based on the position of the movable member, which may move the defined fitting point (and corresponding optical zones on the lens) above or below the pupil for the wearer's primary gaze.

In some embodiments, the second position of the movable member may correspond to when the fitting point of the lens is at least approximately 2.0 mm above or below the center of the wearer's pupil in the wearer's primary gaze. This may correspond to a minimal distance that may permit a different optical zone to be adequately used by a wearer with noticing a boundary condition with another optical zone in the primary gaze. In some embodiments, the second position of the movable member may correspond to when the fitting point of the lens is at least approximately 5.0 mm above or below the center of the wearer's pupil in the wearer's primary gaze. A movement of the lens by 3.0-5.0 mm or more may be preferred because the inventors have found that for many embodiments, moving an optical zone having a different optical power 3.0-5.0 mm above or below the pupil (and thereby the primary gaze of the eye) reduces the ability of the wearer to perceive the boundary between the two optical zones. In some embodiments, the second position of the movable member may correspond to when the fitting point of the lens is between approximately 5.0 mm and 10.0 mm above or below the center of the wearer's pupil in the wearer's primary gaze.

In some embodiments, in the eyewear as described above that comprises a lens housing, a first temple and a second temple coupled to the lens housing, a first and a second lens supported by the lens housing, a movable member configured to move between a first position and a second position, and a mechanism to adjust the position of the movable member, the movable member may be contracted in the first position. As used in this context, "contracted" may refer to when the movable member may be disposed so that it has its smallest dimension in the vertical direction (or may be disposed within the lens housing). In some embodiments, where the movable member may always be configured to be extended some distance away from the lens housing (e.g. when the movable member comprises one or more nose pads), "contracted" may also refer to when the movable member is extended from the lens housing at its shortest distance.

In some embodiments, the movable member may be extended in the second position. As used in this context, "extended" may refer to when the movable member may be disposed so that it has a larger dimension in the vertical direction in comparison to when the movable member is "contracted." In some embodiments, "extended" may also refer to when the movable member is extended from the lens housing at a distance that is greater than when "contracted."

In some embodiments, in the eyewear as described above that comprises a lens housing, a first temple and a second temple coupled to the lens housing, a first and a second lens supported by the lens housing, a movable member configured to move between a first position and a second position, and a mechanism to adjust the position of the movable member, the lens housing may include a bridge located between the first and the second lens. In some embodiments, the movable member may comprise the bridge or a portion thereof. That is, for example, the bridge could comprise a component that extends and contracts out of the lens housing (such as the elements described with reference to FIGS. 3-8, or the bridge itself could expand or contract (e.g. with an increase in fluid or pressure), as will be described below with reference to FIG. 25. In some embodiments, the movable member may be disposed at least partially within the bridge (e.g. the movable member may extend in and out of the bridge of the lens housing, which may also serve to store the movable member when not in use. That is, for instance, in some embodiments, the movable member may be configured to extend out of the bridge. In some embodiments, the movable member may be configured to extend away from the bridge. For example, the movable member may be coupled to a portion of the bridge (such as an outside surface that may be opposite to the wearer's nose), and extend or contract in a direction toward (and away from) the wearer's face. An example of this embodiment is shown in FIGS. 20-21 and 23-25, and described in detail below. It should be understood that as used in this context, extending away from the bridge may include embodiments that comprise a bladder or fluid containing element that is coupled to the bridge and expands when pressure is increased. Some embodiments that dispose or couple the movable member on the outside of the bridge may enable replacement or customization (or make such modifications more readily available) of the movable member because the bridge need not be taken apart or otherwise affected.

In some embodiments, in the eyewear as described above, the eyewear may further include a nose pad coupled to the lens housing, where the nose pad is configured to contact a wearer's nose, and where the movable member is disposed at least partially within the nose pad. In some embodiments, the movable member may be configured to extend out of the nose pad. Examples of this are shown and described in more detail with reference to the exemplary embodiments shown in FIGS. 26 and 27. In some embodiments, the movable member may comprise the nose pad. This may include, by way of example only, nose pads that comprise a bladder or other fluid containing element that may inflate, or nose pads that may be rotate or moved closer together. Examples of such embodiments are shown in FIGS. 14-19 and 26. In general, the use of the nose pads may provide the benefit of providing a manner of adjusting the positions of the lenses without utilizing the entire bridge (or an element disposed within the bridge). This may permit the use of the adjustable frames with styles that may have a bridge that could be as small as, for instance 2.0 mm in diameter. In contrast, in some embodiments if the entire mechanism and/or movable element (or a substantial portion thereof) is disposed in the bridge, those embodiments may be less versatile and useful for certain frame styles.

In some embodiments, the mechanism may be configured to adjust the position of the nose pad by rotating the nose pad. That is, for instance, the nose pads may not be symmetrical, and therefore rotating the nose pads may result in different portions of nose pad contacting the wearer's nose (or to contact a different portion of the wearer's nose) and may thereby raise or lower the lenses. In some embodiments, the mechanism may adjust the position of the nose pad by changing the shape and/or the size of the nose pad. That is, the nose pad position (as was defined above) may include its size and shape, and by altering the features of the nose pads, the lenses may be raised or lowered (or otherwise have the position changed). For instance, in some embodiments, the mechanism may change the shape and/or the size of the nose pad by applying or removing fluid from the nose pad.

In some embodiments, in the eyewear as described above, the eyewear may further include a first nose pad and a second nose pad, where the first nose pad may be disposed at a first distance away from the second nose pad. In some embodiments, the movable member may include the first nose pad, the second nose pad, or both. That is, the mechanism (such as a micro-motor) may apply a force to either or both nose pads. In some embodiments, the mechanism may adjust the position the lens housing by adjusting the first distance between the first and the second nose pads. That is, for instance, by moving the nose pads either closer, or further apart, the lens housing may also be raised (corresponding to when the nose pads are moved closer together) or lowered (corresponding to when the nose pads are moved further apart).

In some embodiments, in the eyewear as described above, the movable member may comprise a spring. The spring may be used to apply a continual force on the movable member (or a component thereof) to either extend the movable element (e.g. in trap door embodiments, such as those described with reference to FIGS. 3-7) or to contract the movable member. The spring may also be used to apply a force that resists further motion, and thereby serves as a "stop" to maintain the position of the lenses until a force greater than the usual forces experienced by the movable member (e.g. the weight of the lens housing or accelerations during normal use) is applied to change the position.

In some embodiments, in the eyewear as described above, the mechanism may include an actuator. The actuator may be configured to adjust the position of the movable member between the first and the second positions. As used herein, an "actuator" may be any component or device that adjusts the position of the movable member in any suitable manner. For instance, in some embodiments, the actuator may apply or remove a force to the movable member in the vertical or horizontal direction to displace the movable member; or it may rotate the movable component, increase its size or shape, etc. In some embodiments, the actuator may remove and/or redirect a force that is applied to the movable member (for example, the movable member may comprise a spring and the actuator may comprise, or be coupled to, a trap door that may be operatively coupled to the spring—e.g. the spring may apply a force to the trap door such that, when the actuator opens the trap door, the spring may no longer apply a force to the trap door, and thereby extend out and/or apply a force to a wearer's nose). The actuator may, in some embodiments, be automatic or semi-automatic and it may comprise an electrical or mechanical functionality (such as a push switch and/or mechanical components).

In some embodiments, the actuator may include one or more micro-motors or micro-pumps. Such devices may be concealed on the frames or disposed within one of the components (such as the temples or the lens housing). A micro-motor may be used to apply a "push" and/a "pull" force, such as when apply a force to a wire or nylon having sufficient rigidity. Embodiments that use a micro-pump may move a fluid (which may include a liquid, gas, or gel) from one component or another within the frames, and thereby apply pressure or force on the component. In some embodiments, the actuator may include one or more knobs or sliders that may be manually rotated by the wearer. For instance, the wearer may move the slider, which may be connected to an actuator arm or other component that may apply a force to the movable member. An example of this is shown FIG. 28 and described below. In some embodiments, the actuator may further include at least two of: a sensing mechanism configured to receive a signal to drive the movable member (e.g. a touch switch, photodiode, photo-sensor, accelerometer, micro-gyroscope etc.); a controller configured to receive a signal from the sensing mechanism and to determine whether to adjust the position of the movable member (e.g. a microprocessor or ASIC), and a power source (e.g. a battery). This, in some embodiments, the sensing mechanism may comprise a micro-accelerometer or micro-gyroscope, which may be configured to determine the gaze direction of the user (e.g. whether the wearer is looking down) or to receive a predefined head movement to signal a change.

In some embodiments, in the eyewear as described above that comprises a sensing mechanism, the sensing mechanism may comprise a touch switch or push button. This component may be disposed on any suitable location on the frame, but it may be preferred that the touch switch be disposed on a surface of the temple or lens housing that is not opposite to the wearer's head. This may reduce the likelihood of accidental activation. In some embodiments, the sensing mechanism may comprise a slider. A slide may be beneficial in some instances because the amount the distance that the lens housing is adjusted above or below the fitting point may correspond proportionally to the distance that the wearer moves the slider. This may enable quickly adjusting the position of the slider, and may enable adjustments made in a continual manner. As noted above, the sensing mechanism may be disposed on the temple or lens housing in some embodiments, and in a location that may be easily accessed by the wearer to signal that a change in the position of the lenses may be needed.

In some embodiments, in the eyewear as described above that comprises a lens housing, a first temple and a second temple coupled to the lens housing, a first and a second lens supported by the lens housing, a movable member configured to move between a first position and a second position, and a mechanism to adjust the position of the movable member, the lens or lenses may comprise a progressive addition lens having a progressive addition surface. In some embodiments, the progressive addition surface of the lens may have a short channel or a long channel. As used herein, a "short channel" may refer to a progressive addition surface where the channel has a length that is 15 mm or less from the fitting point to a point where the progressive surface is at 80% of max power of lens. Examples are shown in FIGS. 32(*g*)-(*i*). A "long channel" may correspond to a channel that has a length that is greater than 21 mm. Examples are shown in FIGS. 32(*d*)-(*f*). In general, the longer the channel length of a PAL, the less distortion and the wider the viewing corridor. In contrast, the shorter the channel length, the greater the distortion. However, a long channel in a conventional lens (and a static frame) typically extends far enough down on the lens that the wearer is required to tilt his head at a steep angle and/or attempt to look down to the edge of the lens to fully utilize the add power. This causes eye fatigue and headaches. Thus, the inventors have found that embodiments disclosed herein may provide an advantage over such static frames using a long channel progressive because, for instance, when the full add power is needed, the lens may be raised, lowered, or otherwise have its position adjusted so that the full add power region is in a more convenient location for use. Embodiments may therefore provide the benefits of a long channel (e.g. less distortion), with the convenience of a shorter channel (e.g. more convenient for the wearer to look through the add power region). Thus, in some embodiments, the channel length of the progressive addition surface may be less than or equal to approximately 15 mm. In some embodiments, the channel length of the progressive addition surface may be greater than or equal to approximately 21 mm. Moreover, in some embodiments, in the eyewear as described above, the lens may provide a continuous optical power.

Although some embodiments may provide advantages when using progressive addition lenses, embodiments are not so limited and therefore in some embodiments, in the eyewear as described above, the lens may provide discontinuous optical power. In some embodiments, the lens may provide at least two optical zones having different optical powers. In some embodiments, the lens may comprise exactly two optical zones having different optical powers. In some embodiments, the lens may comprise exactly three optical zones having different optical powers. In some embodiments, the lens may comprise exactly four optical zones having different optical powers. In some embodiments, the lens may comprise five or more optical zones, each having different optical powers. In general, any number of optical zones may be provided subject to the dimensions of the height of the lens. For instance and as noted above, in general it may be preferred that each optical zone have a height of at least 5 mm so that, when the wearer is using that optical zone, he may not readily perceive the discontinuity at the border of another optical zone.

In some embodiments, in the eyewear as described above, the lens may comprise a first optical zone and a second optical zone. The first position of the movable member may correspond to a position of the lens where the first optical zone is disposed in optical communication with the approximate center of the wearer's pupil in the wearer's primary gaze. In some embodiments, the second position of the movable member may correspond to a position of the lens where the second optical zone is disposed in optical communication with the approximate center of the wearer's pupil in the wearer's primary gaze. An example of this is shown in FIG. 32, and described in more detail below. Briefly, as can be seen in the illustrations therein, embodiments may provide that ability to set the positions of the lenses to correspond with the positions of the lens that a wearer may look through when using the optical power provided. This may reduce the need for uncomfortable head tilt, and may further enable the use of a single device to provide multiple optical powers (e.g. far, intermediate, and near).

In some embodiments, in the eyewear as described above, the mechanism may include one or more fluid holding elements coupled to the first temple, the second temple, and/or the lens housing, where the position of the movable member is based at least in part on the amount of fluid disposed within the fluid holding element. As described previously, a "position" of the movable member may also refer to the size and/or shape of the movable element—that is, as used herein, an element may be moved if its size increases or decreases. In some embodiments, the movable member may move from the first position to the second position based on the removal of fluid from the fluid holding element. In some embodiments, the movable member may move from the second position to the first position based on the application of fluid to the fluid holding element. In some embodiments, the fluid holding element may be operatively coupled to one or more nose pads. As used herein, "operatively coupled," may refer to when an element (such as an actuator or a fluid holding element) may apply a force (and/or pressure using a fluid) to another components (such as a movable member, the nose pads, the bridge) via any suitable medium (such as using a tube or fluid cavity to move fluid and or apply pressure between two components).

The use of fluids and fluid holding elements to apply and transfer forces in some embodiments may provide some advantages. For instance, the use of a fluid may decrease the use of micro-mechanical parts such as micro-motors, which can add to the complexity of the manufacturing process. Moreover, the movable element may also not need to be mechanical, but could itself comprise a fluid containing element that may change its shape by transferring fluid from the fluid holding element to the fluid container.

Figure 25:
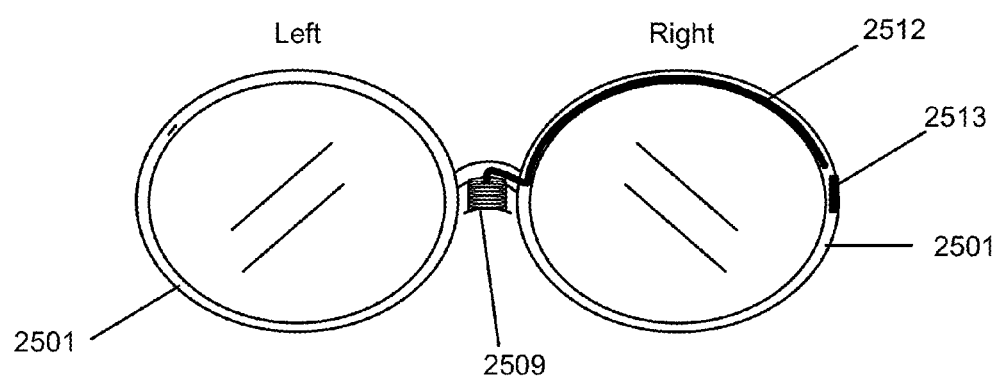
FIG. 25 shows a rear view of the lens housing of exemplary eyewear in accordance with some embodiments.

In some embodiments, the lens housing may include a bridge disposed between the first and the second lens, and the fluid holding element may be operatively coupled to at least a portion of the bridge. An exemplary embodiment is shown in FIG. 25 and described below.

In some embodiments, in the eyewear as described above where the mechanism may include one or more fluid holding elements coupled to the first temple, the second temple, and/or the lens housing, the mechanism may further include a first actuator. The first actuator may be configured to apply or remove fluid from the fluid holding element. In some embodiments, the first actuator may be disposed within the first temple. In some embodiments, the first temple and/or the lens housing may comprise a fluid cavity. In some embodiments, the first actuator may be operatively coupled to the movable member by the fluid cavity.

In some embodiments, in the eyewear as described above, the mechanism may comprise a second actuator that may be configured to apply or remove fluid from the fluid holding element or from a second fluid holding element. In some embodiments, the second actuator may be disposed within the second temple.

In some embodiments, in the eyewear as described above, the actuator and/or the fluid holding element may be operatively coupled to the movable member by one or more tubes. In some embodiments, the one or more tubes may be disposed at least partially within the lens housing. In some embodiments, the one or more tubes may be disposed along a surface of the lens housing. In some embodiments, the tube or tubes may comprise a portion (or all) of the lens housing. In some embodiments, the tube may have an overall diameter or thickness equal to or smaller than that of the lens housing member. This may enable the tube to be disposed within the lens housing, or coupled to a surface of the lens housing and masked or hidden from view. In some embodiments, the surface of the lens housing that the tube is disposed on is the surface that is disposed closest to the wearer's face. In some embodiments, the eyewear may further include a façade, where the façade may cover at least part of the one or more tubes that are disposed along an outside surface of the lens housing. A façade may be used to provide an appearance of a stylistic appearance of the frames that may be different than the frames themselves, and may also be used to mask functional components.

In some embodiments, in the eyewear as described above that comprise a fluid holding element, the fluid holding element may comprise a bladder or a reservoir. The fluid holding element may be used to store the fluid that is not being used to apply a force or pressure to the movable member. When the lenses are to be moved, fluid from the fluid holding element may be applied accordingly and as described herein. The fluid holding element may comprise, by way of example, a plastic, rubber, or even metal material (particularly in embodiments that may comprise a micro-pump). The fluid holding element may be located in any suitable location of the eyewear.

In some embodiments, in the eyewear as described above, the lens housing may further comprise a bridge disposed between the first and the second lens. In some embodiments, the mechanism may include a first actuator that may be disposed within the bridge.

In some embodiments, in the eyewear as described above that comprises a fluid holding element, the eyewear may further include one or more nose pads. The nose pads may be coupled to the lens housing by one or more nose pad arms. In some embodiments, the first actuator may be coupled to the nose pads by the nose pad arms such that fluid may be applied to or removed from the nose pads by the first actuator through the nose pad arms. Some such embodiments may provide the advantage of allowing the movable member and its components to be hidden with the components of the lens housing, and to extend in a manner which may be less conspicuous to an observer.

In some embodiments, in the eyewear as described above, the actuator may be any one of, or some combination of: a micro pump or a micro motor.

In some embodiments, eyewear may be provided. The eyewear may include a lens housing, a first temple and a second temple coupled to the lens housing, a lens supported by the lens housing, a fluid holding element integrally coupled to the lens housing, the first temple, or the second temple, and a movable member coupled to the lens housing, the first temple, or the second temple. The movable member may be configured to move between a first position and a second position based at least in part on an amount of fluid disposed within the fluid holding element. A position of the lens may be based at least in part on the position of the movable member. As was previously defined, a "fluid holding element" may refer to any component that may retain (or otherwise contain) a fluid. A fluid holding element may also be referred to as a reservoir.

As used herein, "integrally coupled" may refer to when the fluid holding element is disposed within, directly coupled to, or forms a part of, the lens housing or one of the temples of the eyewear. For example, integrally coupled may refer to when the fluid holding element is coupled to the frames so as to be aesthetically pleasing—such as when the fluid holding element is not visible to an outside observer (or appears to be a part of the frames of the eyeglasses). In some embodiments, the fluid holding element could be approximately the same size (e.g. thickness) as the frames and/or be disposed on the inside of the frames—that is, the fluid holding element may be located between the wearer's head and the temple (i.e. coupled to a surface of the frames closest to the wearer's head). As noted above, in some embodiments, the fluid holding element may be disposed inside the frames (such as inside the temple or the lens housing). This may mask or otherwise hide the component from view, and may also protect the fluid holding element from outside forces. There may be one or more components that may be utilized to interact with the fluid holding element, such as a push button or slider, which may be partially exposed or extend out of the frames. In some embodiments, the fluid holding element itself may extend out of, or otherwise be exposed from the frames, such that the wearer may directly apply a force to the element (e.g. an exposed membrane).

In some embodiments, in the eyewear as described above that includes a fluid holding element, the eyewear may further include a mechanism that may be adapted to manually adjust the amount of fluid disposed in the fluid holding element. As used herein, "manually" may refer to when the user provides the force that also moves the movable member (in contrast to automatic or semi-automatic, where a mechanism may provide the force). This may include, by way of example, a slide mechanism, where the force of the user sliding a finger over the mechanism applies a force to a fluid. This could also include a user rotating a knob or pushing a button that applies pressure or force to the fluid holding element, or another component such that fluid is forced into or out of the fluid holding element based on the amount of force applied by the wearer.

In some embodiments, the mechanism may be configured to continuously adjust the position of the movable member between the first position and the second position. However, as noted above, embodiments may require that a stop mechanism be provided such that the lens housing (and thereby the lenses) remains in a second position, and does not simply force the fluid back into the fluid holding element and return to a first position. This may include, for instance, sufficient friction for the movable element or another component so as to hold the position of the lenses, or another force or component (such as a latch, a groove, etc.) that allows the lens housing to be raised and held in any position that is desired by the viewer for an appropriate length of time (i.e. so long as the user would like to continue to use a particular optical power.

In some embodiments, the mechanism may be configured to discretely adjust the position of the movable member between the first position and the second position. As noted above, the discrete positions may correspond to one or more "stops" such that the lens housing may be moved between these positions, but that it will not hold a position that is disposed between the designated (i.e. defined or discrete) positions (and the corresponding stops). Embodiments could provide some advantages, such as for instance, enabling the user to more readily and repeatedly return the frames to the predefined positions, which could be more difficult in embodiments that allow for a continuous change.

In some embodiments, in the eyewear as described above, the eyewear may further include a plurality of stops. Each stop may be configured to maintain a position of the movable member when the eyewear is worn by a wearer. In some embodiments, the plurality of stops may include a first stop and a second stop. The first stop may maintain the movable member in the first position and the second stop may maintain the movable member in the second position. In some embodiments, the plurality of stops may comprise a structural component of the lens housing. Some examples of exemplary stops that may be used in some embodiments could include structural components such as a ridge or groove that may prevent the movable member from extending beyond a certain point, or may stop the movable member from contracting too far. The stop may provide the benefit of maintaining the position of the movable member (and thereby the lens housing) when the eyewear is in normal use. During normal use, the weight of the lens housing, and the movement of the eyeglasses relative to the face (e.g. when a wearer is walking) may create a force on the movable member that may cause it to contract. Therefore, without a stop, the eyeglasses may not maintain a position and may not be usable for some purposes.

In some embodiments, in the eyewear as described above that includes a fluid holding element and a mechanism, the mechanism may be configured to apply a force to the fluid in two directions. For example, embodiments may provide both a "push" and "pull forces (e.g. when fluid is applied or removed from the fluid holding element. As noted above, the Allen reference (U.S. Pat. No. 3,365,263) fails to provide an adequate solution to the problem because it relies on pressurized fluid and an unsealed system to raise and lower the system. Thus, the Allen system does not have a "pull" force, it is only two push forces based on the pressure of the fluid. In some embodiments, the mechanism may comprise a rotatable knob or a slider. In some embodiments, a spring may also be utilized to assist in providing additional mechanical force with one or both of the push and pull forces.

In some embodiments, in the eyewear as described above, the mechanism may be disposed on the first or the second temple. In some embodiments, the mechanism and/or the fluid holding element may be disposed at least partially within the first or the second temple. In some embodiments, the mechanism may be disposed on (or otherwise coupled to) the lens housing. Coupling may be performed in any suitable manner, including embedding the device, using fasteners (such as screws) or adhesives, or the components could be structurally integrated.

In some embodiments, in the eyewear as described above that includes a fluid holding element, the movable member may move from the first position to the second position based on the removal of fluid from the fluid holding element. In some embodiments, the movable member may move from the second position to the first position based on the application of fluid to the fluid holding element. In some embodiments, the movable member may move from the first position to a second, third, fourth or fifth position based on the application of fluid to the fluid holding element. In some embodiments, the movable member may move continuously in a tunable manner from one position to another until it reaches the desired location of the wearer. Such movement may be automatic or semi-automatic.

In some embodiments, in the eyewear as described above that includes a fluid holding element, the lens may have a fitting point, and the amount of fluid disposed in the fluid holding element may be configured to adjust the position of the movable member such that the fitting point of the lens may be disposed in any location between 2 mm and 10 mm above or below the approximate center of the pupil in the wearer's primary gaze.

In some embodiments, in the eyewear as described above that includes a fluid holding element, the lens may each have a fitting point and the amount of fluid disposed in the fluid holding element may be configured to adjust the position of the movable member such that the fitting point of the lens may be disposed in a plurality of discrete locations between 2 mm and 10 mm above or below the approximate center of the pupil in the wearer's primary gaze.

In some embodiments, in the eyewear as described above that includes a fluid holding element, the fluid holding element may comprise a reservoir and/or a bladder.

In some embodiments, in the eyewear as described above that includes a fluid holding element, the movable member may comprise a fluid containing element. Note that although two different terms are used to describe the separate components of a "fluid holding element" or reservoir (e.g. related to the mechanism for controlling the position of the movable member) and the fluid containing element (which may relates to a component that may comprise a part of the movable member and may receive fluid and or pressure from the fluid holding element), the two components could in some embodiments comprise the same material and/or elements. In some embodiments, the fluid containing element may comprise one or more nose pads. In some embodiments, the fluid containing element and the fluid holding element may be operatively coupled such that fluid that is removed from the fluid holding element may be applied to the fluid containing element. In some embodiments, the fluid containing element may comprise a bladder.

In some embodiments, in the eyewear as described above that includes a fluid holding element, the lens housing may further comprise a bridge that is disposed between the first and the second lens. The movable member may include a portion of the bridge and the fluid holding element may be operatively coupled to the bridge. Examples of such embodiments are shown in FIGS. 20-21 and 23-25.

In some embodiments, in the eyewear as described above, the fluid holding element may be operatively coupled to the movable member. Consistent with the definition provided above, as used in this context, "operatively coupled" may refer to when the fluid holding element and another component are configured such that the fluid holding element may apply a force to the movable member. In some embodiments, the force may include the application or removal of fluid (and/or pressure from the fluid) from the fluid holding element to a portion of the movable member. In some embodiments, the first temple and/or the lens housing may comprise a fluid cavity. A fluid cavity, as sued herein, may comprise any path or component that may be sued to transport fluid from one part of the frame to another. It may simply comprise a channel in the frame that may be included during manufacture. However, this may increase the risk of a leak if a crack develops in the frame and therefore a water proof material and/or tubing may be disposed in the fluid cavity. In some embodiments, the fluid holding element may be operatively coupled to the movable member by the fluid cavity. That is, for instance, a reservoir may apply fluid to a movable member (such as the nose pads or a bridge) using a hollowed or piped frame element of the eyewear.

In some embodiments, the eyewear may further comprise a tube that may be coupled to the lens housing. The fluid holding element may be operatively coupled to the movable member by the tube. As used herein, a "tube" may refer to any device that may transport fluid from one portion of the eyewear to another portion. In some embodiments (e.g. embodiments that may not comprise a fluid holding element), a tube may also be used to house other components, such as a wire that may run from a mechanism to the movable member. A tube may have any shape (i.e. it need not have a circular cross section) and may comprise any suitable material (e.g. metal, plastic, etc.). In general, it may be preferred that the tube comprises a flexible material such that, in embodiments where it may be disposed at least partially on (or within) the first temple, it may flex when the temple is opened or closed. In some embodiments, the tube may be disposed at least partially within the first temple and/or the lens housing, and may thereby serve as a conduit for fluid or a wire. In some embodiments, the tube may have a diameter that is less than, or equal to, approximately 2 mm. As noted above, some frame designs may have components (particularly in the lens housing) that may have diameters that are less than 2 mm. Therefore, it may be preferred to be able to use the tubes in most embodiments of frames, which may thereby require tubes that have smaller diameters. The inventors have found a preferred range for diameters for the tube such that the fluid may flow with adequate pressure (or such that the tube may house a wire with adequate rigidity), but still be useful in most frame designs, may be a diameter that is between approximately 0.25 mm and 1.0 mm. More preferably, the tube may have diameter that is between approximately 0.25 mm and 0.75 mm. However, as noted above, the diameter of the tube may be based on, at least in part, the size and style of the frames of the eyewear.

In some embodiments, the tube may be disposed substantially on a side (i.e. surface) of the first temple, the second temple, and/or the lens housing that is closest to the wearer (e.g. the surface tube is positioned between the wearer's head and the frames). This may both conceal and/or protect the tube. In some embodiments, the eyewear may further include a hinge, where the hinge may be coupled to the lens housing and the first temple. In some embodiments, at least a portion of the tube may be disposed substantially within the first temple. In some embodiments, at least a portion of the tube may be disposed within the hinge. That is, the tube may run from the temple, through the hinge, around the hinge, and into a portion of the lens housing. This may enable the tube to be completely concealed within the frame, and thereby protected from direct external forces (as well as not being conspicuous to outside observers). In some embodiments, at least a portion of the tube may be disposed behind the hinge. In this manner, the tube may be disposed along the inside of the frame components (e.g. the temple, hinge, and lens housing). When the tube is provided around the hinge it may located on the inside of the temple hinge interface closest to the eyes of the wearer. In this case, the tube may be flexible so that when the temple is opened and shut the tube folds or bends out of the way automatically.

In some embodiments, in the eyewear as described above that comprises a fluid holding element, the eyewear may further include a mechanism adapted to adjust the amount of fluid disposed in the fluid holding element automatically or semi-automatically. For instance, the mechanism may comprise a micro-pump that may receive a signal from a touch switch or a micro-accelerometer or gyroscope to activate to deactivate, and thereby raise or lower the lens.

In some embodiments, eyewear may be provided. The eyewear may comprise a lens housing, a first temple and a second temple coupled to the lens housing, and a first and a second lens supported by the lens housing. The lens may comprise at least three optical zones having different optical powers. The eyewear may further include a movable member coupled to the eyewear that may be configured to move at least between a first position, a second position, and a third position. The position of the lens may be based at least in part on the position of the movable member.

In some embodiments, in the eyewear as described above, the lens may comprise a progressive addition surface. The progressive addition surface may provide a continuous increase in plus optical power and/or may provide a continuous increase in plus optical power and plateau at a maximum full add power (the surface may then decrease in optical power—such as to provide a viewing zone to better see the floor/ground or maintain the full add power in the optical zone). In some embodiments, the progressive addition surface may have a short channel or a long channel. In some embodiments, the channel length of the progressive addition surface may be less than or equal to approximately 15 mm (but preferably less than 13 mm. In some embodiments, the channel length of the progressive addition surface is greater than or equal to approximately 21 mm (but preferably greater than 22 mm).

The inventors have found that the use of a progressive surface with some embodiments of adjustable eyewear may provide some of the advantages of using a progressive surface (i.e. reduce the optical discontinuity or noticeable lines or the glasses), while reducing some of the disadvantages (e.g. distortion that may be viewable in the primary gaze; extreme or uncomfortable tilting of the head and neck).

For example, as noted above, in standard lenses that comprise a progressive surface, the channel of the progressive typically begins at or near the fitting point of the lens (e.g. within 2 mm or less of the fitting point). The reason for this is because it provides the progressive surface with the largest available distance over which to supply the add power to the lens (thereby reducing the associated distortion and increasing the size of the viewing corridor). However, locating the progressive surface at or near the fitting point may result in the distortion created by the continuous optical power provided by the progressive surface to be visible by the wearer during the wearer's primary gaze (as shown in FIG. 1(a) and (b)). This is less then ideal. However, in most cases moving the progressive away from the fitting point is not generally an option with a conventional frame because (1) the progressive optical power zone may be moved further down the lens, making it more difficult for the wearer to comfortable use the full add power zone; (2) there may not be enough remaining distance (i.e. lens height) for a typical progressive surface to be disposed on the lens; and/or (3) should the full add not be edged off the wearer, in most frames the wearer would have to look too far down ergonomically to use the proper optical power region thus causing the wearer eyestrain and headaches.

In this regard, in some embodiments a short channel progressive (which typically creates a large amount of distortion) may be disposed on a surface of the lens, but may be placed at a distance away from the fitting point of the lens (e.g. greater than approximately 2 mm, and preferably within the range of approximately 3-5 mm). In this way, the increased distortion created by the short channel progressive may also be disposed away from the wearer's primary gaze (thereby making the distortion less noticeable during normal use of the lens/eyewear). When the wearer would like to use the progressive addition power region, the lens may be raised (or lowered) into place such as by moving the progressive addition surface closer to the wearer's primary gaze. Thus, embodiments may provide a lens in which the distortion created by a progressive (particularly a short channel progressive) may be moved away from the wearer's primary gaze when not in use (and may also enable the use of a shorter channel progressive). Indeed, the shorter the channel of the progressive (and thereby the larger the distortion created), the farther away embodiments may dispose the progressive surface on the lens (thereby making the distortion less noticeable in the primary gaze of the wearer). Moreover, by providing the ability to adjust the progressive addition optical zone closer to the wearer's primary gaze, a short channel progressive may be placed lower on the lens without requiring the wearer to uncomfortably tilt his head (or greatly lower his gaze) to use the full add power zone.

Similarly, the inventors have also found that some embodiments provided herein may utilize long channel progressive surfaces more efficiently than a traditional lens/frame, and may even locate the long channel progressive at a distance away from the fitting point. That is, for instance, embodiments may take advantage of some of the benefits of a long channel progressive surface, while reducing or eliminating some of the disadvantages. As explained above, long channel progressive surfaces provide the benefit of reduced distortion and a larger viewing corridor. However, to utilize the long channel progressive in a typical frame, the wearer may need to tilt his head/neck at awkward angles and greatly adjust his gaze (see e.g. FIGS. 1 (c) and (f)). Embodiments provided herein may utilize a long channel progressive in a similar location on the lens as a traditional lens/frame, but when the wearer would like to use the full add power of the progressive surface, the lenses may be adjusted into a position such that the progressive surface (and thereby the full add power zone) are closer to the wearer's primary gaze. In this way, the wearer need not tilt his head or greatly lower (or raise) his gaze to utilize the optical zone.

In some embodiments, in the eyewear as described above where the lens may comprise at least three optical zones, the lens may provide a continuous optical power. In some embodiments, the lens may provide a discontinuous optical power.

In some embodiments, in the eyewear as described above, the lens may comprise at least three optical zones. In some embodiments, the lens may comprise exactly three optical zones having different optical powers. In some embodiments, the lens may comprise exactly four optical zones having different optical powers. In some embodiments, the lens may comprise five or more optical zones having different optical powers. In some embodiments, the lens may comprise a progressive addition surface that increases in plus optical power.

In some embodiments, in the eyewear as described above where the lens may comprise at least three optical zones, the lens may comprise a first optical zone, a second optical zone, and a third optical zone. In some embodiments, the first position of the movable member may correspond to a position of the lens where the first optical zone is disposed in optical communication with the approximate center of the wearer's pupil in the wearer's primary gaze (an example of this embodiment is shown in FIG. 32(*a*) with the first optical zone 3201). The second position of the movable member may correspond to a position of the lens where the second optical zone is disposed in optical communication with the approximate center of the wearer's pupil in the wearer's primary gaze (an example of this embodiment is shown in FIG. 32(*b*) with the second optical zone 3202). The third position of the movable member may corresponds to a position of the lens where the third optical zone is disposed in optical communication with the approximate center of the wearer's pupil in the wearer's primary gaze (an example of this embodiment is shown in FIG. 32(*c*) with the third optical zone 3203).

In some embodiments, in the eyewear as described above where the lens may comprise at least three optical zones, the first optical zone may have a height of at least approximately 5 mm, the second optical zone may have a height of at least approximately 5 mm; and the third optical zone may have a height of at least approximately 5 mm. As defined above, the "height" of the optical zone may refer to the largest dimension of the optical zone in the vertical direction. That is, the direction that is substantially perpendicular to the top of the lens housing, as shown by dimension 3001 in FIG. 30. In general, the inventors have found that an optical zone of approximately 5 mm may provide enough distance between optical zones having different optical powers that a wearer may not readily perceive the border (and thereby the discontinuity in some embodiments) between the two optical zones in his primary gaze. However, embodiments are not so limited and the height of each optical zone may be dependent on considerations such as the number of other optical zones, the use and/or optical power provided by the optical zone, the size of the other optical zones, the height of the lens, etc. Moreover, the height of each optical zone need not be identical—that is, in some embodiments, the height of the first, the second, and/or the third optical zone may be different.

Thus, in some embodiments, in the eyewear as described above where the lens may comprise at least three optical zones, the first optical zone may have a height that is between approximately 7 mm and 15 mm, the second optical zone may have a height that is between approximately 7 mm and 15 mm, and the third optical zone may have a height that is between approximately 7 mm and 15 mm. The ranges provided may allow for optical zones that have heights that are large enough such that when placed in front of a wearer's pupil in his primary gaze, the other optical zones may not be apparent, yet small enough in height to include multiple optical zones and functionality for the lenses in stylish frames.

In some embodiments, in the eyewear as described above, the lens may comprise n optical zones, where n is greater than three. In some embodiments, the lens may have a height that is equal to h each optical zone may have a height that is approximately equally to h/n. That is, in some embodiments, each optical zone may have approximately the same height, and thereby the total height of the lens (h) may be divided evenly between each of total number of optical zones (n). For example, if the height of the lens is 40 mm (i.e. h=40 mm), and the exemplary lens has a total of four optical zones (i.e. n=4), then each optical zone may have a height of approximately 10 mm. Embodiments are not so limited and, in some embodiments, n may be equal to three, four, five, etc. In some embodiments, h may be greater than or equal to 25 mm. In some embodiments, h may be less than or equal to approximately 40 mm. That is, most lenses that are in general use today (and are currently in style) are typically within the range of 25-40 mm.

However, the inventors have recognized that some embodiments provided herein may enable the use of lenses that may be larger than traditional lenses because the adjustability of the frame and/or lenses may make more optical regions of the lens usable. Such embodiments may be of particular use in work and/or entertainment environments, where information and functionality may be conveniently disposed in a single lens in different regions of the lens. Deepening on the particular application or circumstances an individual faces, the lens could be positioned so that a particular region will be in a position to be used (e.g. in optical communication with the wearer's eye in the primary gaze). By way of example only, parts of an exemplary lens could provide for the optical correction need for the wearer (e.g. near distance and far distance zones), and in addition provide optical regions that enable other functionality such as a HUD (to provide gaming or entertainment information), another region may provide tinting or reflection coating (to block or reduce sun light), another region may comprise a zoom lens functionality, and still another region may provide cross airs for targeting or leveling of objects. The use of multiple optical zones that provide such a wide range of functionality may be better suited for larger lenses (e.g. greater than 40 mm in height).

In some embodiments, eyewear may be provided. The eyewear may comprise a lens housing, a first temple and a second temple coupled to the lens housing, a lens supported by the lens housing, and a movable member coupled to the lens housing, the first temple, or the second temple. The movable member may be configured to move between a first position and a second position, where a position of the lens may be based at least in part on the position of the movable member. The eyewear may further include a mechanism that may be adapted to adjust the position of the movable member. The mechanism may be integrally coupled to the first or the second temple. Examples of some embodiments are shown at least in FIGS. 14-19, 22-24; and 28-29.

Consistent with the definition provided above for "integrally couple," in this context it may refer to when the mechanism is disposed within, directly coupled to, or forms a part of, the lens housing or one of the temples of the eyewear. For example, integrally coupled may refer to when a mechanism (such as a slider, micro-motor, etc.) is coupled to the frames so as to be aesthetically pleasing—such as when the mechanism is not visible to an outside observer (or appears to be a part of the frames of the eyeglasses). In some embodiments, the mechanism could be approximately the same size (e.g. thickness) and the frames and/or disposed on the inside of the frames—that is, it may be located between the wearer's head and the temple (i.e. coupled to a surface of the frames closest to the wearer's head). As noted above, in some embodiments, the mechanism may be disposed inside the frames (such as inside the temple of the lens housing). This may mask or otherwise hide the component from view, and may also protect the mechanism from outside forces. There may be one or more components for interacting with the mechanism, such as a push button or slider, which may be partially exposed or extend out of the frames.

The inventors have found that integrally coupling the mechanism to the temple may provide several advantages. For instance, the mechanism may be less visible to an outside observer, meaning that the frames and eyewear may be more stylish and/or aesthetically pleasing. In addition, the mechanism may be better protected from outside stimulus and force, as the temple may protect the components. Moreover, locating the mechanism in the temple may remove components from the more visible lens housing, which may enable the lens housing to be smaller and/or not to be limited by having to house functional components.

In some embodiments, the mechanism may be adapted to manually adjust the position of the movable member. That is, wearer may apply a force to the mechanism (such as a slide or knob), which force may adjust the position of the movable member (and thereby the lenses). In some embodiments, the mechanism may include a wire (which may include a "cable" or "wire") coupled to the movable member. For instance, the wire may be coupled to both a slider disposed on the temple of the frames and one or more nose pads. When the slider is moved away from the lens housing, the wire may exert a pulling force on the nose pads (which may contract the nose pads, or otherwise adjust their positions). When the slider is moved toward the lens housing, the wire may exert a pushing force on the nose pads, which may cause the nose pads to extend (or otherwise adjust their positions). However, embodiments are not so limited, and the wire may be coupled to any movable element that may be disposed in any location on the frame, including the temples or the bridge of the lens housing.

In some embodiments, the wire may be disposed within the frame components (e.g. within a cavity or a tube in the temple and/or the lens housing), or it may be disposed along a surface of the frame (e.g. within a tube disposed on the surface of the temple or lens housing, which may both protect wire and mask or conceal its existence). The tube may again have dimensions such that they are not readily apparent to an outside observer (such as having dimensions (such as the diameter) equal to, or less than, the frame components). That is, for instance, the tube may have a diameter that is less than or equal to approximately 2 mm (but preferably within the range of 0.25 mm to 0.75 mm). The inventors have found that thicknesses in this range are typically large enough to house wire with sufficient rigidity to adjust the position of the lens, while still remaining small enough to be masked by the frames.

Thus, in some embodiments, at least a portion of the wire may be disposed within the first temple or the second temple. In some embodiments, the mechanism may further include a lever, slider, or a knob. However, any suitable mechanism for adjusting the position of the movable member may be used, including a micro-motor or a micro-pump that provides (in most but not all cases) a push pull movement. As noted above, in some embodiments, the lever, slider, or the knob may be configured to apply a force to the wire, where the wire may be adapted to adjust the position of the movable member.

DESCRIPTION OF THE FIGURES

Reference will now be made to FIGS. 20-32, which may further describe various embodiments of a device (e.g. adjustable eyewear) that may adjust the position of the lenses relative to the eye of the wearer. The figures and corresponding description are provided as examples of embodiments and/or examples of operation of embodiments. The figures and the descriptions herein are for illustration purposes and are not intended to be limiting.

Figure 20:
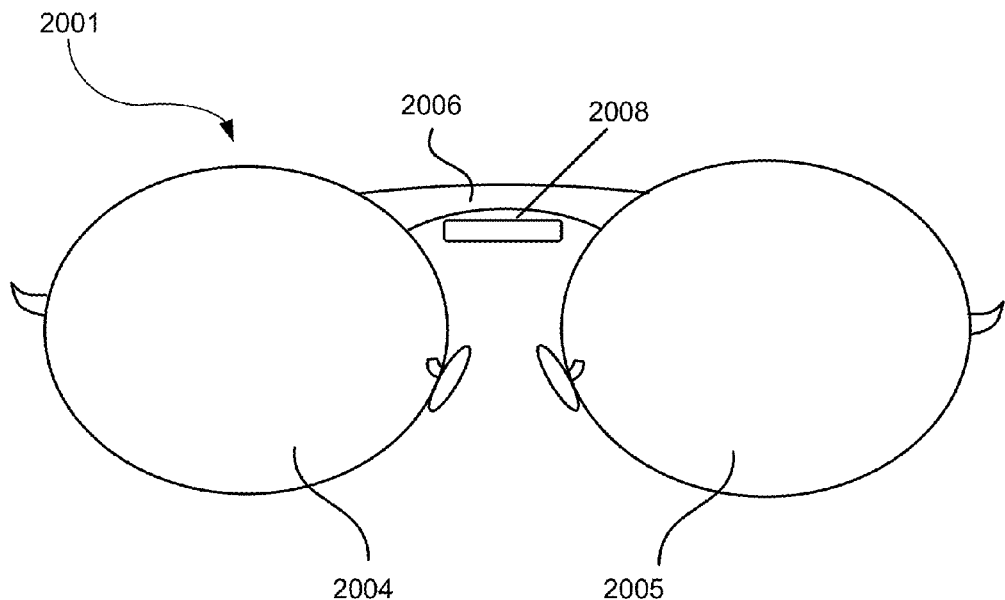
FIG. 20 shows a front view of exemplary eyewear that may comprise a movable member that includes a fluid containing element coupled to the bridge of the lens housing in accordance with some embodiments.
Figure 21:
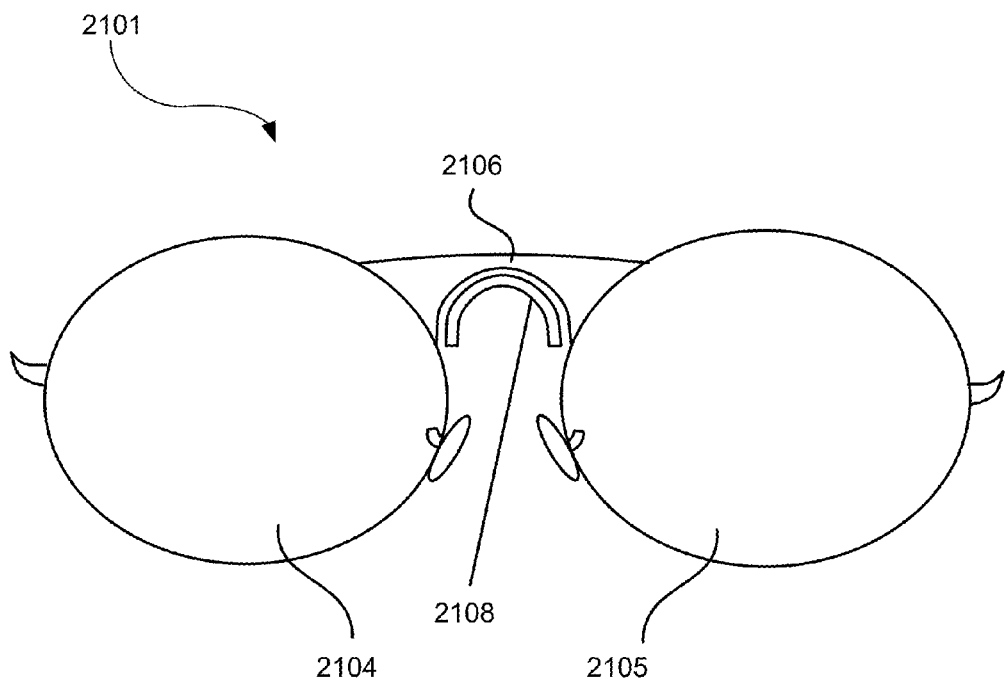
FIG. 21 shows a front view of exemplary eyewear that may comprise a movable member that includes a fluid containing element coupled to the bridge of the lens housing after fluid has been applied in accordance with some embodiments.

With reference to FIGS. 20 and 21, an exemplary embodiment of an adjustable eyewear is shown that comprises a movable member that may adjust its position (and thereby the position of the lens housing) based on the application and removable of fluid to the movable member. In particular, with reference to FIG. 20, the exemplary is shown as comprising a lens housing 2001, a first lens 2004, a second lens 2005, a bridge 2006, and a movable element 2008 coupled to the bridge. As shown the movable element 2008 may comprise a fluid containing element (such as bladder) that may increase or decrease in size (or changes is shape) when fluid is applied (e.g. from a fluid containing element that may be disposed in one of the temples (not shown)). When in a first position, as shown in FIG. 20, the movable element 2008 may not contact the nose of the wearer (or may not apply a downward force).

With reference to FIG. 21, the same exemplary eyewear is shown as in FIG. 20. That is, the exemplary embodiment in FIG. 21 also has a lens housing 2101, first lens 2104, second lens 2105, a bridge 2106, and a movable member 2108. However, the movable member 2108 in FIG. 21 is shown as being in a second position. The second position corresponds to when the movable member 2108 (in this case a fluid containing element such as a bladder) has fluid and/or pressure applied thereto, and thereby changes its size and/or shape. As shown, at least the shape of movable member 2108 has been change to form a U-shape that has substantially taken the form of a corresponding portion of the bridge 2106. The movable member 2108, after the application of the additional fluid by, for instance a micro-pump from a fluid holding element (such as a reservoir disposed in one of the temples), may exert a downward force on the nose of the wearer at the position where the movable member 2108 contacts the nose. This force may then raise the lens housing 2101 and thereby the lenses 2104 and 2105 to a second position. In this manner, the embodiments shown in FIGS. 20 and 21 may utilize a fluid to adjust the position of the movable member 2108, and thereby the position of the lenses.

Figure 22:
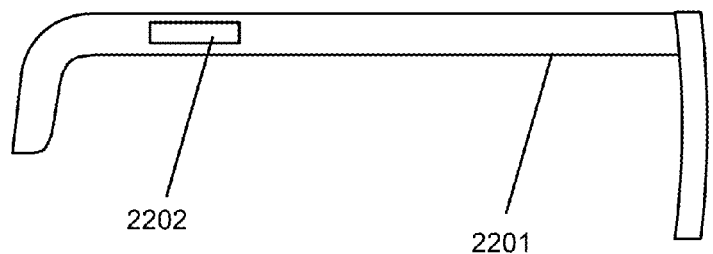
FIG. 22 shows a side view of exemplary eyewear in accordance with some embodiments.

FIG. 22 shows a side view of exemplary eyewear in accordance with some embodiments. As shown, the eyewear may comprise a mechanism that may be disposed in the temple 2201 of the frame of the eyewear. A component 2202 (such as a mechanism or a portion thereof, such as a sensing module) as shown may be disposed on the outside surface of the temple 2202 so as to allow the wearer to readily access and/or interact with the mechanism. For example, the component 2202 could comprise a slider that the wearer may move forward or back along the temple 2201. When the slider 2202 is moved forward (i.e. toward the lens housing) a push force may be applied to the movable member; when the slider is moved back (i.e. away from the lens housing) a pull force could be applied to the movable member (e.g. via a fluid or one or more wires). In some embodiments, the mechanism may comprise a micro-motor disposed inside the temple, and the component 2202 could comprise a touch switch or other sensing mechanism that the wearer interacts with to signal the motor to activate.

Figure 23:
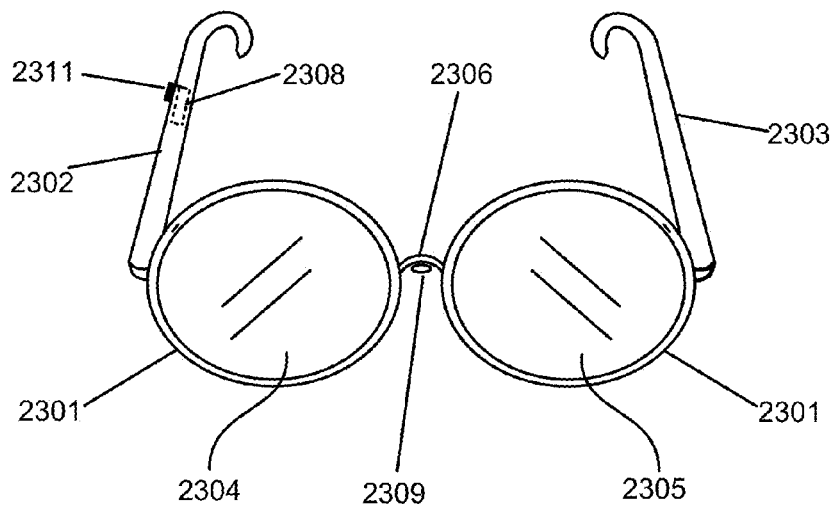
FIG. 23 shows a front view of exemplary eyewear in accordance with some embodiments.
Figure 24:
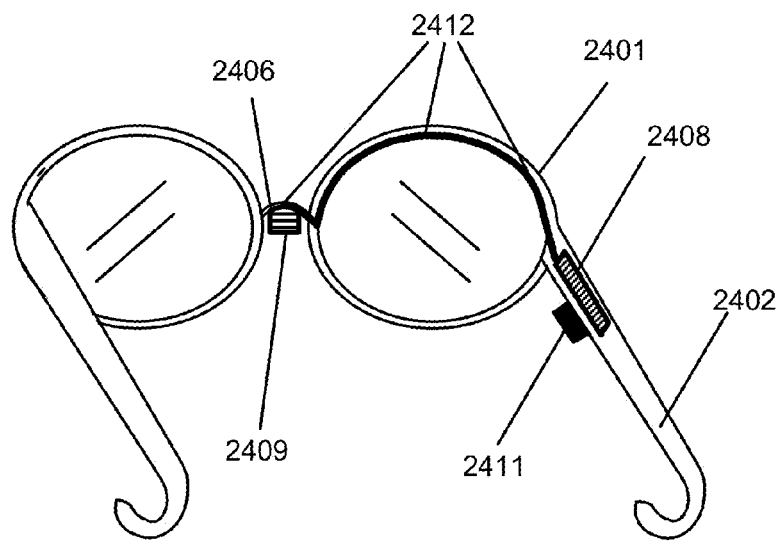
FIG. 24 shows a rear view of the exemplary eyewear shown in FIG. 23 in accordance with some embodiments.

With reference to FIGS. 23-25, another exemplary embodiment of adjustable eyewear is shown that comprises a fluid that may be used to adjust the position of the movable element (and thereby the lenses). With reference to FIG. 23, the exemplary eyewear comprises a lens housing 2301, a first temple 2302 and a second temple 2303, a first lens 2304 and a second lens 2305, a bridge 2306, a fluid holding element 2308, a movable member 2309 (comprising a fluid containing element) and a mechanism 2311 (comprising a slider). The fluid holding element 2308 and/or the movable member 2309 may, for instance, each comprise a reservoir or a bladder. The fluid holding element 2308 may be coupled to the mechanism 2311. The mechanism 2311 in this exemplary embodiment may comprise a slider that may be configured to apply a force to the fluid holding element 2308 when the wearer moves the slider 2308 forward (that is, the slider 2311 may be disposed outside of the temple 2302 such that a wearer may interact with the mechanism 2311 to apply a force to the fluid holding element 2308). This may move fluid from the fluid holding element 2308 in the temple 2302 to the movable member 2309 disposed on the bridge 2306. As fluid is applied to the movable member 2309, it may change its shape and or increase in size, and thereby apply a downward force on the wearer's nose (thereby lifting the lens housing 2301 to a second position). When the slider 2311 is moved in the opposite direction, fluid may be removed from the movable member 2309 and applied to the fluid holding element 2308. The movable member 2309 may reduce in size and/or return to its original shape, and the lens housing 2301 may be lowered relative to the wearer's eyes.

With reference to FIG. 24, the back view of the exemplary eyewear shown in FIG. 24 is shown. The fluid holding element 2408 and the movable member 2309 are operatively coupled by a tube 2412 that runs on the back side of the first temple 2402, the lens housing 2401, and to the bridge 2406. In some embodiments, this tube 2412 may be disposed inside one or more components of the frame. In either case, by disposing the tube 2412 in such a manner, embodiments may mask or otherwise conceal the components that provide the functionality of moving the position of the lenses. For instance, the tube 2412 is not visible in the front view shown in FIG. 23. As was described above, the aesthetics of the eyeglasses is often a major consideration in the choice of rim style by a wearer. Thus, unlike some of the previously proposed devices, embodiments disclosed in accordance with some of the exemplary features described herein may provide some of the advantages associated with a movable frame and lenses, without necessarily sacrificing the style and appeal of the frames. The movable member 2409 shown in FIG. 24 is illustrated as being in a second position after the application of fluid from the fluid holding element 2408, based on the movement of the slider 2411. Thus, the lens housing 2401 may be raised relative to the eyes of the wearer.

With reference to FIG. 25, the lens housing 2501 from the exemplary embodiments shown in FIGS. 23 and 24 is shown. As illustrated the movable member 2509 is in a second position corresponding to after the application of a fluid to the movable member 2509. The movable member 2509 may therefore comprise, in some embodiments a ballast, a bladder (or similar fluid containing element) that may expand when a fluid is applied therein, and contract and/or fold-up when fluid is removed. In general, it may be preferred that the movable member 2509 have a small form factor as possible when not in use (i.e. when no fluid or pressure is applied) so as to further conceal the functional components of the frames. That is, for example the movable member 2509 may be configured to expand and then compress to almost no size when no pressure is applied in a preferred embodiments.

As was described above, the tube 2512 may be disposed on the back side of the lens housing 2501, and preferable may have a diameter that is between approximately 0.25 mm and 2 mm (preferably in the range 0.25 mm to 0.75 mm). As described above, various frame components may have relatively small sizes (including diameters), particularly the eye wire of the lens housing 2501 and/or the bridge. Thus, in some embodiments, to effectively conceal the tube 2512, this component may also need to have a small form factor. However, embodiments are not so limited, and the diameter of the tube 2512 may be determined based in part on the frame design and size. Also as shown in FIG. 25, the lens housing 2501 may be coupled to the first temple by a hinge attachment 2513. The tube 2512 may, in some embodiments, be disposed behind the hinge attachment 2513 or may be disposed through the hinge and into the lens housing 2501.

Figure 26A:
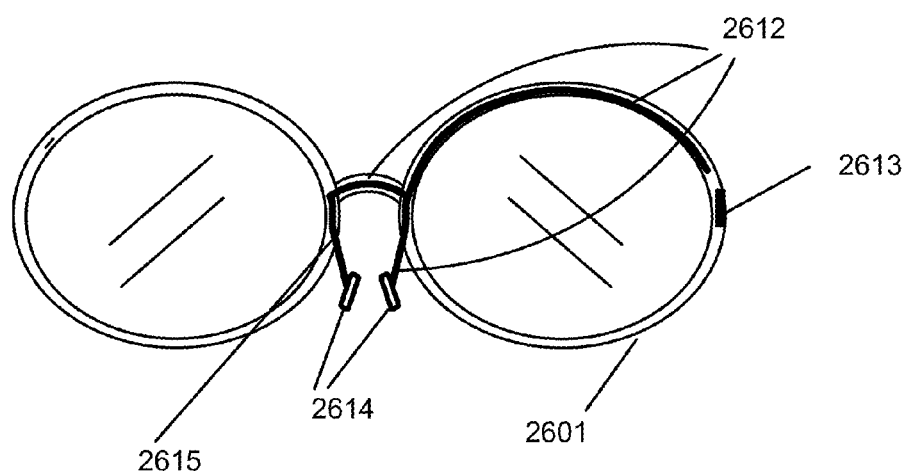
FIG. 26(a) shows a rear view of the lens housing of the exemplary eyewear in accordance with some embodiments that comprises a tube disposed in the lens housing (or coupled to a surface) and operatively coupled to the nose pads.

With reference to FIG. 26(a), an exemplary embodiment of a lens housing 2601 is shown comprising a movable member to adjust the position of the lenses relative to the wearer's eye. In this exemplary embodiment, the movable member is shown as comprising a portion of the nose pads 2614 and the nose pad arms 2615, rather than the fluid containing element shown in FIG. 25. In this embodiment, a tube 2612 is disposed on the backside of the lens housing 2601 and may be coupled, for instance, to a fluid holding element (such as a reservoir) disposed in one of the temples via the temple hinge 2613 (or the tube may be disposed behind the hinge 2613). The tube 2612 is also operatively coupled to the nose pad arms 2615 and nose pads 2614, and thereby may apply fluid and or pressure to those components. Thus, in some embodiments, the tube 2612 may operatively couple one or more components disposed in the temple to the movable member (i.e. the nose pads 2614 and nose pad arms 2615). In this exemplary embodiment, the tube may be approximately 0.5 mm in diameter, and the nose pad arms 2615 (which are also shown as comprising tubes that fluid may be applied to or removed from) may also have a diameter of 0.5 mm (in some embodiments, the tube 2612 may be the same as the nose pad arm tubes; however, embodiments are not so limited). However, it should be understood that while it is generally desirable to use components that may be small enough to be concealed on the frame, that actually sizes may vary based on, for instance, the style and size of the frames.

Figure 26B:
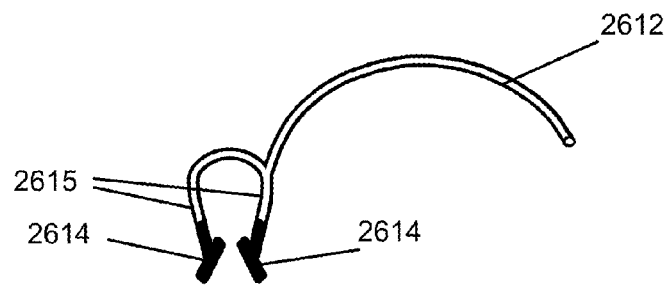
FIG. 26(b) shows an enlarged view of the tube and the nose pads in accordance with some embodiments.

FIG. 26(b) shows just the tubing elements and movable member that may be used in the exemplary embodiment shown in FIG. 26(a). That is, FIG. 26(b) shows the tube 2612 that is coupled to the nose pad arms 2615, which are then coupled the nose pads 2614. The nose pads 2614 may be in contact with the wearer's nose. When fluid is applied to the tube 2612, the pressure and/or fluid may apply a force to the nose pad arms 2615, which may in turn apply a force to nose pads 2614 and thereby change the position of the lenses relative to the eyes of the wearer.

Figure 27:
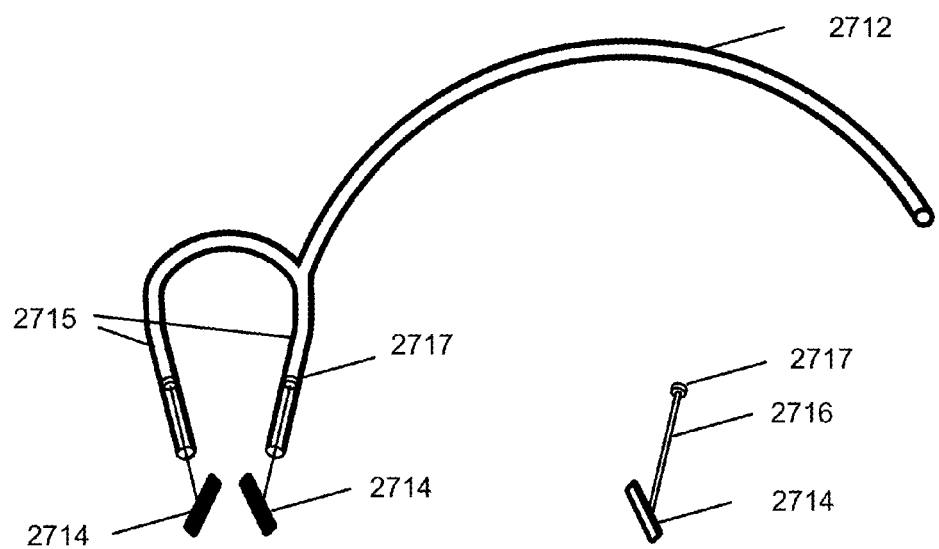
FIG. 27 is an expanded view of tube and nose pads shown in FIGS. 26(a) and (b) in accordance with some embodiments.

FIG. 27 shows the exemplary embodiment of FIG. 26(a) and (b) in operation. As shown, the movable element comprises in this exemplary embodiments each of the nose pads 2714 coupled to a nose pad actuator 2716 and a stop 2717. The stop 2717 may be configured to fit securely within the nose pad arms 2715 so as to create both facilitate the transfer of force from the tube 2612 as well as to create friction to prevent the nose pad actuators 2716 from contracting based only on the weight of the lens housing. In some embodiments, the nose pad arms 2715 may also include grooves or other structural components that the stop 2717 may couple to, which may require additional force to overcome, thereby further maintaining the lens housing in an activated position. When fluid is applied to the tube 2612, the force may be applied to the nose pad actuators 2616 which may then extend out of the nose pad arms 2615 and apply a force to the wearer's nose. In some embodiments, the nose pad arm 2715 and the tube 2712 may have a diameter that is approximately equal (e.g. approximately 0.5 mm in this embodiment). However, in some embodiments, the nose pad arm 2715 that is disposed furthest away from the tube 2712 (and/or has a larger volume to fill with fluid) may have a diameter that is equal to or greater than the diameter of the tube 2712.

Figure 28:
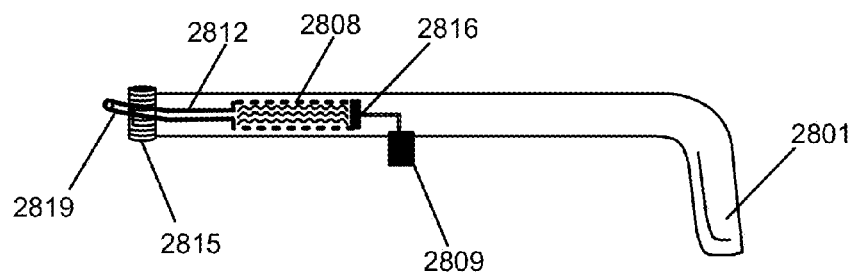
FIG. 28 shows a side view of exemplary eyewear that comprises a mechanism that may be manually adjusted in accordance with some embodiments.

With reference to FIG. 28, a side view of an exemplary device is shown. The device comprises a temple 2801, a fluid holding element 2808, an actuator 2809 (such as a slider), an actuator arm 2816; a tube or fluid cavity 2812, a hinge 2815, and a tube 2819. As shown in this embodiment, the actuator 2809 may be manually activated so as to apply and remove fluid from the fluid holding element 2808. This may function in some exemplary embodiments like a syringe, where the actuator 2809 may be slid along the temple 2801 applying a "pushing" force on the actuator arm 2816, which may then apply that force to the fluid holding element 2808 and thereby apply the fluid through the tubes 2815 and 2819 to other components. When the slider 2809 is moved in the opposite direction, a suction (or "pulling" force) is created which may therefore remove fluid from the lens housing (or other component that the fluid was applied to) via the tubes 2819 and 2815 and return it to the fluid holding element 2808. The tube 2819 may comprise a flexible material (such as plastic or rubber) such that it may expand and contract when the temple 2801 is opened or closed. The tube 2819 may be disposed on the outside of the hinge (preferably on the back side of the hinge 2815 so that the tube may be concealed from an observer) or it may be disposed through the hinge 2815 and into the lens housing. The fluid holding element 2808 may comprise a plastic bag or a reservoir. The tube 2815 may comprise any suitable material (including plastic, rubber, or even metal as in some embodiments it need not be flexible because it is disposed within the temple 2801) and may be disposed inside the temple and may be coupled to the fluid holding element 2808 and the tube 2819 (or in some embodiments, the tube 2815 and 2819 may comprise the same tube).

Figure 29:
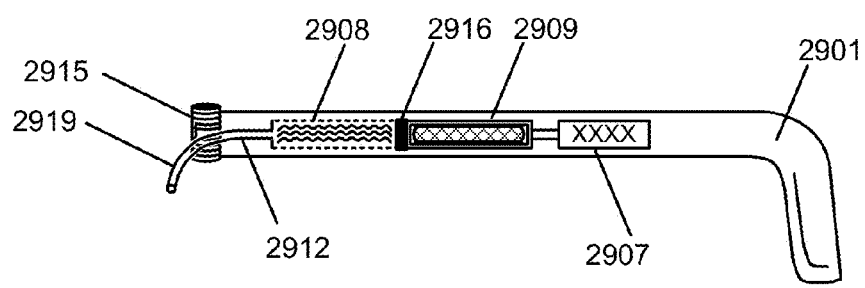
FIG. 29 shows a side view of exemplary eyewear that comprises a mechanism that may be adjusted automatically or semi-automatically in accordance with some embodiments.

With reference to FIG. 29, a side view of an exemplary device is shown. The device comprises a temple 2901, an electronics module 2907, a fluid holding element 2908, an actuator 2909 (such as a micro-motor), an actuator arm 2916; a tube or fluid cavity 2912, a hinge 2915, and a tube 2919. As shown in this embodiment, the actuator 2909 may be automatically or semi-automatically activated so as to apply and remove fluid from the fluid holding element 2908. The actuator 2909 may automatically move the actuator arm 2916 so as to apply a force to the fluid holding element 2908 (which may comprise a gas, liquid or a gel in some embodiments). The fluid holding element 2908, the tube 2912, hinge 2915, and the tube 2919 may have similar characteristics to those described above with reference to FIG. 28. The electronic module 2907 may comprise some or all of the components needed to control the actuator 2909 (i.e. the motor), including a power source (e.g. a battery), a controller (e.g. microprocessor or ASIC), and/or a sensing mechanism (e.g. microaccelerometer, touch switch, etc.). The electronic module may, in some embodiments be sealed inside the temple 2901.

Figure 30:
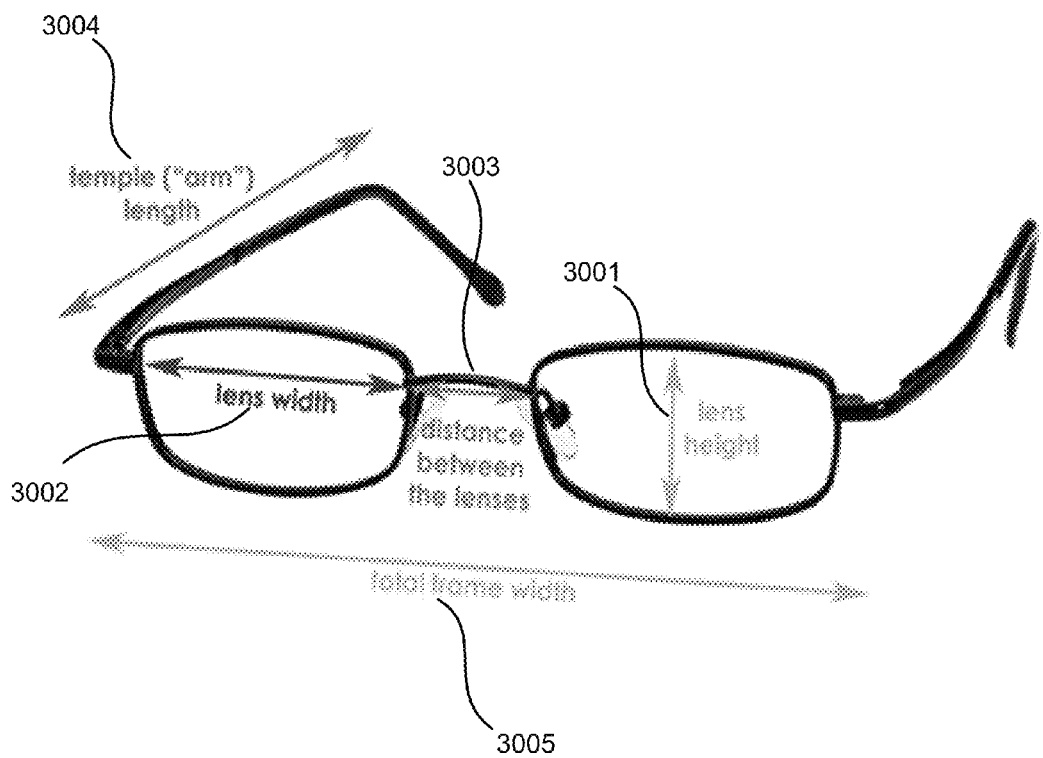
FIG. 30 shows exemplary eyewear and corresponding dimensions in accordance with some embodiments.

FIG. 30 provides an exemplary frame and lenses, and illustrates dimensions for these components that may be referred to herein for illustrations purposes, including: the height of the lens 3001, the width of the lens 3002; the distance between the lenses 3003; the temple length 3004; and the total frame width 3005.

Day and Night Optical Zones for Multifocal Lenses, Eyewear, and Frames

Historically one of the major complaints that patients make in an eye doctor's office when having a routine eye exam or when returning after receiving new eyeglasses is, "I can see very good during the day, but at night time I have trouble seeing even with my new eyeglasses." Historically eye doctors attempt to satisfy this complaint one of two ways: (1) Applying/prescribing an anti-reflective coating; or (2) prescribing a second pair of eyeglasses that have more minus or less plus optical power in the distance viewing zone.

Anti-reflection (AR) coatings help with greatly reducing reflection, especially at night. However, although this helps in most cases, it does not solve or satisfy the patient's complaint regarding poor night time or low light vision. In addition, very few patients agree to purchase a second set of eyeglasses having a prescription that is prescribed for night time that has more minus optical power or less plus optical power. This increases expense and inconveniences the patient. Moreover, purchasing a second pair of glasses is not an efficient solution as it requires the patient to maintain two separate pairs of glasses, and to switch those glasses based on the light conditions. Therefore, there is a pressing need to solve the issue of different prescription needs based on ambient light conditions for a patient utilizing one pair of eyeglasses. Indeed, this is one of the top unmet needs/complaints of patients seeking vision care.

Some of the reasons as to why there is a general need for additional minus optical power (or less plus optical power) for patients for their night time vision may include some or all of the following:

(1) The eye doctors in the United States have a tendency to over plus (i.e. prescribe too much plus optical power) or under minus (i.e. prescribe too little minus optical power) patients due to their professional training, and in so doing attempt to not contribute to progressive myopia.

(2) While in a darkened environment (e.g. at night) the pupil of the wearer's eyes may enlarge, which may then allow more light into the wearer's eye and onto the wearer's retinas. This enlargement/dilation of the wearer's pupils may facilitate in many eyes what is called spherical aberration. This occurs because the periphery of the cornea of most eyes is not spherical. The spherical aberration causes a blurring effect for the wearer to deal with at night time or at dusk when the pupil enlarges/dilates at night.

(3) Another potential contribution of poor night time vision is a possible shift in the wavelength of light at night. In this regard, U.S. Pat. No. 7,588,332 to Blum et al. (hereinafter "the '332 patent"), which is hereby incorporated by reference in its entirety for all purposes, teaches the correction of aberrations of the eye at night time (by way of example only, spherical aberration) that is caused when the pupil of the eye gets larger at night time due to less light entering the pupil. The '332 patent discloses an approach to this problem through the use of dynamic electronic eyeglasses that dynamically switch the optical focus of the eyeglasses between night and day time. While the '332 patent discloses one method of addressing this long unmet pressing need, the approach that uses dynamic optics may require the use of expensive and/or complex electronic focusing eyeglasses. Thus, a need still exists for an approach that efficiently and effectively addresses the vision problems of many patients with regard to their night time vision.

Figure 33:
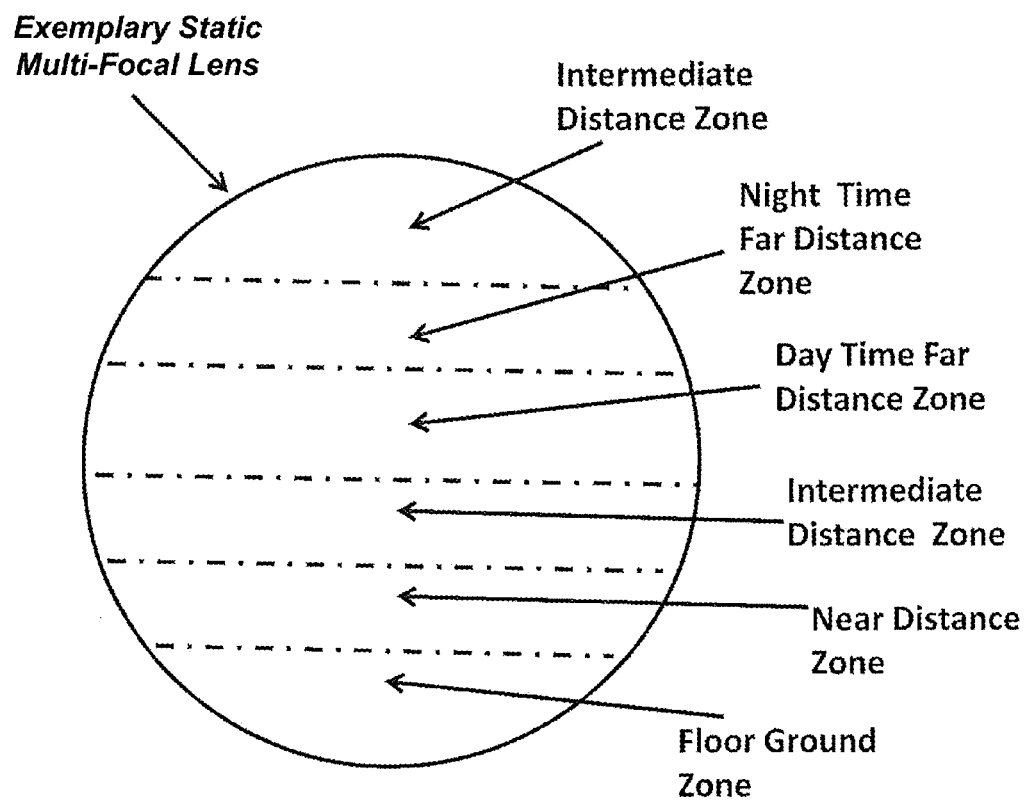
FIG. 33 shows an exemplary multifocal lens comprising day time and night time optical power zones in accordance with some embodiments.

Embodiments provided herein may disclose a less complex (and potentially less expensive) way of solving the typical need of the human eye to have one optical correction for night time ambient light conditions, and a different optical correction for day time ambient light conditions. Embodiments provided herein may utilize a "static" multifocal lens (unlike that of the '332 patent described above, where the lens itself does not change its focus). In some embodiments, a static multifocal lens may be specially designed such that it is a static multifocal lens comprising different optical power zones, such as, for example: a first optical power zone providing a first optical power in a resting position directly in front of the pupil of the wearer (i.e. in the primary gaze of the viewer) (see, by way of example only, optical zone 3201 in FIGS. 32(a)-(c)); and a second optical power in a second optical power zone that may be disposed above the pupil of the wearer (see, by way of example only, optical zone 3202 in FIGS. 32(a)-(c)). In some embodiments, a third (and even a fourth, fifth, sixth, and seventh) optical power zone providing additional optical powers may be provide below (or further above) the pupil of the wearer (see, by way of example only, optical zone 3203 in FIGS. 32(a)-(c)). Another exemplary embodiment comprising multiple optical power zones is shown in FIG. 33, and described in more detail below.

Figure 34:
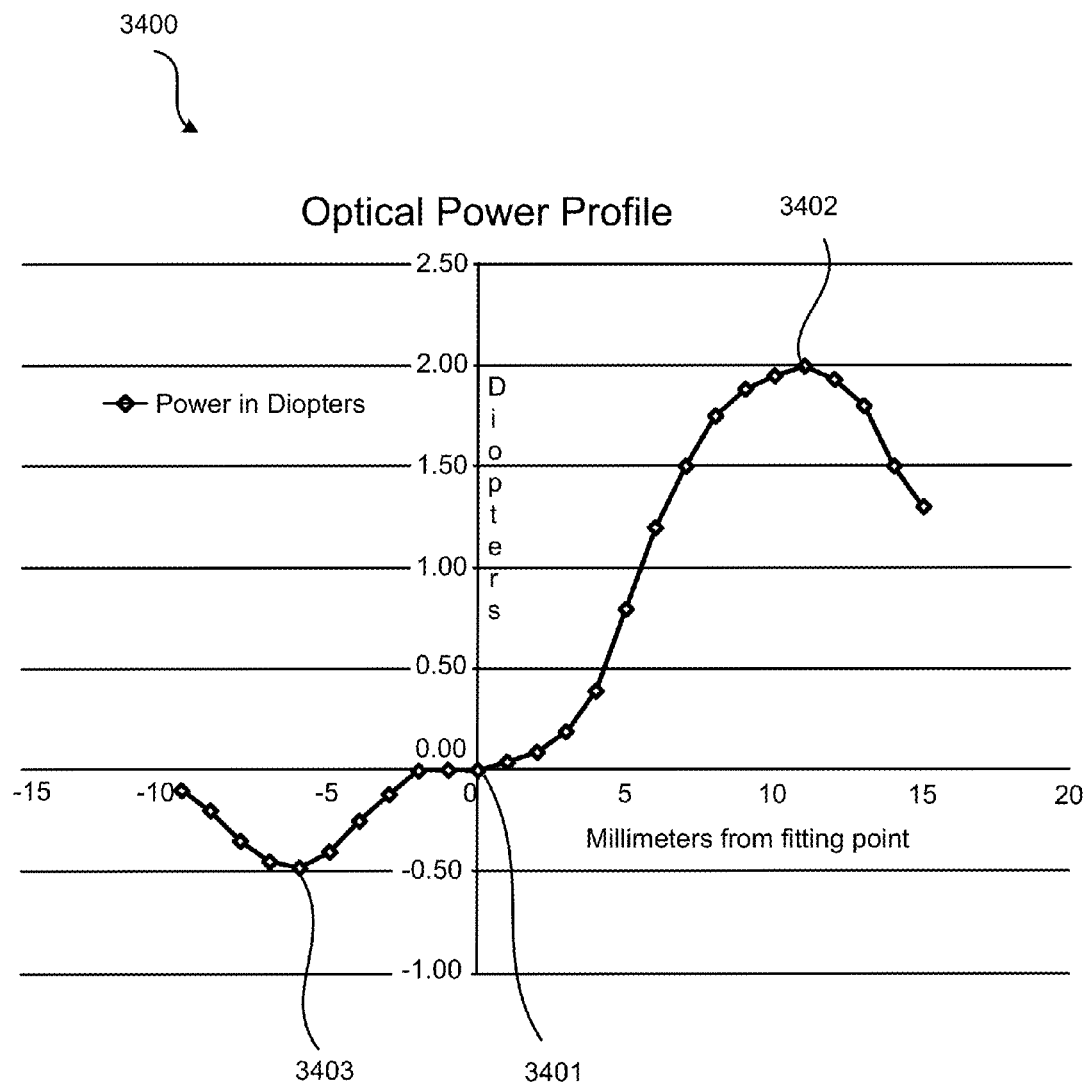
FIG. 34 shows an exemplary optical power profile of a multifocal lens in accordance with some embodiments.

In some embodiments, the static multifocal lens may be disposed in an eyeglass frame that may be configured to translate up and down relative to the face of the wearer. The static multifocal lens will likewise move up and down in front of the pupil or pupils of the wearer. Said another way, the lens or lenses within the translating (i.e. adjustable) eyeglass frame likewise will move up and down in front of the wearer's line of sight. Given that the wearer's line of sight may be fixed upon a given object being viewed while the static multifocal lens moves up or down, the wearer may look at the same object through different optical powers, which may depend upon input from (or being controlled by) the wearer manually or semi-automatically, or a sensor or sensors which control the translation of the eyeglass frames in an automatic manner (examples of which were described above). In some embodiments, the wearer may perceive the focus for a particular distance object being viewed coming into focus dynamically (i.e. while the frames are translating) even though the static lens does not change its optical focus of the lens itself and is thus of a static focus (i.e. it may not comprise a dynamic optic), such as when the eye is looking through a continuous optical power optical design. In some embodiments, the static lens may comprise continuous optical profile such as a progressive addition lens where as the lens moves up or down in front of the pupil of the eye, the line of sight of the wearer looks thru numerous different focal points until the translating frame stops its movement. An exemplary continuous optical power profile is shown in FIG. 34. As shown, at the fitting point 3401 the static multifocal lens has an optical prescription of OU plano (e.g. 0 D) for day time distance optical power. Moving down the lens away from the fitting point (e.g. to the right on graph 3400), the lens comprises a progressive addition surface having a full add power of 2.00D at point 3402 (e.g. approximately 12 mm from the fitting point), before decreasing in optical power (the decrease may provide for better vision while walking to see the floor or stairs). Moving in the opposite direction (i.e. up the lens in a vertical direction) from the fitting point 3401, the static lens provides a "reverse progresses addition surface:—that is, the surface provides a continuous increase in negative optical power (note that in some embodiments, this could provide a decrease in plus optical power)—having a maximum negative optical power of—0.5 D at point 3403 (approximately 6 mm from the fitting point) as a night time far distance optical power. Thus, this exemplary lens comprises at least three topical zones (e.g. day time distance, night time distance, and near distance), as well as a continuous optical powers between those optical powers zones that a wearer may choose as needed (e.g. the wearer may stop a translating or adjusting lens in some embodiments at any point along the graph shown in 3400).

In some embodiments, the lens frame may translate so as to position the correct optical power zone for the wearer to view an object at a particular distance and for the ambient light condition. By way of example only, and with reference to the exemplary optical zones shown in FIG. 33, in some embodiments: if the wearer is looking at a near object at a distance of 16 inches, the translating static lens may be moved up by way of the frame translating upward on the wearer's face to align the "near distance zone" with the wearer's eyes; if the wearer is looking at a far distance object in the day time, the translating lens may be moved back down by way of the frame translating downward on the wearer's face to align the "day time far distance zone" with the wearer's eyes; if the wearer is looking at a far distance object at night time the translating lens may be moved even further down by way of the frame translating downward on the wearer's face so as to align the "night time far distance zone" with the wearer's eyes; if the wearer then looks back at a near object at 16 inches the translating lens may be moved back up by way of the frame translating upward on the wearer's face to align the "near distance zone" with the wearer's eyes. The above optical zones and the locations as shown in FIG. 33 are provided for exemplary purposes only. Embodiments may comprise a lens with any number of optical zones disposed in any suitable order or location.

Figure 35:
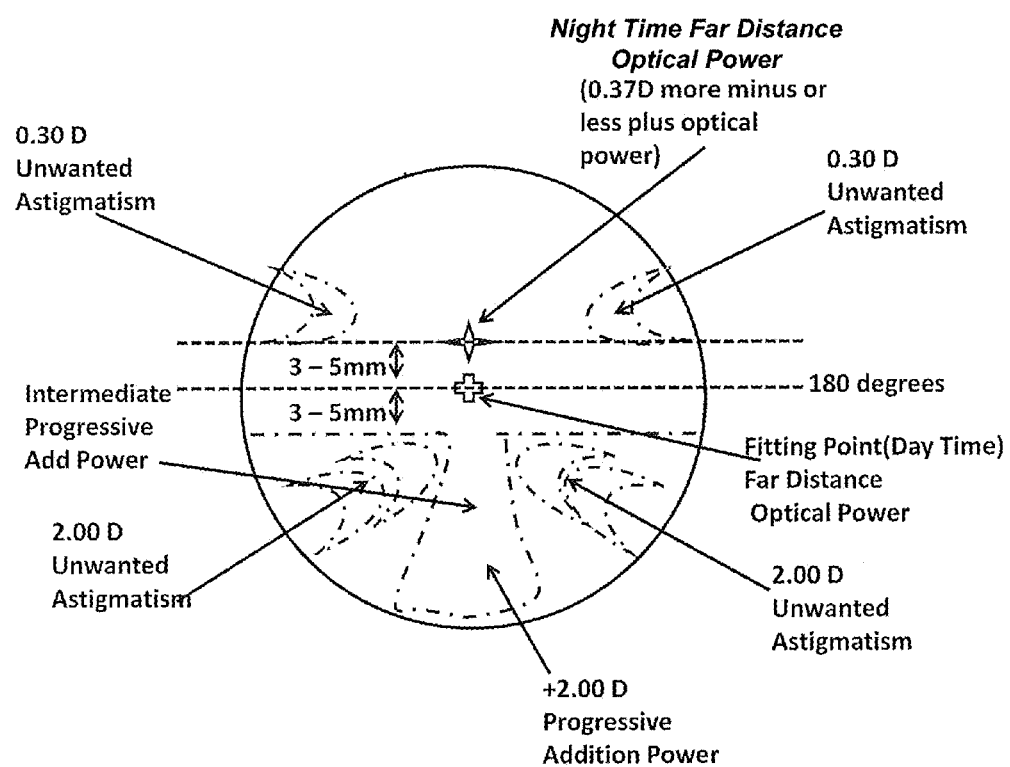
FIG. 35 shows an exemplary multifocal lens comprising a progressive addition surface and a day time and a night time far distance optical zones in accordance with some embodiments.

In some embodiments, as noted above, a lens may be provided that comprises a continuous optical power profile (e.g. it may comprise a progressive addition surface). An exemplary lens and its optical powers are shown in FIG. 35. As shown, the exemplary lens may comprise a progressive addition lens having an optical prescription of OU plano (e.g. 0 D) for day time distance optical power; −OU −0.37 D as a night time far distance optical power (shown in this example as being 3-5 mm above the fitting point and extending to the top of the lens); and a +2.00 D add power for near distance viewing (shown in this exemplary embodiment as having a start of the channel at 3-5 mm below the fitting point). It should be noted that the optical power of a lens may be that of any optical power or prescription—that is, the lens in FIG. 35 is provided only as an illustration, as the optical powers will vary based on the patient. The optical power of the lens may be fabricated by way of any known means such as but not limited to, surfacing and polishing, free forming or digital surfacing, molding, stamping, diamond turning, surface casting.

In some embodiments, the static multifocal lens may comprise a plurality of optical zones having different optical power. As used herein, the term "static" may refer to a lens having fixed optical power and is not capable of a dynamic optical power. The optical zones may be continuous, discontinuous, or a combination thereof.

In general, a person of ordinary skill in the art would know how to design and construct such a static lens in accordance with some embodiments provided herein. As used herein, a static lens having at least two optical zones having different optical power may be refer to a "multifocal lens." In some embodiments, the static lens may be used on a wearer who is not in need of near distance optical correction (i.e. being presbyopic) because the patient or wearer is not presbyopic. In some embodiments, a lens may for instance comprise only two optical zones corresponding to a far distance viewing zone for daytime and a far distance viewing for night time. However, as noted above, any number of optical zones may be utilized.

Thus, embodiments provided herein may include multifocal lens (that may be disposed in an adjustable or translating lens housing or frames) that may provide one single vision prescription optical power providing best correction during fro the wearer during the day time or in good lighting environments, and another different best corrected prescription optical power for night or in dim lit lighting environments. It should be understood that the optical power prescription is different for various patients or wearers having different optical prescriptions. However, embodiments are not limited to only two optical power zones, and may comprise a variety of optical zones that provide an optimum vision correction for different situations and viewing distances. With reference again to the exemplary embodiment shown in FIG. 33, the following is an exemplary listing of the various possible optical zones from the top upper area of the lens proceeding to the bottom area of the usable lens (where the lens may be housed within an adjustable (e.g. translating) eyeglass frames):

Zone #1) Intermediate distance Rx
Zone #2) Night time far distance Rx (or low ambient light distance Rx)
Zone #3) Day time far distance Rx (or good lighting distance Rx)
Zone #4) Intermediate distance Rx
Zone #5) Near reading distance Rx
Zone #6) Ground/floor distance Rx As used herein, the term "Rx" may be used to refer to the corrective optical power needed for a patient or wearer to see an object at a specific distance from the wearer's eyes. As used in this context, "Day time" may refer to when the wearer is viewing an object with day time ambient light. As used in this context, "Night time" may refer to when the wearer is viewing an object with less than day time ambient light (or low ambient light). This may, for instance, include low light environments such as indoors with poor lighting or outside with dim lighting. In some embodiments and as described above, the night time far distance Rx may have more minus (or less plus) optical power than that of the optical power of the daytime distance Rx. In general, the range of the difference between the night time and day time distance Rx optical powers may be between approximately 0.12 D to 1.00 D of optical power (although this may again vary based on the individual patient's prescriptions). However, in most cases difference day time and night time far distance RX optical power may be between 0.25 D and 0.50 D more minus optical power or less plus optical power. That is, for instance, the night time far distance zone comprises more minus optical power or less plus optical power than that of the day time far distance zone.

With reference again to the exemplary lens shown in FIG. 33 and the zones identified above, in some embodiments, Zones #1 and #4 (i.e. "intermediate distance zone") may be that of a trifocal like intermediate power or of the intermediate power of a progressive addition lens. Zone #5 (i.e. "Near reading distance Rx") may be that of a bifocal like intermediate power or the reading power of a progressive addition lens. Zone #6 (i.e. "Ground/floor distance Rx") may be that of an optical power needed to see the floor ground clearly and thus may be of less plus optical power than Zone #5. Once again it should be noted that any two of the six exemplary zones may comprise a continuously change of optical power or can be of a discontinuous change of optical power. In some embodiments, the static multifocal lens may comprise any two of the six zones. In some embodiments, the exemplary static multifocal lens may have a seventh zone (e.g. a far distance zone) above that of zone 1, and may provide an optical power corresponding to a far distance optical power.

As noted above, in some embodiments, a static multifocal lens may comprise more than two optical zones and/or may comprise continuous or discontinuous optical powers. As used in this context, a "continuous" change of optical power may refer to when the eye of the wearer cannot meaningfully perceive an optical discontinuity or image break. As used in this context, a "discontinuous" change of optical power may refer to when the eye may perceive an image break (e.g. between two optical powers). In some embodiments, where more than two zones are utilized in the static multifocal lens, the lens may comprise both continuous and discontinuous optical power. However, embodiments are not so limited and in some instance where more than two zones are utilized, the multifocal lens may comprise only continuous or discontinuous optical power.

Figure 36:
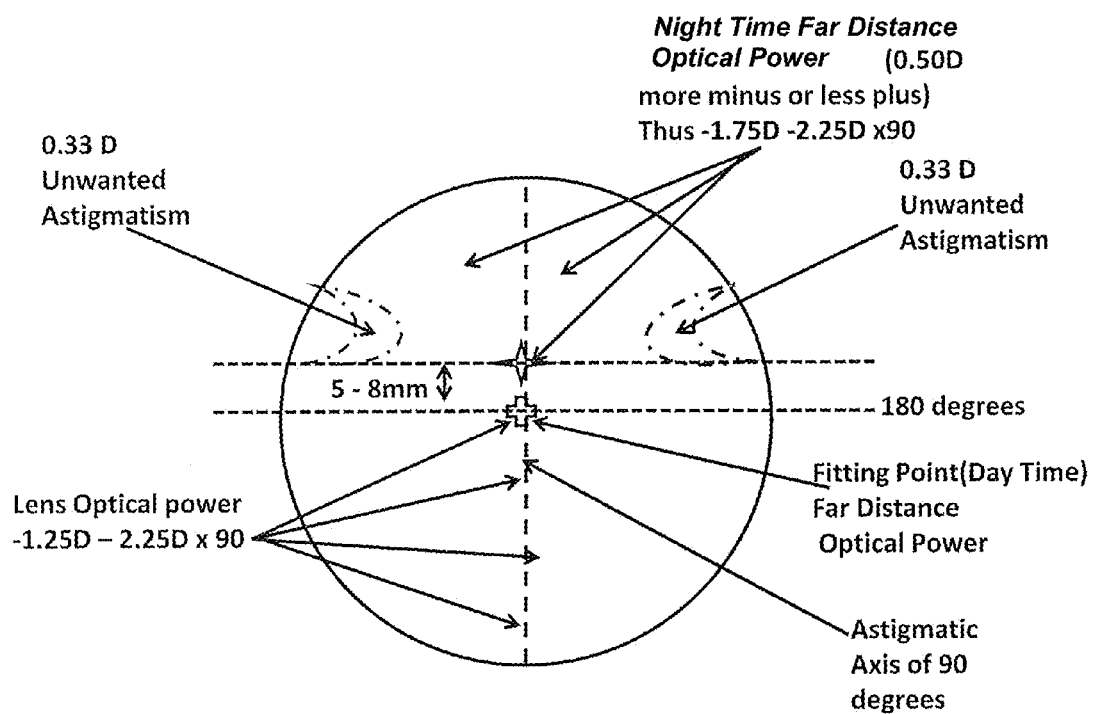
FIG. 36 shows an exemplary multifocal lens comprising a day time and a night time far distance optical zones in accordance with some embodiments.

With reference to FIG. 36, another exemplary lens in accordance with some embodiments is shown. This exemplary lens may be for a patient or wearer who does not need intermediate or near power optical correction (i.e. unlike FIG. 35, there is no progressive addition surface providing near distance viewing prescription). In this embodiment, the night time (i.e. low ambient light) far distance optical power is that of 0.50 D more minus or less plus than that of the day time far distance optical power. This exemplary embodiment also shows the multifocal static lens having a correction for astigmatism. The static optical power of the lens during day time (i.e. well lighted ambient light) in this embodiment is that of $-1.25D-2.25D\times90$, while during low ambient light levels is $-1.75D-2.25D\times90$. Note that when there is an astigmatic axis and thus the correction of the lens provides for the correction of the wearer's astigmatism, it may be advantageous that both the fitting point of the day time Rx be measured correctly and that the lens is surfaced, free formed or manufactured so as to maintain the 180 meridian being approximately horizontal. This may thereby maintain the proper position (orientation) of both the night time far distance zone (and the location where the wearer's eyes are position when viewing far distance objects at night time) and that of the day time far distance fitting point (i.e. where the wearer's eyes are position when viewing far distance objects in the day time). As shown in this example, the difference between the fitting point (e.g. position of the eye when viewing the day time optical power zone) and the position where the viewer's eye (or the approximate center of the pupil) is located when using the night time distance zone is between approximately 5 mm-8 mm. However, embodiments are not so limited, and this distance may be that of any distance, and may be customized when surfaced, or free formed for a particular wearer, or may be manufactured into the lens by the lens or semi-finished lens blank manufacturer.

Generally, when the optical power profile between the two points (i.e. the position of the eye (or center of the pupil) for the wearer's primary gaze when viewing the day time far distance zone and the position of the eye (or center of the pupil) for the wearer's primary gaze when viewing the night time far distance zone) is of a continuous optical power, the shorter the distance between the two positions, the higher the amount of unwanted astigmatism that may be found in the multifocal lens. That is, for example, when the multifocal lens comprises a "reverse progressive addition surface" as described above, in which more minus or less plus optical power is provided, the shorter the channel distance, the greater the unwanted astigmatism created. It may therefore be advantageous to increase this distance if possible. As sued in this context, "unwanted astigmatism" may refer to the astigmatism found in the lens due to the lens optical design and is not that of the astigmatism correction for a wearer. If the optical power profile is discontinuous, the degree of unwanted astigmatism may be far less then in a continuous optical power profile embodiment. It should be noted that this is by way of example only and that the optical power could be that of any optical power, and the optical axis could be that of any optical axis.

In general, the difference between the night time (or low ambient light) optical power and that of day time (or a good ambient light) could be that of any amount of additional minus or less plus, but may usually be between approximately 0.12 D to 1.00 D, including that which correct for some of the higher order aberrations of the eye such as spherical aberration. The optical power may change continuously from that day time fitting point to that of the position where the wearer's eye is located during the primary gaze when viewing far distance objects at night time, and can plateau in optical power (meaning no change or a very slight change) or it can (as shown in FIG. 34) change to a peak level and then reduce in additional minus and less plus optical power.

As noted above, in some embodiments, the multifocal lens may be disposed within an adjustable or translating frame capable of moving up and/or down on the face or head of the wearer (described in more detail above). For example, the adjustable or translating eyeglass frame can be that of a manual, semi-automatic, or fully automatic translating movement. The movement may be provided by a manual movement, a manual and automatic movement or a fully automatic movement. The movement may be caused by way of example only, by that of an actuator connected directly or indirectly to a movable member on the adjustable or translating frame, and thereby providing pressure or force upon one or more, of the bridge of the nose, tension behind the ear or ears of the wearer, or on either side of the nose.

Today's conventional static lens does not change its optical power after being fabricated. In some embodiments, the movement of the lens with regard to the existing optical power profile of the lens relative to the pupil (or line of sight of the wearer's eye) is what causes the perceived change of optical power. By way of example only, if the wearer's line of sight was fixed and did not move but the multifocal static lens moved relative to the line of sight, the line of sight would see a different optical power due to the change of the optical power profile of the part of the lens disposed in optical communication with the wearer's pupil. In some instances, the eye's line of sight will move and also the lens will move relative thereto. However the outcome of the line of sight of the wearer looking through a new optical power of the lens may be the same.

In some embodiments, an adjustable or translating static lens and frame system may be provided. The translating system may comprise a static lens having a fixed optical power (e.g. an optical zone of a lens) that provides a changeable focus of light on the retina of a wearer's eye, wherein the static lens may be moved relative to the line of sight of the wearer by way of the frame moving on the face of the wearer relative to the pupil of the eye of the wearer. In this way, and as described above, embodiments may provide multiple optical powers that may be used by a wearer without the need to tilt his head or redirect his gaze.

In some embodiments, the static lens may be that of a progressive addition lens. In some embodiments, the lens may provide a continuous optical power (such as a tradition PAL providing increasing plus optical power, or a "reverse PAL" that may provide a continuous increase in minus optical power or continuous decrease in plus optical power). Continuous optical power profiles may provide the advantage of a lens that does not provide any optical discontinuities that may be perceived by a wearer or even an outside observer; however, they may also create distortions. Thus, some embodiments herein may reduce the effect of this distortion by moving the continuous surface away from the wearer's eye when the optical zone is not in use (as was described above). In some embodiments, the lens may provide a discontinuous optical power (such as a plurality of discrete optical zones, where an optical discontinuity may be created at the border between optical zones that may be perceived by a wearer when directing his gaze at or near the border of the optical zones).

In some embodiments, the lens may comprise at least two zones (i.e. optical zones or optical regions) of different optical power. In some embodiments, the two zones may include a first zone that is a night time far distance zone comprising an optical power for a wearer for a low level of ambient light. In some embodiments, the two zones may comprise a second zone that comprises a day time far distance zone comprising an optical power for the same wearer for a day time level of ambient light. The optical power provided by these zones may vary based on the specific prescription for each wearer. In general, the optical power provided by low ambient light (e.g. night time) optical power zone is less plus optical power or more minus optical power than the optical power provided by the high ambient light (e.g. day time) optical power zone. This difference may be used to account for the change in pupil size and shape of the wearer's eye (and thereby change in refractive index) in low light conditions in comparison to high level of ambient light conditions). For example, the low ambient light optical zone may have an optical power that is between approximately 0.12D and 2.00D less plus optical power or more minus optical power (preferably between 0.12D and 1.00D less plus optical power or more minus optical power). In some embodiments, the night time far distance zone comprises less plus optical power or more minus optical power compared to that of the day time far distance zone. It should be further noted that with today's fabrication equipment, such as by way of example only, diamond turning, digital surfacing, embossing, stamping, etching, etc., it may be possible to correct more precisely for the higher order aberrations of the eye both during daytime or night time. Therefore, when the optical powers of approximately 0.12D to 2.00D are provided above, these optical powers may be understood to be that of 100% of the spherical equivalent or spherical average of that of the higher order aberrations or somewhat less than or greater than 100% of the spherical equivalent or spherical average of that of the higher order aberrations. Embodiments provided herein may cover any and all optical power corrections (e.g. higher order or lower order or a combination thereof).

Exemplary Embodiments Comprising Day and Night Optical Zones for Multifocal Lenses, Eyewear, and Frames Described below are further exemplary embodiments of lenses (and devices such as eyewear that may include such lenses) that may provide daytime and night time optical power zones for a wearer. Embodiments may, for instance, include combinations of multifocal lenses and frames that may translate or otherwise adjust the position of the multifocal lens having daytime and night time optical power zones relative to the wearer's eye. The embodiments described herein are for illustration purposes only and are not thereby intended to be limiting. After reading this disclosure, it may be apparent to a person of ordinary skill that various components and/or features as described below may be combined or omitted in certain embodiments, while still practicing the principles described herein. For example, the lenses described herein may be utilized with some or all of the embodiments described above related to adjustable or translating eyewear.

Embodiments provided herein may comprise a lens that provides the optical power needed by a wearer for both daytime (i.e. high ambient light conditions) and night time (i.e. low level ambient light conditions) for distance viewing. Embodiments may also provide eyewear such as spectacle frames and lenses that may comprise a lens that provides daytime and night time far distance optical powers and that may move or adjust the position of such a lens relative to a wearer's eye. The movement of the frames may be such that the optical zones of the lenses are positioned in front of a wearer's eye (or in a more operable viewing position). That is, for instance, the lens may be included in a translating or adjustable eyeglass frame, such as the exemplary embodiments described in detail above. This may provide the advantage of moving the relevant optical zone (i.e. an optical zone that the wearer would like to use) into a more accessible or convenient location in front of the wearer's eye.

As noted above, a wearer's optical needs may vary based on the level of ambient light available (i.e. the viewing environment). For example, the level or amount of light may affect the size and/or shape of the wearer's pupil, which may thereby change the optical power needed for the wearer to view objects at the same distance. Embodiments provided herein may comprise a multifocal lens that includes at least two optical zones. The first optical zone may correspond to the wearer's prescription during high ambient light conditions. This may also be the optical power that corresponds to the optical power that most eye doctors prescribe for their patients today. However, this single prescription and optical power may be less effective during low ambient light conditions. Thus, the multifocal lens may provide a second optical zone, where the second optical zone may have an optical power that corresponds to that same patient's optical power needs to the see objects at night.

Embodiments provided herein may offer some advantages over conventional lenses and/or convention frames (and combinations thereof). For instance, embodiments provided herein may comprise two different prescriptions (i.e. optical powers) for viewing objects at the same viewing distance (e.g. two different optical powers to view far distance objects, near distance objects; or intermediate distance objects.). In contrast, traditional multifocal lenses often comprise different optical zones that generally correspond to the optical power needs of the wearer for viewing objects at different viewing distances (e.g. one optical power for viewing far distance objects; one optical power for near distance objects; one optical power for viewing intermediate distance objects). This may be due, in part, because these multifocal lenses are designed for use in conventional (i.e. static or non-adjustable) frames, which may not provide for an efficient manner of using such lenses (i.e. conventional frames may make it difficult for a user to take advantage of multiple optical zones for viewing objects at the same distance, albeit potentially under different viewing conditions). For example, conventional lenses usually provide the far distance optical power at or near the conventional fitting point of the lens because far distance objects may be most often viewed in the wearer's primary gaze. That is, viewer's do not often look or gaze downward to view objects at a distance of, for instance, approximately 10 feet or greater. However, in some instances, if a second optical zone having a different optical power was provided to view far distance objects, it would be located above or below the first optical zone (and at sufficient distance to not interfere with the first optical zone). Therefore, a conventional frame (i.e. static frame) that does not provide the ability to adjust the position of the optical zones that they may be effectively used (e.g. move a first optical zone having a far distance optical power into the primary gaze, and then move a second optical zone having a second far distance optical power into the wearer's primary gaze). Indeed, the wearer would likely have to contort his head and neck, or adjust his eyes at different and potentially extreme angles to attempt to use such optical zones. Thus, there is simply no motivation to provide a multifocal lens (such as those in some embodiments provided herein) that comprises multiple optical powers for a single viewing distance (e.g. far distance viewing) for use in conventional frames.

In some embodiments, eyewear may be provided, The eyewear may comprise a lens housing, a first temple and a second temple coupled to the lens housing, and a first and a second lens supported by the lens housing. The lens may comprise a first optical zone having an optical power corresponding to a wearer's far distance day time optical power need and a second optical zone having an optical power corresponding to a wearer's far distance night time optical power need. The eyewear may further comprise a movable member coupled to the lens housing, the first temple, or the second temple, wherein the movable member may be configured to move between a first position and a second position, where a position of the lens may be based at least in part on the position of the movable member. The eyewear may further include a mechanism adapted to adjust the position of the movable member.

As noted above, some embodiments may provide a multifocal lens that provides at least two optical zones having two different optical powers that correspond to a wearer's prescription or needs for viewing objects at the same viewing distances (e.g. near, intermediate, and far). Examples are provided herein of lenses that comprise two far distance optical powers (e.g. corresponding to a wearer's prescription or needs during high and low ambient light conditions), but embodiments are not so limited. Moreover, utilizing such multifocal lenses in combination with eyewear that comprises a movable member (such as the components as described above, including the various exemplary embodiments provided herein) and a mechanism for adjusting the position of the movable member (such as the components as described above, including the various exemplary embodiments provided herein) may provide an apparatus or device in which the advantages of such a multifocal lens may be efficiently utilized. That is, the movable member and the mechanism may combine to adjust the position of the multifocal lens so that the wearer may conveniently and readily utilize different optical zones to view objects at the same viewing distance (but perhaps under different conditions).

In general, the optical zones of the multifocal lens may be formed utilizing any suitable method, including free forming, polishing, etching, disposing a diffractive or refractive layer on the surface of the lens, etc. Moreover, although the optical power of the optical zones corresponding to the two different far distance viewing distances may be static (e.g. they may be fixed), such lenses may be used in any type of eyewear, such as eyeglasses, prescription eyeglasses, occupational eyeglasses, etc.).

In some embodiments, in the eyewear as described above, the lens may comprise an optical power profile. The optical power profile may vary continuously between the first optical zone and the second optical zone. An example of this is shown in FIG. 34 and described above. A continuous optical profile may provide the advantage that a wearer may not readily perceive the border of two optical regions, or notices a sharp image jump when his gaze passed over the border between optical zones. In some embodiments, the optical power profile may vary discretely between the first optical zone and the second optical zone. An example of an embodiment that may comprise a discrete optical power profile is the multifocal lens that is shown in FIG. 33, where each optical zone may have a different optical power, and a discontinuity may thereby exist at the border between zones. Some such embodiments may provide the advantage of reducing the distortion that may be created by a lens that has a continuous optical profile.

In some embodiments, in the eyewear as described above, the lens may have an optical surface that decreases in plus optical power or increases in minus optical power as the distance from the fitting point increases. That is, the optical surface may have a shape (e.g. a radius of curvature or other features) such that the lens provides an optical power when a wearer looks through particular regions or zones of the lens. As described above, the surface of the multifocal lens may provide an optical power that increases in minus optical power or decreases in plus optical power as the distance from the fitting point increases, where fitting point in this context was defined above. For example and with reference to the optical power profile provided in FIG. 34, the fitting point may correspond to the point 3401 where the optical power provided by the surface of the multifocal lens is shown as 0.0 D. Moving along the axis of the graph to the left, the distance from the fitting point is increasing (shown in mm). The optical power (represented by the graph) is shown as increasing in minus optical power (i.e. the optical power is shown as starting at 0.0D and decreasing to −0.5 D) as the distance from the fitting point increases. In some embodiments, such the embodiment shown in FIG. 24, the optical surface may be continuous. However, embodiments are not so limited and, in some instances, the optical surface may be discontinuous.

In some embodiments, in the eyewear as described above, the lens may comprise an optical surface that has a plateau at or near the fitting point in curvature change for a distance of 1 to 5 mm before it begins to continuously change such to increase minus optical power of the distance zone or decrease plus optical power of the distance zone. That is, for instance, the optical zones or zones of some embodiments may comprise an approximately constant optical power. For example, in some embodiments, an optical zone disposed at or near the fitting point may have a height of approximately 1.0 to 10.0 mm (preferably 1.0 to 5.0 mm), and may have an approximately constant optical power over this portion of the lens. For example, the optical power of any point within the optical zone may be within approximately 0.1D of any other point within the optical zone (preferably within approximately 0.05D). In general, the more uniform the optical power provided, the less distortion that may be created when the wearer is looking through the optical zone. Thus, it may be beneficial in some embodiments for some or all of the optical zones corresponding to a viewing distance such as the daytime far distance optical zone and the nighttime far distance optical zone to have some area over which the optical power remains approximately constant. In some embodiments, there may be a continuous change in optical power between two or more zones of relatively constant optical power (such as a progressive surface). The portion of the lens comprising the progressive surface may provide a third optical power zone corresponding to an intermediate distance viewing zone (which may, in some instance, have an optical power that may not be relatively constant, but may vary continuously).

In some embodiments, in the eyewear as described above, the lens may comprise an optical surface that decreases in distance viewing power as the distance from the fitting point increases. However, embodiments are not so limited, and in some instances the optical zone corresponding to the optical power for the wearer's nighttime far distance viewing zone may be disposed at or near the fitting point of the lens. The optical zone comprising the optical power for the wearer's daytime far distance viewing zone may thereby be disposed at a distance away from the fitting point. In general, such embodiments may not be proffered because the daytime far distance zone is typically used more often than that nighttime (i.e. low ambient light) far distance zone.

In some embodiments, where the optical surface decreases in distance viewing power as the distance from the fitting point increases, the optical surface may be continuous. That is, for example, the lens may comprise what was described above as a "reverse progressive." In some such embodiments, the lens may comprise, by way of example only: a first optical zone having an optical power for far distance viewing in daytime conditions. Moving vertically up (or down) the lens (i.e. along the height of the lens) from the fitting point, the optical power of the lens may begin to continuously change similar to the optical power profile of a progressive addition surface. However, rather than providing added plus optical power, in some embodiments comprising a "reverse progressive," the optical power of the lens provides less plus optical power (or more minus optical power) corresponding to the far distance viewing needs of the same wearer at night. Thus, unlike a traditional optical power profile for a PAL where, as the wearer looks down the channel, the optical power continuously increases, in this case, in some embodiments, the optical power of the lens as the wearer moves up (or down) the channel away from the fitting point of the lens actually decreases in plus optical power (or increases in minus optical power).

The optical power profile may, in some embodiments, reach a maximum negative optical power, or minimum plus optical power, and plateau in optical power change (e.g. corresponding to a region or zone that may comprise relatively constant optical power over a distance, such as approximately 5.0 mm), or the optical power profile may continue to change (e.g. it may begin to decrease in minus optical power or increase in plus optical power). An example of such a profile was described above with reference to FIG. 34. In some embodiments, at the location on the lens where the reverse progressive reaches its maximum minus optical power (or its minimum plus optical power), the optical power profile may "plateau" (i.e. have an optical power that remains approximately the same for a certain distance). For example, the optical zone may maintain the maximum minus optical power (or minimum plus optical power) over a distance of, by way of example only, approximately 1.0 mm to 8.0 mm or greater. This plateau of optical power may correspond to the optical power of the wearer for nighttime distance viewing, and therefore when exemplary embodiments of eyewear adjust the lens so that this optical zone is the primary gaze of the wearer, the optical zone may provide a viewing area corresponding to the size of the of the plateau (which may thereby reduce distortion when using this portion of the multifocal lens). It should be noted that in some embodiments, the lens may comprise one, two, three or more regions or zones of optical power plateau such as by way of example only: 1) a near vision zone, 2) a day time distance zone, and 3) a night time distance zone. In some embodiments, an additional optical power zone or zones may be disposed between the zones having a plateau that may vary continuously and/or provide an intermediate distance optical power for the wearer.

In some embodiments, in the eyewear as described above, the first position of the movable member may correspond to a position of the lens where the first optical zone is disposed in optical communication with the approximate center of the wearer's pupil in the wearer's primary gaze. In some embodiments, the second position of the movable member may correspond to a position of the lens where the second optical zone is disposed in optical communication with the approximate center of the wearer's pupil in the wearer's primary gaze. An example of this is shown in FIGS. 32(*a*) and (*b*), where the first optical zone 3201 may comprise the daytime far distance optical power, and the second optical zone 3202 may comprise the wearer's nighttime far distance optical power.

In some embodiments, in the eyewear as described above, the first optical zone may provide an optical power for the wearer for a high level of ambient light. As described above, the use of the term "daytime" may refer to where there is a good amount of ambient light available. In some embodiments, the second optical zone provides an optical power for the wearer for a low level of ambient light. As described above, the use of the term "nighttime" may refer to when there is a low amount of ambient light available.

In some embodiments, in the eyewear as described above, the second optical zone may include less plus optical power or more minus optical power compared to that of the first optical zone. In general, a wearer's prescription for nighttime distance viewing may require less plus optical power (or more minus optical power) than the wearer's daytime far distance optical power. This may be due, in part, to the increase in the size of the pupil in low ambient light conditions, which may in turn increase the plus optical power provided by the wearer's eye, and thereby decrease the need for additional plus optical power (or increase the need for additional minus optical power).

In some embodiments, in the eyewear as described above, the second optical zone comprises between approximately 0.12D to 1.00D of less plus optical power or more minus optical power compared to that of the first optical zone. However, as noted above, the optical powers may depend on the prescription needs of the particular patient.

In some embodiments, in the eyewear as described above, the lens may further include a third optical zone, wherein the third optical zone has an optical power corresponding to a wearer's intermediate distance optical power need. However, embodiments are not so limited, and in general a multifocal lens may comprise as many optical zones as may be needed. The number of optical zones may, however, may be limited in practice based on real world constraints such as the total size of the lens, the size of each optical zone, etc. In some embodiments, the third optical zone comprises a progressive addition surface. That is, for instance, the channel of a progressive addition surface may provide a continuous optical profile between a far distance optical power and a near distance optical power, and thereby have an optical power that may correspond to the wearer's optical needs for intermediate distances. In some embodiments, the lens may further include a fourth optical zone having an optical power that corresponds to the wearer's near distance optical power needs. This may, for instance, correspond to the optical zone comprising the full add power of the progressive addition surface.

In this regard, in some embodiments, in the eyewear as described above, the lens may further include a third optical zone, where the third optical zone has an optical power corresponding to a wearer's near distance optical power need. This could, for instance, correspond to the full add power of a progressive addition surface, or a discrete optical zone that provides optical add power corresponding to a wearer's near distance viewing needs (for example, an embodiment may comprise discrete optical zones, and may not thereby comprise a continuous change in the surface corresponding to a continuous change in optical power).

In some embodiments, in the eyewear as described above, the first optical zone and the second optical zone may be disposed at least approximately 3.0 mm apart. As noted above, it may be preferred that there is some distance between the two optical zones such that when a wearer is utilizing one optical zone, he may not readily perceive another optical zone (or the border between the two zones). In some embodiments, the first optical zone and the second optical zone are disposed at least approximately 5 mm apart. In some embodiments, the first optical zone and the second optical zone are disposed between approximately 5 mm and 8 mm apart. As noted above, the distance between the optical zones (as well as the size of the optical zones) may be chosen to reduce the distortions and/or the permeability of the different optical zones by the wearer.

Embodiments may provide a first lens. The first lens may comprise a first optical zone having an optical power corresponding to a wearer's far distance day time optical power need and a second optical zone having an optical power corresponding to a wearer's far distance night time optical power need. That is, as noted above, although some embodiments may comprise eyewear that includes a combination of a multifocal lens with an adjustable frame, embodiments are not so limited. Thus, embodiments may, for instance comprise a multifocal lens that comprises at least two optical zones that may correspond to a wearer's optical power needs for viewing objects that are at the same distance (e.g. optical zones for viewing distant objects in both low and high ambient light conditions).

In some embodiments, in the first lens as described above, the first optical zone and the second optical zone may be static. That is, for example and as was noted above, embodiments of the multifocal lens may provide a plurality of fixed optical powers based on static properties of the lens (such as the material, the surface of shape, etc.). In general, embodiments provided herein may provide any type of eyeglass lens having multiple optical zones that may be manufactured using any known and generally available techniques to create a multifocal lens.

In some embodiments, the first lens as described above may have an optical power profile. In some embodiments, the optical power profile varies continuously between the first optical zone and the second optical zone. In some embodiments, the optical power profile varies discretely (i.e. discontinuously) between the first optical zone and the second optical zone.

In some embodiments, in the first lens as described above, the first lens may have an optical power profile. The optical power profile may provide an optical power plateau near and around the fitting point. In some embodiments, the optical power profile may vary continuously as the distance on the lens increases from the fitting point. As noted above, the plateau of the optical power profile may correspond to the optical zone for one the wearer's distance optical needs (such as the daytime far distance optical power need). The lens may have a plurality of optical zones (including continuously variable optical zones). In some embodiments, the lens may comprise a progressive addition surface that provides an increasing plus optical power as the distance form the fitting point increases. In some embodiments, the lens may comprise a "reverse progressive" surface, wherein the optical power decreases in plus optical power or increases in minus optical power as the distance from the fitting point increases. However, because of the plateau provided at and around the fitting point, in some embodiments, this continuous decrease or increase in plus or minus optical power may not begin until a certain distance away from the fitting point (such as, for example 1.0 to 5.0 mm away from the fitting point).

In some embodiments, in the first lens as described above, the optical power of the first optical zone and/or the second optical zone may be approximately constant. That is, as noted above, one or more optical zones of the lens may have a relatively constant optical power over the optical zone, which may thereby decrease the distortion perceived by the wearer when the wearer is using that optical zone. The optical zone may have a height (as shown by dimension 3001 and FIG. 20), where the optical zone may remain constant. In some embodiments, the first optical zone and/or the second optical zone may have a height of at least 2.0 mm. In some embodiments, the first optical zone and/or the second optical zone may have a height between approximately 3.0 mm and 10 mm.

In some embodiments, the first lens as described above may include an optical surface that decreases in distance viewing power as the distance from the fitting point increases. The surface of the lens may vary so as to vary the optical power provided by the lens. It should be noted that this may, but need not require that the distance viewing power needs to decrease in all directions from the fitting point, but it may only decrease in one direction (or a plurality, but not all, directions). For instance, in some embodiments, the distance viewing optical power may decrease when moving up along the height of the lens from the fitting point, but may stay the same (or increase) when moving down along the height of the lens. In some embodiments, the surface may vary continuously. This may, for instance, correspond to a multifocal lens that comprises a "reverse progressive." In some embodiments, the surface may vary discretely.

In some embodiments, the first lens as described above may include a variable optical surface that decreases in plus optical power or increases in minus optical power as the distance from the fitting point increases. Again, as was noted above, this may, but need not require that the plus optical power decrease (or the minus optical power increase) in all directions from the fitting point. In some embodiments, the surface may vary continuously. This may, for instance, correspond to a multifocal lens that comprises a "reverse progressive." In some embodiments, the surface may vary discretely.

In some embodiments, in the first lens as described above, the first optical zone may provide an optical power for the wearer for a high level of ambient light. In some embodiments, the second optical zone may provide an optical power for the wearer for a low level of ambient light.

In some embodiments, in the first lens as described above, the second optical zone may have less plus optical power or more minus optical power compared to that of the first optical zone. In some embodiments, the second optical zone may have between approximately 0.12D to 1.00D of less plus optical power or more minus optical power compared to that of the first optical zone.

In some embodiments, in the first lens as described above, the first lens may include a third optical zone. In some embodiments, the third optical zone may have an optical power corresponding to a wearer's intermediate distance optical power need. In some embodiments, the lens may comprise a progressive addition surface. In some embodiments, the lens may further include a fourth optical zone that has an optical power corresponding to a wearer's near distance optical power needs.

In some embodiments, the first lens as described above may further include a third optical zone, where the third optical zone has an optical power corresponding to a wearer's near distance optical power need. This may correspond to embodiments that include, for instance, one or more discrete optical zones that may have an optical discontinuity between those zones.

In some embodiments, a first lens may be provided. The first lens may include a fitting point and an optical surface that provides a first optical power zone, a second optical power zone, and a third optical power zone. The first optical power zone may correspond to the optical power provided by the optical surface at the fitting point. The second optical power zone may correspond to the optical power provided by the optical surface at a distance of between approximately 3.0 mm and 5.0 mm above the fitting point. The third optical power zone may correspond to the optical power provided by the optical surface at a distance of between approximately 3.0 mm and 5.0 mm below the fitting point. The second optical power zone may provide more minus or less plus optical power than the first optical zone, and the third optical power zone may provide less minus or more plus optical power than the first optical power zone. An example of such embodiments is shown in FIG. 34, where the first optical zone may correspond to the portion of the lens at or near 3401; the second optical zone may refer to the optical zone at near 3403 (in this case providing more minus optical power than the first optical zone 3401); and the third optical zone may refer to an intermediate optical zone between 3401 and 3402 (in this case, providing more plus optical power than the first optical zone 3402). This may provide the optical power needed by the wearer to view intermediate distance objects. As noted above, the inventors have found that distances of at least 3.00 mm between optical zones may be sufficient to provide a plurality of optical zones that may be used effectively by a wearer (e.g. without noticing or being distracted by other optical zones of the lens). Again, it should be noted that the distances and the optical powers provided in this example are for illustration purposes only, and are not intended to be limiting. In some embodiments, the optical power provided by the first optical zone may correspond to the wearer's day time distance vision.

In some embodiments, in the first lens as described above, the optical surface may provide a continuous optical power between the first optical power zone, the second optical power zone, and the third optical power zone. An example of a continuous optical power profile is shown in FIG. 34.

In some embodiments, a first lens may be provided. The first lens may comprise a fitting point and an optical surface that provides a first optical power zone and a second optical power zone. The first optical power zone may correspond to the optical power provided by the optical surface at the fitting point. The second optical power zone may correspond to the optical power provided by the optical surface at a distance of between approximately 3.0 mm and 5.0 mm above the fitting point. The second optical power zone may provide more minus or less plus optical power than the first optical zone. That is, for instance, in some embodiments, the multifocal lens may have a daytime far distance zone and a nighttime far distance zone, but need not comprise any other optical zones (such as a near distance optical zone). That may correspond to embodiments that may be used by individuals without presbyopia (e.g. people under 40 years old). The nighttime optical zone may be disposed above the fitting point of the lens, such that when the wearer would like to use this optical zone, it may be lowered into a more operable position (such as in front of the wearer's pupil in the primary gaze). However, embodiments are not so limited, and multifocal lenses may comprise any number and type of optical zones.

Thus, in some embodiments, in the first lens as described above, the optical power provided by the first optical zone may correspond to the wearer's day time distance vision. The first lens may also comprise a nighttime far distance optical power zone, and an intermediate optical power zone that may be disposed above (or below) the nighttime far distance viewing zone (which may be useful to individuals like pilots, or other individuals that work with components above their heads).

It should be noted that although reference was made above to a "static lens," systems, devices and apparatuses (such as eyewear) may not be limited to comprising only static lens. That is, for instance, eyewear may comprise a plurality of lenses, one of which may have static optical power zones that may be in optical communication with a dynamic optic.

CONCLUSION

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

Although many embodiments were described above as comprising different features and/or combination of features, a person of ordinary skill in the art after reading this disclosure may understand that in some instances, one or more of these components could be combined with any of the components or features described above. That is, one or more features from any embodiment can be combined with one or more features of any other embodiment without departing from the scope of the invention.

As noted previously, all measurements, optical powers, dimensions, prescriptions provided herein within the spec or within the figures are by way of example only.

A recitation of "a," "an," or "the" is intended to mean "one or more" unless specifically indicated to the contrary.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates, which may need to be independently confirmed.

What is claimed is:

1. Eyewear comprising:
a lens housing;
a first temple and a second temple coupled to the lens housing;
a lens supported by the lens housing, wherein the lens comprises:
   a first optical zone having an optical power corresponding to a wearer's far distance optical power need in high ambient light; and
   a second optical zone having an optical power corresponding to a wearer's far distance optical power need in low ambient light;
wherein the eyewear includes a mechanism configured to adjust the position of the lens between a first position and a second position,
wherein the optical power of the first optical zone is different from the optical power of the second optical zone,
wherein the first position corresponds to a position of the lens where the first optical zone is disposed in optical communication with the approximate center of the wearer's pupil in the wearer's primary gaze, and
wherein the second position corresponds to a position of the lens where the second optical zone is disposed in optical communication with the approximate center of the wearer's pupil in the wearer's primary gaze.

2. The eyewear of claim 1, wherein the lens comprises an optical power profile, and wherein the optical power profile varies continuously between the first optical zone and the second optical zone.

3. The eyewear of claim 1, wherein the lens comprises an optical power profile, and wherein the optical power profile varies discretely between the first optical zone and the second optical zone.

4. The eyewear of claim 1, wherein the optical power of the first optical zone and/or the second optical zone is approximately constant.

5. The eyewear of claim 1, wherein the lens comprises an optical surface that decreases in plus optical power or increases in minus optical power as a distance from the fitting point increases.

6. The eyewear of claim 5, wherein the optical surface is discontinuous.

7. The eyewear of claim 1, wherein the optical surface is continuous.

8. The eyewear of claim 1, wherein the lens comprises an optical surface that plateaus in curvature change for a distance of 1 to 5 mm before it begins to continuously change such to increase minus optical power of a distance zone or decrease plus optical power of a distance zone.

9. The eyewear of claim 1, wherein the lens comprises an optical surface that decreases in distance viewing power as a distance from the fitting point increases.

10. The eyewear of claim 1,
wherein the first optical zone provides an optical power for the wearer's far distance daytime optical power needs; and
wherein the second optical zone provides an optical power for the wearer's far distance night time optical power needs.

11. The eyewear of claim 1, wherein the second optical zone comprises less plus optical power or more minus optical power compared to that of the first optical zone.

12. The eyewear of claim 1, wherein the second optical zone comprises between approximately 0.12D to 1.00 D of less plus optical power or more minus optical power compared to that of the first optical zone.

13. The eyewear of claim 1, wherein the lens further comprises a third optical zone, wherein the third optical zone has an optical power corresponding to a wearer's intermediate distance optical power need.

14. The eyewear of claim 13, wherein the third optical zone comprises a progressive addition surface.

15. The eyewear of claim 13, wherein the lens further comprises a fourth optical zone, wherein the fourth optical zone has an optical power corresponding to a wearer's near distance optical power need.

16. The eyewear of claim 1,
wherein the lens further comprises a third optical zone, and
wherein the third optical zone has an optical power corresponding to a wearer's near distance optical power need.

17. A first lens, comprising:
a first optical zone having an optical power corresponding to a wearer's far distance optical power need in high ambient light; and
a second optical zone having an optical power corresponding to a wearer's far distance optical power need in low ambient light,
wherein the optical power of the first optical zone is different from the optical power of the second optical zone,
wherein the first optical power zone is disposed at the fitting point, and
wherein the second optical power zone is located above the first optical power zone.

18. The first lens of claim 17,
wherein the first lens comprises an optical power profile,
wherein the optical power profile provides an optical power plateau near and around a fitting point; and
wherein the optical power profile varies continuously between the first optical zone and the second optical zone.

19. The first lens of claim 17,
wherein the first optical zone provides an optical power for the wearer for a high level of ambient light; and wherein the second optical zone provides an optical power for the wearer for a low level of ambient light.

20. A first lens comprising:
a fitting point; and
an optical surface that provides a first optical power zone, a second optical power zone, and a third optical power zone;
wherein the first optical power zone corresponds to the optical power provided by the optical surface at the fitting point;
wherein the first optical power zone extends from approximately 3 mm to 5 mm above the fitting point to approximately 3 mm to 5 mm below the fitting point;
wherein the second optical power zone is located above the first optical power zone;
wherein the third optical power zone is located below the first optical power zone;
wherein the second optical power zone provides more minus or less plus optical power than the first optical zone;
wherein the third optical power zone provides less minus or more plus optical power than the first optical power zone;
wherein the first optical power zone has an optical power corresponding to a wearer's far distance optical power need in high ambient light; and
wherein the second optical power zone has an optical power corresponding to the wearer's far distance optical power need in low ambient light.

21. The first lens of claim 20, wherein the optical power provided by the first optical zone corresponds to the wearer's day time distance vision.

* * * * *